US011968376B2

(12) United States Patent
Wu et al.

(10) Patent No.: US 11,968,376 B2
(45) Date of Patent: Apr. 23, 2024

(54) REFERENCE IMAGE ENCODING METHOD, REFERENCE IMAGE DECODING METHOD, REFERENCE IMAGE ENCODING DEVICE, AND REFERENCE IMAGE DECODING DEVICE

(71) Applicants: Huawei Technologies Co., Ltd., Shenzhen (CN); University of Science and Technology of China, Hefei (CN)

(72) Inventors: Feng Wu, Hefei (CN); Fangdong Chen, Hefei (CN); Houqiang Li, Hefei (CN); Zhuoyi Lv, Shenzhen (CN); Haitao Yang, Shenzhen (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 299 days.

(21) Appl. No.: 17/217,808

(22) Filed: Mar. 30, 2021

(65) Prior Publication Data

US 2021/0289214 A1 Sep. 16, 2021

Related U.S. Application Data

(63) Continuation of application No. 15/861,218, filed on Jan. 3, 2018, now Pat. No. 10,979,722, which is a
(Continued)

(30) Foreign Application Priority Data

Jul. 3, 2015 (CN) .......................... 201510392066.4

(51) Int. Cl.
*H04N 19/176* (2014.01)
*H04N 19/179* (2014.01)
(Continued)

(52) U.S. Cl.
CPC ......... *H04N 19/176* (2014.11); *H04N 19/179* (2014.11); *H04N 19/46* (2014.11);
(Continued)

(58) Field of Classification Search
CPC .... H04N 19/176; H04N 19/179; H04N 19/55; H04N 19/573; H04N 19/61; H04N 19/91;
(Continued)

(56) References Cited

U.S. PATENT DOCUMENTS 9,602,838 B2 3/2017 Dane et al.
9,661,325 B1 5/2017 Thompson
(Continued)

FOREIGN PATENT DOCUMENTS

CN 101202913 A 6/2008
CN 101272494 A 9/2008
(Continued)

OTHER PUBLICATIONS

Zhang et al. "Optimizing the Hierarchical Prediction and Coding in HEVC for Surveillance and Conference Videos with Background Modeling," IEEE Transactions on Image Processing vol. 23, No. 10, pp. 4511-4526, Institute of Electrical and Electronics Engineers, New York, New York (Oct. 2014).
(Continued)

*Primary Examiner* — Joseph W Becker
(74) *Attorney, Agent, or Firm* — Leydig, Voit & Mayer, Ltd.

(57) ABSTRACT

The present disclosure provides a reference image encoding method, including: encoding sequence, to obtain a reconstructed image of a first and second reference images; determining whether a local area in the second reference image is suitable for updating first reference image; determining whether the first reference image is updated; when the first reference image is not updated, and it is determined
(Continued)

the second reference image is suitable for updating the first reference image, replacing a pixel value of a corresponding area or a related area in the first reference image with a pixel value of the local area in the second reference image; and compiling, into the bitstream.

14 Claims, 9 Drawing Sheets

Related U.S. Application Data continuation of application No. PCT/CN2016/088144, filed on Jul. 1, 2016.

(51) Int. Cl.
*H04N 19/46* (2014.01)
*H04N 19/55* (2014.01)
*H04N 19/573* (2014.01)
*H04N 19/58* (2014.01)
*H04N 19/61* (2014.01)
*H04N 19/91* (2014.01)

(52) U.S. Cl.
CPC ........... *H04N 19/55* (2014.11); *H04N 19/573* (2014.11); *H04N 19/58* (2014.11); *H04N 19/61* (2014.11); *H04N 19/91* (2014.11)

(58) Field of Classification Search
CPC ...... H04N 19/58; H04N 19/46; H04N 19/124; H04N 19/136; H04N 19/70
See application file for complete search history.

(56) References Cited

U.S. PATENT DOCUMENTS

| | | | |
|---|---|---|---|
| 2008/0123747 A1 | 5/2008 | Lee et al. | |
| 2009/0208126 A1 | 8/2009 | Matsumoto | |
| 2011/0002550 A1 | 1/2011 | Takada | |
| 2011/0243451 A1 | 10/2011 | Oyaizu | |
| 2013/0044817 A1 | 2/2013 | Bankoski et al. | |
| 2015/0271356 A1* | 9/2015 | Terada | H04N 23/80 348/231.99 |
| 2016/0150242 A1* | 5/2016 | Zhang | H04N 19/103 375/240.12 |

FOREIGN PATENT DOCUMENTS

| | | |
|---|---|---|
| CN | 101883284 A | 11/2010 |
| CN | 102006473 A | 4/2011 |
| CN | 102208016 A | 10/2011 |
| CN | 103957341 A | 7/2014 |
| EP | 2192784 A2 | 6/2010 |
| KR | 100803611 B1 | 2/2008 |
| KR | 20140103029 A | 8/2014 |
| WO | 2009102011 A1 | 8/2009 |

OTHER PUBLICATIONS

"Joint Call for Proposals on Video Compression Technology," ITU—Telecommunications Standardization Sector, Study Group 16 Question 6 Document VCEG-AM91, 39th Meeting Kyoto, JP, International Telecommunications Union, Geneva Switzerland (Jan. 17-22, 2010).

Hepper "Efficiency Analysis and Application of Uncovered Background Prediction in a Low Bit Rate Image Coder", IEEE Transactions on Communications, XP000173223, Institute of Electrical and Electronics Engineers, New York, New York (Sep. 1990).

Dufaux et al: "Background mosaicking for low bit rate video coding", Proceedings of the International Conference on Image Processing (ICIP), XP010202155, Institute of Electrical and Electronics Engineers, New York, New York (1996).

John Muller: "Report of the AdHoc group on core experiments on efficient coding in MPEG-4 video", 37. MPEG Meeting; Nov. 18, 1996-Nov. 22, 1996; MACEIO; (Motion Picture Expert Group or ISO/IEC JTC1/SC29/WG11), No. M1395, XP030030690, (Nov. 1996).

Sjoberg et al: "Overview of HEVC high-level syntax and reference picture management", IEEE Transactions on Circuits and Systems for Video Technology, XP055045360, Institute of Electrical and Electronics Engineers, New York, New York (2012).

Mukawa et al., "Uncovered Background Prediction in Interframe Coding", IEEE Transactions on Communications, XP000946265, Institute of Electrical and Electronics Engineers, New York, New York (Nov. 1985).

"Series H: Audiovisual and Multimedia Systems Coding of moving video, Implementors Guide for H.263: Video coding for low bit rate communication" ITU-T H.263, pp. i-6, International Telecommunication Union, Geneva, Switzerland (Aug. 5, 2005).

"Series H: Audiovisual and Multimedia Systems Infrastructure of audiovisual services—Coding of moving video, Video coding for low bit rate communication" ITU-T H.263, pp. i-216, International Telecommunication Union, Geneva, Switzerland (Jan. 2005).

Wang et al., "MPEG-4 AVC/H.264 Based Motion Description for Fast Video Bitstream Generation," Chinese Journal of Computers, vol. 30, No. 6 (Jun. 2007).

Chen et al., "Hybrid transform for HEVC-Based Lossless Coding," 2014 IEEE International Symposium on Circuits and Systems (ISCAS), pp. 550-553, Institute of Electrical and Electronics Engineers, New York, New York (Jul. 2014).

\* cited by examiner

1000

```
┌─────────────────────────────────────────────────────────────┐
│ Parse a bitstream, to obtain a reconstructed image of a first reference │
│ image and a reconstructed image of a second reference image, where │     ~ S1100
│   the first reference image is decoded before the second reference │
│                            image                            │
└─────────────────────────────────────────────────────────────┘
```

Before parsing the bitstream, to obtain the reconstructed image of the second reference image, or during parsing the bitstream, to obtain the reconstructed image of the second reference image, or after parsing the bitstream, to obtain the reconstructed image of the second reference image, parse the bitstream, to obtain reference image update information, and determine, according to the reference image update information, whether a local area in the second reference image is used to update a corresponding area or a related area in the first reference image, where a size of the local area is less than or equal to a size of the second reference image  ~ S1200

When it is determined, according to the reference image update information, that the local area in the second reference image is used to update the corresponding area or the related area in the first reference image, replace a pixel value of the corresponding area or the related area in the first reference image with a pixel value of the local area in the second reference image  ~ S1300

FIG. 1

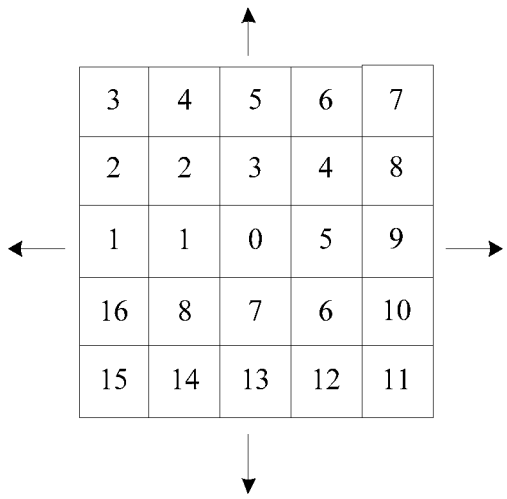

Encode a to-be-encoded sequence, to obtain a reconstructed image of a first reference image, and encode a second reference image, to obtain a reconstructed image of the second reference image, where the first reference image is encoded before the second reference image — S3100

Determine whether a local area in the second reference image is suitable for updating a corresponding area or a related area in the first reference image, where a size of the local area is less than or equal to a size of the second reference image — S3200

Determine whether the corresponding area or the related area in the first reference image is updated; and when the corresponding area or the related area in the first reference image is not updated, and it is determined that the local area in the second reference image is suitable for updating the corresponding area or the related area in the first reference image, replace a pixel value of the corresponding area or the related area in the first reference image with a pixel value of the local area in the second reference image — S3300

Compile, into the bitstream, reference image update information used to determine whether the local area in the second reference image is used to update the corresponding area or the related area in the first reference image — S3400

FIG. 6

REFERENCE IMAGE ENCODING METHOD, REFERENCE IMAGE DECODING METHOD, REFERENCE IMAGE ENCODING DEVICE, AND REFERENCE IMAGE DECODING DEVICE

CROSS-REFERENCE TO RELATED APPLICATIONS

This application is a continuation of U.S. patent application Ser. No. 15/861,218, filed on Jan. 3, 2018, which is a continuation of International Application No. PCT/CN2016/088144, filed on Jul. 1, 2016. The International Application claims priority to Chinese Patent Application No. 201510392066.4, filed on Jul. 3, 2015. All of the aforementioned patent applications are hereby incorporated by reference in their entireties.

TECHNICAL FIELD

The present disclosure relates to the field of video image processing, and in particular, to a reference image encoding method, a reference image decoding method, a reference image encoding device, and a reference image decoding device.

BACKGROUND

Rapid development of Internet technologies and gradually enriched material and spiritual cultures of people are accompanied with growing application requirements for videos in the Internet, especially application requirements for high-definition videos. However, a data amount of a high-definition video is very large, and to transmit a high-definition video in the Internet with a limited bandwidth, a problem, that is, a high-definition video compression coding problem needs to be resolved first. Internationally, there are two international organizations specializing in formulating video coding standards at present, that is, the Moving Picture Experts Group Motion MPEG) of the International Organization for Standardization (International Organization for Standardization, "ISO" for short)/the International Electrotechnical Commission (International Electrotechnical Commission, "IEC" for short) and the Video Coding Experts Group (Video Coding Experts Group, "VCEG" for short) of the International Telecommunication Union-Telecommunication Standardization Sector (ITU-T). The MPEG that is founded in 1986 is specializing in formulating related standards in the multimedia field, and the related standards are mainly applied to storage, broadcast television, streaming media in the Internet or a wireless network, or the like. The ITU-T mainly formulates video coding standards oriented to the real-time video communication field. For example, the video coding standards are applied to video calls, video conferences, or the like.

Over the past decades, video coding standards oriented to various applications have been successfully formulated internationally, and mainly include: the MPEG-1 standard used for video compact discs (VCD), the MPEG-2 standard used for digital video discs (DVD) and digital video broadcasting (DVB), the H.261 standard and the H.263 standard used for video conferences, the H.264 standard, the MPEG-4 standard allowing encoding of an object of any shape, and the newest High Efficiency Video Coding (HEVC) standard.

There is a close time correlation between neighboring images of a video sequence. Therefore, each frame of image of an image sequence may be divided into several code blocks that do not overlap with each other, and it is considered that motion of all pixels in a code block is the same. A motion vector is allocated by code block. When inter-frame prediction is performed on a current code block in a current encoded image, an encoded image that has been reconstructed is used as a reference image, and motion search is performed in a particular search area in the reference image for the current code block, to find a block that satisfies a matching criterion with the current code block, that is, a matching block. A relative offset between spatial locations of the current code block and the matching block in the reference image is a motion vector (Motion Vector, MV), and a process of obtaining the motion vector is referred to as motion estimation (Motion Estimation, ME). When compression coding is performed on a video, reference image information, motion vector information, and a difference (a residual) between a reconstructed pixel value of a matching block and an original pixel value of a current block are encoded and then sent to a decoder side. The decoder side finds, from a decoded reference image, a block at a location to which a motion vector points, and restores the current block after adding the residual to the block. Inter-frame redundancy can be removed from a video sequence by means of motion estimation, so as to greatly decrease a quantity of bits in video transmission.

Due to problems such as mutual blocking of sceneries, entering of new content, scene change, and camera motion, a matching block may not be found for a current block from a neighboring image of the current block. Therefore, a multi-reference image code technology is introduced, thereby greatly improving encoding performance. For a current code block in a current encoded image, motion search may be performed in each of k reference images that are encoded before the current image, to find a matching block.

In the newest formulated international video coding standard, that is, the HEVC standard, there are two types of reference images: a short-term reference image and a long-term reference image. A short-term reference image is generally a reconstructed encoded image that is relatively close to a current image, and the short-term reference image and the current image have a similar scenery. A long-term reference image is generally a reconstructed encoded image that is relatively far from the current image. A reference image is managed by using a reference image list. When a matching block of a current code block is searched for, starting from a first reference image in the reference image list, a motion vector with the smallest matching error is found from a particular search area, and then motion search continues to be performed in a next reference image, until motion search is performed completely in all reference images in the reference image list. Afterwards, an optimal motion vector of the current code block and a used reference image are determined.

In the prior art, in addition to a short-term reference image and a long-term reference image, to improve compression coding efficiency, a background reference image is further introduced. That is, a video sequence is divided into several video segments, and after each video segment is encoded completely, a reconstructed image in the video segment is used to generate a background image, as a reference frame used during inter-frame prediction on each image in a next video segment of the video segment. A background reference image is closely correlated to content of a neighboring video frame. Therefore, inter-frame prediction efficiency is improved, thereby improving coding compression efficiency of a video sequence.

However, in related technologies, a common characteristic of encoded/decoded images in each video segment needs to be analyzed on both an encoder side and a decoder side to obtain a reference image. Consequently, complexity and power consumption of the decoder side are increased. Alternatively, a reference image generated by an encoder side needs to be additionally transmitted to a decoder side, resulting in a sharp increase in a bit rate of a bitstream and causing a transmission delay.

SUMMARY

The present disclosure provides a reference image encoding method, a reference image decoding method, a reference image encoding device, and a reference image decoding device, so as to update a background reference image by using local information of a subsequent reference image, so that coding compression efficiency is improved without increasing computational complexity of a decoder side; and only a little indication information is transmitted or indication information is not transmitted, thereby avoiding a transmission delay.

According to a first aspect, a reference image decoding method is provided, including: parsing a bitstream, to obtain a reconstructed image of a first reference image and a reconstructed image of a second reference image, where the first reference image is decoded before the second reference image; before the parsing a bitstream, to obtain a reconstructed image of a second reference image, or during the parsing a bitstream, to obtain a reconstructed image of a second reference image, or after the parsing a bitstream, to obtain a reconstructed image of a second reference image, parsing the bitstream, to obtain reference image update information, and determining, according to the reference image update information, whether a local area in the second reference image is used to update a corresponding area or a related area in the first reference image, where a size of the local area is less than or equal to a size of the second reference image; and when it is determined, according to the reference image update information, that the local area in the second reference image is used to update the corresponding area or the related area in the first reference image, replacing a pixel value of the corresponding area or the related area in the first reference image with a pixel value of the local area in the second reference image.

With reference to the first aspect, in a first possible implementation of the first aspect, the parsing the bitstream, to obtain reference image update information, and determining, according to the reference image update information, whether a local area in the second reference image is used to update a corresponding area or a related area in the first reference image includes: parsing the bitstream, to obtain a flag; and determining, if the flag is a first value, that the local area in the second reference image is used to update the corresponding area or the related area in the first reference image; or determining, if the flag is a second value, that the local area in the second reference image is not used to update the corresponding area or the related area in the first reference image, where the first value is different from the second value.

With reference to the first aspect, in a second possible implementation of the first aspect, the parsing the bitstream, to obtain reference image update information, and determining, according to the reference image update information, whether a local area in the second reference image is used to update a corresponding area or a related area in the first reference image includes: parsing the bitstream, to obtain coding information, and determining, according to the coding information and a preset rule, whether the local area in the second reference image is used to update the corresponding area or the related area in the first reference image.

With reference to the second possible implementation of the first aspect, in a third possible implementation of the first aspect, the method further includes: determining the coding information; and
the coding information includes a quantization parameter offset value of the local area in the second reference image; and correspondingly, the determining, according to the coding information and a preset rule, whether the local area in the second reference image is used to update the corresponding area or the related area in the first reference image includes: determining, when an absolute value of the quantization parameter offset value falls within a first value range, that the local area in the second reference image is used to update the corresponding area or the related area in the first reference image; or determining, when an absolute value of the quantization parameter offset value falls outside a first value range, that the local area in the second reference image is not used to update the corresponding area or the related area in the first reference image.

With reference to the third possible implementation of the first aspect, in a fourth possible implementation of the first aspect, the first value range is greater than or equal to 10, and is less than 20.

With reference to the second possible implementation of the first aspect, in a fifth possible implementation of the first aspect, the method further includes: determining the coding information; and
the coding information includes a scale factor of a quantization step of the local area in the second reference image; and correspondingly, the determining, according to the coding information and a preset rule, whether the local area in the second reference image is used to update the corresponding area or the related area in the first reference image includes: determining, when the scale factor of the quantization step falls within a second value range, that the local area in the second reference image is used to update the corresponding area or the related area in the first reference image; or determining, when the scale factor of the quantization step falls outside a second value range, that the local area in the second reference image is not used to update the corresponding area or the related area in the first reference image.

With reference to the fifth possible implementation of the first aspect, in a sixth possible implementation of the first aspect, the determining, when the scale factor of the quantization step falls within a second value range, that the local area in the second reference image is used to update the corresponding area or the related area in the first reference image includes: determining, when the scale factor of the quantization step is greater than or equal to 0.5, and is less than 1, or the scale factor is less than or equal to 1.5, and is greater than 1, that the local area in the second reference image is used to update the corresponding area or the related area in the first reference image.

With reference to any one of the first aspect, or the first to the sixth possible implementations of the first aspect, in a seventh possible implementation of the first aspect, the corresponding area in the first reference image is an area that is in the first reference image and that has same location coordinates as the local area in the second reference image.

With reference to any one of the first aspect, or the first to the sixth possible implementations of the first aspect, in an eighth possible implementation of the first aspect, the reference image update information further includes spatial offsets between location coordinates of the local area and location coordinates of the related area in the first reference image, and the spatial offsets include a lateral offset and a longitudinal offset; and correspondingly, the method further includes:

determining a location of the related area in the first reference image according to the location coordinates of the local area in the second reference image and the spatial offsets.

With reference to any one of the first aspect, or the first to the eighth possible implementations of the first aspect, in a ninth possible implementation of the first aspect, the method further includes: performing filtering at a boundary between the corresponding area or the related area in the first reference image after pixel value replacement and a neighboring area.

With reference to any one of the first aspect, or the first to the ninth possible implementations of the first aspect, in a tenth possible implementation of the first aspect, the first reference image is a first frame of reconstructed image obtained by parsing the bitstream.

With reference to any one of the first aspect, or the first to the ninth possible implementations of the first aspect, in an eleventh possible implementation of the first aspect, the first reference image is a random access point image obtained by parsing the bitstream.

With reference to any one of the first aspect, or the first to the eleventh possible implementations of the first aspect, in a twelfth possible implementation of the first aspect, the local area in the second reference image is one of a largest coding unit, a coding unit, a coding unit group, or an image area of a preset size.

With reference to the first aspect, in a thirteenth possible implementation of the first aspect, the parsing a bitstream, to obtain a reconstructed image of a first reference image includes: parsing the bitstream, to obtain a particular picture order count of the first reference image, and obtain the reconstructed image of the first reference image having the particular picture order count.

With reference to the first aspect or the thirteenth possible implementation of the first aspect, in a fourteenth possible implementation of the first aspect, the parsing a bitstream, to obtain a reconstructed image of a second reference image further includes: parsing the bitstream, to obtain a particular picture order count of the second reference image, and obtain the reconstructed image of the second reference image having the particular picture order count of the second reference image, where the particular picture order count of the second reference image is associated with the particular picture order count of the first reference image that is updated by using the second reference image.

According to a second aspect, a reference image decoding method is provided, including: parsing a bitstream, to obtain a reconstructed image of a first reference image and a reconstructed image of a second reference image, where the first reference image is decoded before the second reference image; before the parsing a bitstream, to obtain a reconstructed image of a second reference image, or during the parsing a bitstream, to obtain a reconstructed image of a second reference image, or after the parsing a bitstream, to obtain a reconstructed image of a second reference image, parsing the bitstream, to obtain reference image update information, and determining, according to the reference image update information, whether a local area in the second reference image is suitable for updating a corresponding area or a related area in the first reference image, where a size of the local area is less than or equal to a size of the second reference image; determining whether the corresponding area or the related area in the first reference image is updated; and when the corresponding area or the related area in the first reference image is not updated, and it is determined, according to the reference image update information, that the local area in the second reference image is suitable for updating the corresponding area or the related area in the first reference image, replacing a pixel value of the corresponding area or the related area in the first reference image with a pixel value of the local area in the second reference image.

With reference to the second aspect, in a first possible implementation of the second aspect, the parsing the bitstream, to obtain reference image update information, and determining, according to the reference image update information, whether a local area in the second reference image is suitable for updating a corresponding area or a related area in the first reference image includes: parsing the bitstream, to obtain a flag; and determining, if the flag is a first value, that the local area in the second reference image is suitable for updating the corresponding area or the related area in the first reference image; or determining, if the flag is a second value, that the local area in the second reference image is not suitable for updating the corresponding area or the related area in the first reference image, where the first value is different from the second value.

With reference to the second aspect, in a second possible implementation of the second aspect, the parsing the bitstream, to obtain reference image update information, and determining, according to the reference image update information, whether a local area in the second reference image is suitable for updating a corresponding area or a related area in the first reference image includes: parsing the bitstream, to obtain coding information, and determining, according to the coding information and a preset rule, whether the local area in the second reference image is suitable for updating the corresponding area or the related area in the first reference image.

With reference to the second possible implementation of the second aspect, in a third possible implementation of the second aspect, the method further includes: determining the coding information; and the coding information includes transform coefficient information of the local area in the second reference image, and the transform coefficient information includes a sum of absolute values of transform coefficients within coverage of the local area; and correspondingly, the determining, according to the coding information and a preset rule, whether the local area in the second reference image is suitable for updating the corresponding area or the related area in the first reference image includes:

determining, when the sum of the absolute values of the transform coefficients within the coverage of the local area is greater than a first threshold, that the local area in the second reference image is suitable for updating the corresponding area or the related area in the first reference image; otherwise, determining that the local area in the second reference image is not suitable for updating the corresponding area or the related area in the first reference image.

With reference to the second possible implementation of the second aspect, in a fourth possible implementation of the second aspect, the method further includes: determining the coding information; and the coding information includes transform coefficient information of the local area in the second reference image, and the transform coefficient information includes an average value of absolute values of transform coefficients within coverage of the local area; and correspondingly, the determining, according to the coding information and a preset rule, whether the local area in the second reference image is used to update the first reference image includes:

determining, when the average value of the absolute values of the transform coefficients within the coverage of the local area is greater than a second threshold, that the local area in the second reference image is suitable for updating the corresponding area or the related area in the first reference image; otherwise, determining that the local area in the second reference image is not suitable for updating the corresponding area or the related area in the first reference image.

With reference to the second possible implementation of the second aspect, in a fifth possible implementation of the second aspect, the method further includes: determining the coding information; and the coding information includes a quantization parameter offset value of the local area in the second reference image; and correspondingly, the determining, according to the coding information and a preset rule, whether the local area in the second reference image is suitable for updating the corresponding area or the related area in the first reference image includes: determining, when an absolute value of the quantization parameter offset value falls within a first value range, that the local area in the second reference image is suitable for updating the corresponding area or the related area in the first reference image; or determining, when an absolute value of the quantization parameter offset value falls outside a first value range, that the local area in the second reference image is not suitable for updating the corresponding area or the related area in the first reference image.

With reference to the fifth possible implementation of the second aspect, in a sixth possible implementation of the second aspect, the first value range is greater than or equal to 10, and is less than 20.

With reference to the second possible implementation of the second aspect, in a seventh possible implementation of the second aspect, the method further includes: determining the coding information; and the coding information includes a scale factor of a quantization step of the local area in the second reference image; and correspondingly, the determining, according to the coding information and a preset rule, whether the local area in the second reference image is suitable for updating the corresponding area or the related area in the first reference image includes: determining, when the scale factor of the quantization step falls within a second value range, that the local area in the second reference image is suitable for updating the corresponding area or the related area in the first reference image; or determining, when the scale factor of the quantization step falls outside a second value range, that the local area in the second reference image is not suitable for updating the corresponding area or the related area in the first reference image.

With reference to the seventh possible implementation of the second aspect, in an eighth possible implementation of the second aspect, the determining, when the scale factor of the quantization step falls within a second value range, that the local area in the second reference image is used to update the corresponding area or the related area in the first reference image includes: determining, when the scale factor of the quantization step is greater than or equal to 0.5, and is less than 1, or the scale factor is less than or equal to 1.5, and is greater than 1, that the local area in the second reference image is used to update the corresponding area or the related area in the first reference image.

With reference to the second possible implementation of the second aspect, in a ninth possible implementation of the second aspect, the method further includes: determining the coding information; and the coding information includes motion vector information of the local area in the second reference image, and the motion vector information includes an average value of absolute values of lateral motion vectors in the local area and an average value of absolute values of longitudinal motion vectors in the local area; and correspondingly, the determining, according to the coding information and a preset rule, whether the local area in the second reference image is suitable for updating the corresponding area or the related area in the first reference image includes: determining, when the average value of the absolute values of the lateral motion vectors in the local area and the average value of the absolute values of the longitudinal motion vectors in the local area are both less than a third threshold, that the local area in the second reference image is suitable for updating the corresponding area or the related area in the first reference image; otherwise, determining that the local area in the second reference image is not suitable for updating the corresponding area or the related area in the first reference image.

With reference to the second possible implementation of the second aspect, in a tenth possible implementation of the second aspect, the method further includes: determining the coding information; and the coding information includes motion vector information of the local area in the second reference image, and the motion vector information includes an average value of a sum of absolute values of lateral motion vectors in the local area and absolute values of longitudinal motion vectors in the local area, and an average value of a sum of absolute values of lateral motion vectors in a previous decoded frame of the second reference image and absolute values of longitudinal motion vectors in the previous decoded frame of the second reference image; and correspondingly, the determining, according to the coding information and a preset rule, whether the local area in the second reference image is suitable for updating the corresponding area or the related area in the first reference image includes: determining, when the average value of the sum of the absolute values of the lateral motion vectors in the local area and the sum of the absolute values of the longitudinal motion vectors in the local area is less than the average value of the sum of the absolute values of the lateral motion vectors in the previous decoded frame and the sum of the absolute values of the longitudinal motion vectors in the previous decoded frame, that the local area in the second reference image is suitable for updating the corresponding area or the related area in the first reference image; otherwise, determining that the local area in the second reference image is not suitable for updating the corresponding area or the related area in the first reference image.

With reference to any one of the second aspect, or the first to the tenth possible implementations of the second aspect, in an eleventh possible implementation of the second aspect, the corresponding area in the first reference image is an area that is in the first reference image and that has same location coordinates as the local area in the second reference image.

With reference to any one of the second aspect, or the first to the tenth possible implementations of the second aspect, in a twelfth possible implementation of the second aspect, when an area that is in the first reference image and that has same location coordinates as the local area in the second reference image is updated, areas in the first reference image are sequentially searched in a preset order, where the corresponding area in the first reference image is a first area that is not updated in the order; otherwise, the corresponding area in the first reference image is an area that is in the first reference image and that has same location coordinates as the local area in the second reference image.

With reference to any one of the second aspect, or the first to the tenth possible implementations of the second aspect, in a thirteenth possible implementation of the second aspect, the parsing the bitstream, to obtain reference image update information, and determining, according to the reference image update information, whether a local area in the second reference image is used to update a corresponding area or a related area in the first reference image further includes: obtaining spatial offsets between location coordinates of the local area and location coordinates of the related area in the first reference image, where the spatial offsets include a lateral offset and a longitudinal offset; and the method further includes: before the replacing a pixel value of the corresponding area or the related area in the first reference image with a pixel value of the local area in the second reference image, determining a location of the related area in the first reference image according to the location coordinates of the local area in the second reference image and the spatial offsets.

With reference to any one of the second aspect, or the first to the thirteenth possible implementations of the second aspect, in a fourteenth possible implementation of the second aspect, the method further includes: performing filtering at a boundary between the corresponding area or the related area in the first reference image after pixel value replacement and a neighboring area.

With reference to any one of the second aspect, or the first to the fourteenth possible implementations of the second aspect, in a fifteenth possible implementation of the second aspect, the method further includes: the first reference image is a first frame of reconstructed image obtained by parsing the bitstream.

With reference to any one of the second aspect, or the first to the fourteenth possible implementations of the second aspect, in a sixteenth possible implementation of the second aspect, the method further includes: the first reference image is a random access point image obtained by parsing the bitstream.

With reference to any one of the second aspect, or the first to the sixteenth possible implementations of the second aspect, in a seventeenth possible implementation of the second aspect, the method further includes: the local area in the second reference image is one of a largest coding unit, a coding unit, a coding unit group, or an image area of a preset size.

With reference to the second aspect, in a eighteenth possible implementation of the second aspect, the parsing a bitstream, to obtain a reconstructed image of a first reference image includes: parsing the bitstream, to obtain a particular picture order count of the first reference image, and obtain the reconstructed image of the first reference image having the particular picture order count.

With reference to the second aspect or the seventeenth possible implementation of the second aspect, in an nineteenth possible implementation of the second aspect, the parsing a bitstream, to obtain a reconstructed image of a second reference image includes: parsing the bitstream, to obtain a particular picture order count of the second reference image, and obtain the reconstructed image of the second reference image having the particular picture order count of the second reference image, where the particular picture order count of the second reference image is associated with the particular picture order count of the first reference image that is updated by using the second reference image.

According to a third aspect, a reference image encoding method is provided, including: encoding a to-be-encoded sequence, to obtain a reconstructed image of a first reference image, and encoding a second reference image, to obtain a reconstructed image of the second reference image, where the first reference image is encoded before the second reference image; determining whether a local area in the second reference image is suitable for updating a corresponding area or a related area in the first reference image, where a size of the local area is less than or equal to a size of the second reference image; determining whether the corresponding area or the related area in the first reference image is updated; when the corresponding area or the related area in the first reference image is not updated, and it is determined, that the local area in the second reference image is suitable for updating the corresponding area or the related area in the first reference image, replacing a pixel value of the corresponding area or the related area in the first reference image with a pixel value of the local area in the second reference image; and compiling, into the bitstream, reference image update information used to determine whether the local area in the second reference image is used to update the corresponding area or the related area in the first reference image.

With reference to the third aspect, in a first possible implementation of the third aspect, the determining whether a local area in the second reference image is suitable for updating a corresponding area or a related area in the first reference image includes:
  obtaining a first area that is in a to-be-encoded image of the second reference image and that has same location coordinates as the local area, and a second area that is in an to-be-encoded image of a previous frame of the second reference image and that has the same location coordinates as the local area;
  calculating a mean square error of all pixels in the first area and the second area; and
  determining, when the mean square error is less than a fourth threshold, that the local area in the second reference image is suitable for updating the corresponding area or the related area in the first reference image; otherwise, determining that the local area in the second reference image is not suitable for updating the corresponding area or the related area in the first reference image.

With reference to the third aspect, in a second possible implementation of the third aspect, the determining whether a local area in the second reference image is suitable for updating a corresponding area or a related area in the first reference image includes:

obtaining a to-be-encoded image of the local area to perform inter-frame prediction, to obtain a prediction image of the local area;

calculating an average value of absolute values of lateral axis prediction differences and absolute values of longitudinal axis prediction differences of all pixels in the to-be-encoded image of the local area and the prediction image of the local area; and determining, when the average value is less than a fifth threshold, that the local area in the second reference image is suitable for updating the corresponding area or the related area in the first reference image; otherwise, determining that the local area in the second reference image is not suitable for updating the corresponding area or the related area in the first reference image.

With reference to the third aspect, in a fourth possible implementation of the third aspect, the determining whether a local area in the second reference image is suitable for updating a corresponding area or a related area in the first reference image includes:

obtaining transform coefficient information of the local area in the second reference image, where the transform coefficient information includes a sum of absolute values of transform coefficients within coverage of the local area; and determining, when the sum of the absolute values of the transform coefficients within the coverage of the local area is greater than a sixth threshold, that the local area in the second reference image is suitable for updating the corresponding area or the related area in the first reference image; otherwise, determining that the local area in the second reference image is not suitable for updating the corresponding area or the related area in the first reference image.

With reference to the third aspect, in a fifth possible implementation of the third aspect, the determining whether a local area in the second reference image is suitable for updating a corresponding area or a related area in the first reference image includes:

obtaining transform coefficient information of the local area in the second reference image, where the transform coefficient information includes an average value of absolute values of transform coefficients within coverage of the local area; and determining, when the average value of the absolute values of the transform coefficients within the coverage of the local area is greater than a seventh threshold, that the local area in the second reference image is suitable for updating the corresponding area or the related area in the first reference image; otherwise, determining that the local area in the second reference image is not suitable for updating the corresponding area or the related area in the first reference image.

With reference to the third aspect, in a sixth possible implementation of the third aspect, the determining whether a local area in the second reference image is suitable for updating a corresponding area or a related area in the first reference image includes:

counting a quantity of bits for encoding the local area in the second reference image and a quantity of bits for encoding a previous encoded area of the corresponding area or the related area in the first reference image; and determining, when the quantity of bits for encoding the local area in the second reference image is greater than the quantity of bits for encoding the previous encoded area of the corresponding area or the related area in the first reference image, that the local area in the second reference image is suitable for updating the corresponding area or the related area in the first reference image; otherwise, determining that the local area in the second reference image is not suitable for updating the corresponding area or the related area in the first reference image.

With reference to the third aspect, in a seventh possible implementation of the third aspect, the determining whether a local area in the second reference image is suitable for updating a corresponding area or a related area in the first reference image includes:

counting a quantity of bits for encoding the local area in the second reference image and an average quantity of bits for encoding an area in a previous encoded frame of the corresponding area or the related area in the first reference image; and determining, when the quantity of bits for encoding the local area in the second reference image is greater than the average quantity of bits for encoding the area in the previous encoded frame of the corresponding area or the related area in the first reference image, that the local area in the second reference image is suitable for updating the corresponding area or the related area in the first reference image; otherwise, determining that the local area in the second reference image is not suitable for updating the corresponding area or the related area in the first reference image.

With reference to the third aspect, in an eighth possible implementation of the third aspect, the determining whether a local area in the second reference image is suitable for updating a corresponding area or a related area in the first reference image includes:

obtaining motion vector information of the local area in the second reference image, where the motion vector information includes an average value of absolute values of lateral motion vectors in the local area and an average value of absolute values of longitudinal motion vectors in the local area; and determining, when the average value of the absolute values of the lateral motion vectors in the local area and the average value of the absolute values of the longitudinal motion vectors in the local area are both less than an eighth threshold, that the local area in the second reference image is suitable for updating the corresponding area or the related area in the first reference image; otherwise, determining that the local area in the second reference image is not suitable for updating the corresponding area or the related area in the first reference image.

With reference to the third aspect, in a ninth possible implementation of the third aspect, the determining whether a local area in the second reference image is suitable for updating a corresponding area or a related area in the first reference image includes:

obtaining motion vector information of the local area in the second reference image, where the motion vector information includes an average value of a sum of absolute values of lateral motion vectors in the local area and absolute values of longitudinal motion vectors in the local area, and an average value of a sum of absolute values of lateral motion vectors in a previous encoded frame of the second reference image and absolute values of longitudinal motion vectors in the previous encoded frame of the second reference image; and determining, when the average value of the sum of the absolute values of the lateral motion vectors in the local area and the sum of the absolute values of the longitudinal motion vectors in the local area is less than the average value of the sum of the absolute values of the lateral motion vectors in the previous encoded frame and the sum of the absolute values of the longitudinal motion vectors in the previous encoded frame, that the local area in the second reference image is suitable for updating the corresponding area or the related area in the first reference image; otherwise, determining that the local area in the second reference image is not suitable for updating the corresponding area or the related area in the first reference image.

With reference to the third aspect, in a tenth possible implementation of the third aspect, the reference image update information includes:

a flag for determining whether the local area in the second reference image is used to update the corresponding area or the related area in the first reference image; and correspondingly, the compiling, into the bitstream, reference image update information used to determine whether the local area in the second reference image is used to update the corresponding area or the related area in the first reference image includes: compiling a value of the flag into the bitstream, where when the local area in the second reference image is used to update the corresponding area or the related area in the first reference image, the flag is a first value; or when the local area in the second reference image is not used to update the corresponding area or the related area in the first reference image, the flag is a second value; and the first value is different from the second value.

With reference to the third aspect, in an eleventh possible implementation of the third aspect, the reference image update information includes:

a quantization parameter offset value of the local area in the second reference image; and correspondingly, the compiling, into the bitstream, reference image update information used to determine whether the local area in the second reference image is used to update the corresponding area or the related area in the first reference image includes: compiling the quantization parameter offset value into the bitstream, where when the local area in the second reference image is used to update the corresponding area or the related area in the first reference image, an absolute value of the quantization parameter offset value falls within a third value range; or when the local area in the second reference image is not used to update the corresponding area or the related area in the first reference image, an absolute value of the quantization parameter offset value falls outside a third value range.

With reference to the eleventh possible implementation of the third aspect, in a twelfth possible implementation of the third aspect, the third value range is greater than or equal to 10, and is less than 20.

With reference to the third aspect, in a thirteenth possible implementation of the third aspect, the reference image update information includes:

a scale factor of a quantization step of the local area in the second reference image; and correspondingly, the compiling, into the bitstream, reference image update information used to determine whether the local area in the second reference image is used to update the corresponding area or the related area in the first reference image includes: compiling the scale factor of the quantization step into the bitstream, where when the local area in the second reference image is used to update the corresponding area or the related area in the first reference image, the scale factor of the quantization step falls within a fourth value range; or when the local area in the second reference image is not used to update the corresponding area or the related area in the first reference image, the scale factor of the quantization step falls outside a fourth value range.

With reference to the thirteenth possible implementation of the third aspect, in a fourteenth possible implementation of the third aspect, when the local area in the second reference image is used to update the corresponding area or the related area in the first reference image, the scale factor of the quantization step is greater than or equal to 0.5, and is less than 1; or the scale factor is less than or equal to 1.5, and is greater than 1.

With reference to the third aspect, in a fifteenth possible implementation of the third aspect, the reference image update information includes:

transform coefficient information of the local area in the second reference image, where the transform coefficient information includes a sum of absolute values of transform coefficients within coverage of the local area; and correspondingly, the compiling, into the bitstream, reference image update information used to determine whether the local area in the second reference image is used to update the corresponding area or the related area in the first reference image includes: compiling the transform coefficient information into the bitstream; and determining, when the sum of the absolute values of the transform coefficients within the coverage of the local area is greater than a ninth threshold, and the corresponding area or the related area in the first reference image is not updated, that the local area in the second reference image is used to update the corresponding area or the related area in the first reference image; otherwise, determining that the local area in the second reference image is not used to update the corresponding area or the related area in the first reference image.

With reference to the third aspect, in a sixteenth possible implementation of the third aspect, the reference image update information includes:

transform coefficient information of the local area in the second reference image, where the transform coefficient information includes an average value of absolute values of transform coefficients within coverage of the local area; and correspondingly, the compiling, into the bitstream, reference image update information used to determine whether the local area in the second reference image is used to update the corresponding area or the related area in the first reference image includes: compiling the transform coefficient information into the bitstream; and determining, when the average value of the absolute values of the transform coefficients within the coverage of the local area is greater than a tenth threshold, and the corresponding area or the related area in the first reference image is not updated, that the local area in the second reference image is used to update the corresponding area or the related area in the first reference image; otherwise, determining that the local area in the second reference image is not used to update the corresponding area or the related area in the first reference image.

With reference to the third aspect, in a seventeenth possible implementation of the third aspect, the reference image update information includes:
motion vector information of the local area in the second reference image, where the motion vector information includes an average value of absolute values of lateral motion vectors in the local area and an average value of absolute values of longitudinal motion vectors in the local area; and
correspondingly, the compiling, into the bitstream, reference image update information used to determine whether the local area in the second reference image is used to update the corresponding area or the related area in the first reference image includes: compiling the motion vector information into the bitstream; and determining, when the average value of the absolute values of the lateral motion vectors in the local area and the average value of the absolute values of the longitudinal motion vectors in the local area are both less than an eleventh threshold, and the corresponding area or the related area in the first reference image is not updated, that the local area in the second reference image is used to update the corresponding area or the related area in the first reference image; otherwise, determining that the local area in the second reference image is not used to update the corresponding area or the related area in the first reference image.

With reference to the third aspect, in an eighteenth possible implementation of the third aspect, the reference image update information includes:
motion vector information of the local area in the second reference image, where the motion vector information includes an average value of a sum of absolute values of lateral motion vectors in the local area and absolute values of longitudinal motion vectors in the local area, and an average value of a sum of absolute values of lateral motion vectors in a previous encoded frame of the second reference image and absolute values of longitudinal motion vectors in the previous encoded frame of the second reference image; and
correspondingly, the compiling, into the bitstream, reference image update information used to determine whether the local area in the second reference image is used to update the corresponding area or the related area in the first reference image includes: compiling the motion vector information into the bitstream; and determining, when the average value of the sum of the absolute values of the lateral motion vectors in the local area and the sum of the absolute values of the longitudinal motion vectors in the local area is less than the average value of the sum of the absolute values of the lateral motion vectors in the previous encoded frame and the sum of the absolute values of the longitudinal motion vectors in the previous encoded frame, and the corresponding area or the related area in the first reference image is not updated, that the local area in the second reference image is used to update the corresponding area or the related area in the first reference image; otherwise, determining that the local area in the second reference image is not used to update the corresponding area or the related area in the first reference image.

With reference to the third aspect, in a nineteenth possible implementation of the third aspect, the encoding a to-be-encoded sequence, to obtain a reconstructed image of a second reference image includes:
encoding a to-be-encoded image of the second reference image by using a fixed quantization parameter, where a first quantization parameter is used for the local area, and a second quantization parameter for an area that is not the local area.

With reference to the nineteenth possible implementation of the third aspect, in a twentieth possible implementation of the third aspect, the method further includes:
when the second quantization parameter is greater than or equal to 0, and is less than 10, the first quantization parameter is the second quantization parameter; when the second quantization parameter is greater than or equal to 10, and is less than 37, the first quantization parameter is the second quantization parameter minus 5; or when the second quantization parameter is greater than or equal to 37, and is less than or equal to 51, the first quantization parameter is the second quantization parameter minus 10.

With reference to the third aspect, in a twenty-first possible implementation of the third aspect, the encoding a to-be-encoded sequence, to obtain a reconstructed image of a second reference image includes:
encoding a to-be-encoded image of the second reference image by using an adaptive quantization parameter, where a quantization parameter is determined for the local area according to at least one of texture information or motion information, and for an area that is not the local area, a frame-level quantization parameter is used or a quantization parameter is set and determined according to a bit rate allocation policy or a quality control policy specified by an encoder.

With reference to any one of the third aspect, or the first to the twenty-first possible implementations of the third aspect, in a twenty-second possible implementation of the third aspect, the corresponding area in the first reference image is an area that is in the first reference image and that has same location coordinates as the local area in the second reference image.

With reference to any one of the third aspect, or the first to the twenty-first possible implementations of the third aspect, in a twenty-third possible implementation of the third aspect, when an area that is in the first reference image and that has same location coordinates as the local area in the second reference image is updated, areas in the first reference image are sequentially searched in a preset order, where the corresponding area in the first reference image is a first area that is not updated in the order; otherwise, the corresponding area in the first reference image is an area that is in the first reference image and that has same location coordinates as the local area in the second reference image.

With reference to any one of the third aspect, or the first to the twenty-first possible implementations of the third aspect, in a twenty-fourth possible implementation of the third aspect, the reference image update information further includes spatial offsets between the location coordinates of the local area and location coordinates of the related area in the first reference image, and the spatial offsets include a lateral offset and a longitudinal offset; and correspondingly, the method further includes:
compiling the spatial offsets into the bitstream.

With reference to any one of the third aspect, or the first to the twenty-fourth possible implementations of the third aspect, in a twenty-fifth possible implementation of the third aspect, the method further includes: performing filtering at a boundary between the corresponding area or the related area in the first reference image after pixel value replacement and a neighboring area.

With reference to any one of the third aspect, or the first to the twenty-fifth possible implementations of the third aspect, in a twenty-sixth possible implementation of the third aspect, the method further includes: the first reference image is a first frame of reconstructed image obtained by encoding the to-be-encoded sequence.

With reference to any one of the third aspect, or the first to the twenty-fifth possible implementations of the third aspect, in a twenty-seventh possible implementation of the third aspect, the method further includes: the first reference image is a random access point image obtained by encoding the to-be-encoded sequence.

With reference to any one of the third aspect, or the first to the twenty-seventh possible implementations of the third aspect, in a twenty-eighth possible implementation of the third aspect, the method includes: the local area in the second reference image is one of a largest coding unit, a coding unit, a coding unit group, or an image area of a preset size.

With reference to the third aspect, in a twenty-ninth possible implementation of the third aspect, the encoding a to-be-encoded sequence, to obtain a reconstructed image of a first reference image further includes: detecting the to-be-encoded sequence; determining whether the first reference image is a scene switchover image; determining a particular picture order count of the first reference image; and compiling the particular picture order count into the bitstream before or after a to-be-encoded image of the first reference image is encoded.

With reference to the third aspect, in a thirtieth possible implementation of the third aspect, the encoding a to-be-encoded sequence, to obtain a reconstructed image of a second reference image further includes: determining a particular picture order count of the first reference image that is updated by using the second reference image; and compiling the particular picture order count or a number associated with the particular picture order count into the bitstream before or after a to-be-encoded image of the second reference image is encoded.

According to a fourth aspect, a reference image decoding device is provided, including: a first decoding module, configured to parse a bitstream, to obtain a reconstructed image of a first reference image and a reconstructed image of a second reference image, where the first reference image is decoded before the second reference image; a second decoding module, configured to: before the bitstream is parsed, to obtain the reconstructed image of the second reference image, or when the bitstream is parsed, to obtain the reconstructed image of the second reference image, or after the bitstream is parsed, to obtain the reconstructed image of the second reference image, parse the bitstream, to obtain reference image update information, and determine, according to the reference image update information, whether a local area in the second reference image is used to update a corresponding area or a related area in the first reference image, where a size of the local area is less than or equal to a size of the second reference image; and a third decoding module, configured to: when it is determined, according to the reference image update information, that the local area in the second reference image is used to update the corresponding area or the related area in the first reference image, replace a pixel value of the corresponding area or the related area in the first reference image with a pixel value of the local area in the second reference image.

With reference to the fourth aspect, in a first possible implementation of the fourth aspect, the second decoding module is specifically configured to: parse the bitstream, to obtain a flag; and determine, if the flag is a first value, that the local area in the second reference image is used to update the corresponding area or the related area in the first reference image; or determine, if the flag is a second value, that the local area in the second reference image is not used to update the corresponding area or the related area in the first reference image, where the first value is different from the second value.

With reference to the fourth aspect, in a second possible implementation of the fourth aspect, the second decoding module is specifically configured to: parse the bitstream, to obtain coding information, and determine, according to the coding information and a preset rule, whether the local area in the second reference image is used to update the corresponding area or the related area in the first reference image.

With reference to the second possible implementation of the fourth aspect, in a third possible implementation of the fourth aspect, the method further includes: determining the coding information; and the coding information includes a quantization parameter offset value of the local area in the second reference image; and correspondingly, the second decoding module is specifically configured to: determine, when an absolute value of the quantization parameter offset value falls within a first value range, that the local area in the second reference image is used to update the corresponding area or the related area in the first reference image; or determine, when an absolute value of the quantization parameter offset value falls outside a first value range, that the local area in the second reference image is not used to update the corresponding area or the related area in the first reference image.

With reference to the third possible implementation of the fourth aspect, in a fourth possible implementation of the fourth aspect, the method further includes: the first value range is greater than or equal to 10, and is less than 20.

With reference to the second possible implementation of the fourth aspect, in a fifth possible implementation of the fourth aspect, the method further includes: determining the coding information; and the coding information includes a scale factor of a quantization step of the local area in the second reference image; and correspondingly, the second decoding module is specifically configured to: determine, when the scale factor of the quantization step falls within a second value range, that the local area in the second reference image is used to update the corresponding area or the related area in the first reference image; or determine, when the scale factor of the quantization step falls outside a second value range, that the local area in the second reference image is not used to update the corresponding area or the related area in the first reference image.

With reference to the fifth possible implementation of the fourth aspect, in a sixth possible implementation of the fourth aspect, the determining, when the scale factor of the quantization step falls within a second value range, that the local area in the second reference image is used to update the corresponding area or the related area in the first reference image includes: determining, when the scale factor of the quantization step is greater than or equal to 0.5, and is less than 1, or the scale factor is less than or equal to 1.5, and is greater than 1, that the local area in the second reference image is used to update the corresponding area or the related area in the first reference image.

With reference to any one of the fourth aspect, or the first to the sixth possible implementations of the fourth aspect, in a seventh possible implementation of the fourth aspect, the corresponding area in the first reference image is an area that is in the first reference image and that has same location coordinates as the local area in the second reference image.

With reference to any one of the fourth aspect, or the first to the sixth possible implementations of the fourth aspect, in an eighth possible implementation of the fourth aspect, the second decoding module is further specifically configured to: obtain spatial offsets between location coordinates of the local area and location coordinates of the related area in the first reference image, where the spatial offsets include a lateral offset and a longitudinal offset; and before the third decoding module replaces the pixel value of the corresponding area or the related area in the first reference image with the pixel value of the local area in the second reference image, determine a location of the related area in the first reference image according to the location coordinates of the local area in the second reference image and the spatial offsets.

With reference to any one of the fourth aspect, or the first to the eighth possible implementations of the fourth aspect, in a ninth possible implementation of the fourth aspect, the decoding device further includes: a fourth decoding module, where the fourth decoding module is further specifically configured to perform filtering at a boundary between the corresponding area or the related area in the first reference image after pixel value replacement and a neighboring area.

With reference to any one of the fourth aspect, or the first to the ninth possible implementations of the fourth aspect, in a tenth possible implementation of the fourth aspect, the first reference image is a first frame of reconstructed image obtained by parsing the bitstream.

With reference to any one of the fourth aspect, or the first to the ninth possible implementations of the fourth aspect, in an eleventh possible implementation of the fourth aspect, the first reference image is a random access point image obtained by parsing the bitstream.

With reference to any one of the fourth aspect, or the first to the eleventh possible implementations of the fourth aspect, in a twelfth possible implementation of the fourth aspect, the local area in the second reference image is one of a largest coding unit, a coding unit, a coding unit group, or an image area of a preset size.

With reference to the fourth aspect, in a thirteenth possible implementation of the fourth aspect, the first decoding module is further specifically configured to parse the bitstream, to obtain a particular picture order count of the first reference image.

With reference to the fourth aspect or the thirteenth possible implementation of the fourth aspect, in a fourteenth possible implementation of the fourth aspect, the first decoding module is further specifically configured to parse the bitstream, to obtain a particular picture order count of the second reference image, where the particular picture order count is associated with the particular picture order count of the first reference image that is updated by using the second reference image.

According to a fifth aspect, a reference image decoding device is provided, including: a first decoding module, configured to parse a bitstream, to obtain a reconstructed image of a first reference image and a reconstructed image of a second reference image, where the first reference image is decoded before the second reference image; a second decoding module, configured to: before the bitstream is parsed, to obtain the reconstructed image of the second reference image, or when the bitstream is parsed, to obtain the reconstructed image of the second reference image, or after the bitstream is parsed, to obtain the reconstructed image of the second reference image, parse the bitstream, to obtain reference image update information, and determine, according to the reference image update information, whether a local area in the second reference image is suitable for updating a corresponding area or a related area in the first reference image, where a size of the local area is less than or equal to a size of the second reference image; and a third decoding module, configured to: determine whether the corresponding area or the related area in the first reference image is updated; and when the corresponding area or the related area in the first reference image is not updated, and it is determined, according to the reference image update information, that the local area in the second reference image is suitable for updating the corresponding area or the related area in the first reference image, replace a pixel value of the corresponding area or the related area in the first reference image with a pixel value of the local area in the second reference image.

With reference to the fifth aspect, in a first possible implementation of the fifth aspect, the second decoding module is specifically configured to: parse the bitstream, to obtain a flag; and determine, if the flag is a first value, that the local area in the second reference image is suitable for updating the corresponding area or the related area in the first reference image; or determine, if the flag is a second value, that the local area in the second reference image is not suitable for updating the corresponding area or the related area in the first reference image, where the first value is different from the second value.

With reference to the fifth aspect, in a second possible implementation of the fifth aspect, the second decoding module is specifically configured to: parse the bitstream, to obtain coding information, and determine, according to the coding information and a preset rule, whether the local area in the second reference image is suitable for updating the corresponding area or the related area in the first reference image.

With reference to the second possible implementation of the fifth aspect, in a third possible implementation of the fifth aspect, the method further includes: determining the coding information; and the coding information includes transform coefficient information of the local area in the second reference image, and the transform coefficient information includes a sum of absolute values of transform coefficients within coverage of the local area; and correspondingly, the second decoding module is specifically configured to:

determine, when the sum of the absolute values of the transform coefficients within the coverage of the local area is greater than a first threshold, that the local area in the second reference image is suitable for updating the corresponding area or the related area in the first reference image; otherwise, determine that the local area in the second reference image is not suitable for updating the corresponding area or the related area in the first reference image.

With reference to the second possible implementation of the fifth aspect, in a fourth possible implementation of the fifth aspect, the method further includes: determining the coding information; and the coding information includes transform coefficient information of the local area in the second reference image, and the transform coefficient information includes an average value of absolute values of transform coefficients within coverage of the local area; and correspondingly, the second decoding module is specifically configured to:

determine, when the average value of the absolute values of the transform coefficients within the coverage of the local area is greater than a second threshold, that the local area in the second reference image is suitable for updating the corresponding area or the related area in the first reference image; otherwise, determine that the local area in the second reference image is not suitable for updating the corresponding area or the related area in the first reference image.

With reference to the second possible implementation of the fifth aspect, in a fifth possible implementation of the fifth aspect, the method further includes: determining the coding information; and the coding information includes a quantization parameter offset value of the local area in the second reference image; and correspondingly, the second decoding module is specifically configured to: determine, when an absolute value of the quantization parameter offset value falls within a first value range, that the local area in the second reference image is suitable for updating the corresponding area or the related area in the first reference image; or determine, when an absolute value of the quantization parameter offset value falls outside a first value range, that the local area in the second reference image is not suitable for updating the corresponding area or the related area in the first reference image.

With reference to the fifth possible implementation of the fifth aspect, in a sixth possible implementation of the fifth aspect, the method further includes: the first value range is greater than or equal to 10, and is less than 20.

With reference to the second possible implementation of the fifth aspect, in a seventh possible implementation of the fifth aspect, the method further includes: determining the coding information; and the coding information includes a scale factor of a quantization step of the local area in the second reference image; and correspondingly, the second decoding module is specifically configured to: determine, when the scale factor of the quantization step falls within a second value range, that the local area in the second reference image is suitable for updating the corresponding area or the related area in the first reference image; or determine, when the scale factor of the quantization step falls outside a second value range, that the local area in the second reference image is not suitable for updating the corresponding area or the related area in the first reference image.

With reference to the seventh possible implementation of the fifth aspect, in an eighth possible implementation of the fifth aspect, the determining, when the scale factor of the quantization step falls within a second value range, that the local area in the second reference image is used to update the corresponding area or the related area in the first reference image includes: determining, when the scale factor of the quantization step is greater than or equal to 0.5, and is less than 1, or the scale factor is less than or equal to 1.5, and is greater than 1, that the local area in the second reference image is used to update the corresponding area or the related area in the first reference image.

With reference to the second possible implementation of the fifth aspect, in a ninth possible implementation of the fifth aspect, the method further includes: determining the coding information; and the coding information includes motion vector information of the local area in the second reference image, and the motion vector information includes an average value of absolute values of lateral motion vectors in the local area and an average value of absolute values of longitudinal motion vectors in the local area; and correspondingly, the second decoding module is specifically configured to: determine, when the average value of the absolute values of the lateral motion vectors in the local area and the average value of the absolute values of the longitudinal motion vectors in the local area are both less than a third threshold, that the local area in the second reference image is suitable for updating the corresponding area or the related area in the first reference image; otherwise, determine that the local area in the second reference image is not suitable for updating the corresponding area or the related area in the first reference image.

With reference to the second possible implementation of the fifth aspect, in a tenth possible implementation of the fifth aspect, the method further includes: determining the coding information; and the coding information includes motion vector information of the local area in the second reference image, and the motion vector information includes an average value of a sum of absolute values of lateral motion vectors in the local area and absolute values of longitudinal motion vectors in the local area, and an average value of a sum of absolute values of lateral motion vectors in a previous decoded frame of the second reference image and absolute values of longitudinal motion vectors in the previous decoded frame of the second reference image; and correspondingly, the second decoding module is specifically configured to: determine, when the average value of the sum of the absolute values of the lateral motion vectors in the local area and the sum of the absolute values of the longitudinal motion vectors in the local area is less than the average value of the sum of the absolute values of the lateral motion vectors in the previous decoded frame and the sum of the absolute values of the longitudinal motion vectors in the previous decoded frame, that the local area in the second reference image is suitable for updating the corresponding area or the related area in the first reference image; otherwise, determine that the local area in the second reference image is not suitable for updating the corresponding area or the related area in the first reference image.

With reference to any one of the fifth aspect, or the first to the tenth possible implementations of the fifth aspect, in an eleventh possible implementation of the fifth aspect, the corresponding area in the first reference image is an area that is in the first reference image and that has same location coordinates as the local area in the second reference image.

With reference to any one of the fifth aspect, or the first to the tenth possible implementations of the fifth aspect, in a twelfth possible implementation of the fifth aspect, the second decoding module is further specifically configured to: when an area that is in the first reference image and that has same location coordinates as the local area in the second reference image is updated, sequentially search areas in the first reference image in a preset order, where the corresponding area in the first reference image is a first area that is not updated in the order; otherwise, the corresponding area in the first reference image is an area that is in the first reference image and that has same location coordinates as the local area in the second reference image.

With reference to any one of the fifth aspect, or the first to the tenth possible implementations of the fifth aspect, in a thirteenth possible implementation of the fifth aspect, the second decoding module is further specifically configured to: obtain spatial offsets between location coordinates of the local area and location coordinates of the related area in the first reference image, where the spatial offsets include a lateral offset and a longitudinal offset; and before the third decoding module replaces the pixel value of the corresponding area or the related area in the first reference image with the pixel value of the local area in the second reference image, determine a location of the related area in the first reference image according to the location coordinates of the local area in the second reference image and the spatial offsets.

With reference to any one of the fifth aspect, or the first to the thirteenth possible implementations of the fifth aspect, in a fourteenth possible implementation of the fifth aspect, the decoding device further includes: a fourth decoding module, where the fourth decoding module is further specifically configured to perform filtering at a boundary between the corresponding area or the related area in the first reference image after pixel value replacement and a neighboring area.

With reference to any one of the fifth aspect, or the first to the fourteenth possible implementations of the fifth aspect, in a fifteenth possible implementation of the fifth aspect, the decoding device further includes: the first reference image is a first frame of reconstructed image obtained by parsing the bitstream.

With reference to any one of the fifth aspect, or the first to the fourteenth possible implementations of the fifth aspect, in a sixteenth possible implementation of the fifth aspect, the decoding device further includes: the first reference image is a random access point image obtained by parsing the bitstream.

With reference to any one of the fifth aspect, or the first to the sixteenth possible implementations of the fifth aspect, in a seventeenth possible implementation of the fifth aspect, the decoding device further includes: the local area in the second reference image is one of a largest coding unit, a coding unit, a coding unit group, or an image area of a preset size.

With reference to the fifth aspect, in an eighteenth possible implementation of the fifth aspect, the first decoding module is further specifically configured to parse the bitstream, to obtain a particular picture order count of the first reference image.

With reference to the fifth aspect or the seventeenth possible implementation of the fifth aspect, in an eighteenth possible implementation of the fifth aspect, the first decoding module is further specifically configured to parse the bitstream, to obtain a particular picture order count of the second reference image, where the particular picture order count is associated with the particular picture order count of the first reference image that is updated by using the second reference image.

According to a sixth aspect, a reference image encoding device is provided, including: a first encoding module, configured to: encode a to-be-encoded sequence, to obtain a reconstructed image of a first reference image, and encode a second reference image, to obtain a reconstructed image of the second reference image, where the first reference image is encoded before the second reference image; a second encoding module, configured to determine whether a local area in the second reference image is suitable for updating a corresponding area or a related area in the first reference image, where a size of the local area is less than or equal to a size of the second reference image; a third encoding module, configured to: determine whether the corresponding area or the related area in the first reference image is updated; and when the corresponding area or the related area in the first reference image is not updated, and it is determined, that the local area in the second reference image is suitable for updating the corresponding area or the related area in the first reference image, replace a pixel value of the corresponding area or the related area in the first reference image with a pixel value of the local area in the second reference image; and a fourth encoding module, configured to compile, into the bitstream, reference image update information used to determine whether the local area in the second reference image is used to update the corresponding area or the related area in the first reference image.

With reference to the sixth aspect, in a first possible implementation of the sixth aspect, the second encoding module is specifically configured to:
  obtain a first area that is in a to-be-encoded image of the second reference image and that has same location coordinates as the local area, and a second area that is in an to-be-encoded image of a previous frame of the second reference image and that has the same location coordinates as the local area;
  calculate a mean square error of all pixels in the first area and the second area; and
  determine, when the mean square error is less than a fourth threshold, that the local area in the second reference image is suitable for updating the corresponding area or the related area in the first reference image; otherwise, determine that the local area in the second reference image is not suitable for updating the corresponding area or the related area in the first reference image.

With reference to the sixth aspect, in a second possible implementation of the sixth aspect, the second encoding module is specifically configured to:
  obtain a to-be-encoded image of the local area to perform inter-frame prediction, to obtain a prediction image of the local area;
  calculate an average value of absolute values of lateral axis prediction differences and absolute values of longitudinal axis prediction differences of all pixels in the to-be-encoded image of the local area and the prediction image of the local area; and
  determine, when the average value is less than a fifth threshold, that the local area in the second reference image is suitable for updating the corresponding area or the related area in the first reference image; otherwise, determine that the local area in the second reference image is not suitable for updating the corresponding area or the related area in the first reference image.

With reference to the sixth aspect, in a fourth possible implementation of the sixth aspect, the second encoding module is specifically configured to:
  obtain transform coefficient information of the local area in the second reference image, where the transform coefficient information includes a sum of absolute values of transform coefficients within coverage of the local area; and
  determine, when the sum of the absolute values of the transform coefficients within the coverage of the local area is greater than a sixth threshold, that the local area in the second reference image is suitable for updating the corresponding area or the related area in the first reference image; otherwise, determine that the local area in the second reference image is not suitable for updating the corresponding area or the related area in the first reference image.

With reference to the sixth aspect, in a fifth possible implementation of the sixth aspect, the second encoding module is specifically configured to:
  obtain transform coefficient information of the local area in the second reference image, where the transform coefficient information includes an average value of absolute values of transform coefficients within coverage of the local area; and
  determine, when the average value of the absolute values of the transform coefficients within the coverage of the local area is greater than a seventh threshold, that the local area in the second reference image is suitable for updating the corresponding area or the related area in the first reference image; otherwise, determine that the local area in the second reference image is not suitable for updating the corresponding area or the related area in the first reference image.

With reference to the sixth aspect, in a sixth possible implementation of the sixth aspect, the second encoding module is specifically configured to:
  count a quantity of bits for encoding the local area in the second reference image and a quantity of bits for encoding a previous encoded area of the corresponding area or the related area in the first reference image; and
  determine, when the quantity of bits for encoding the local area in the second reference image is greater than the quantity of bits for encoding the previous encoded area of the corresponding area or the related area in the first reference image, that the local area in the second reference image is suitable for updating the corresponding area or the related area in the first reference image; otherwise, determine that the local area in the second reference image is not suitable for updating the corresponding area or the related area in the first reference image.

With reference to the sixth aspect, in a seventh possible implementation of the sixth aspect, the second encoding module is specifically configured to:
  count a quantity of bits for encoding the local area in the second reference image and an average quantity of bits for encoding an area in a previous encoded frame of the corresponding area or the related area in the first reference image; and
  determine, when the quantity of bits for encoding the local area in the second reference image is greater than the average quantity of bits for encoding the area in the previous encoded frame of the corresponding area or the related area in the first reference image, that the local area in the second reference image is suitable for updating the corresponding area or the related area in the first reference image; otherwise, determine that the local area in the second reference image is not suitable for updating the corresponding area or the related area in the first reference image.

With reference to the sixth aspect, in an eighth possible implementation of the sixth aspect, the second encoding module is specifically configured to:
  obtain motion vector information of the local area in the second reference image, where the motion vector information includes an average value of absolute values of lateral motion vectors in the local area and an average value of absolute values of longitudinal motion vectors in the local area; and
  determine, when the average value of the absolute values of the lateral motion vectors in the local area and the average value of the absolute values of the longitudinal motion vectors in the local area are both less than an eighth threshold, that the local area in the second reference image is suitable for updating the corresponding area or the related area in the first reference image; otherwise, determine that the local area in the second reference image is not suitable for updating the corresponding area or the related area in the first reference image.

With reference to the sixth aspect, in a ninth possible implementation of the sixth aspect, the second encoding module is specifically configured to:
  obtain motion vector information of the local area in the second reference image, where the motion vector information includes an average value of a sum of absolute values of lateral motion vectors in the local area and absolute values of longitudinal motion vectors in the local area, and an average value of a sum of absolute values of lateral motion vectors in a previous encoded frame of the second reference image and absolute values of longitudinal motion vectors in the previous encoded frame of the second reference image; and
  determine, when the average value of the sum of the absolute values of the lateral motion vectors in the local area and the sum of the absolute values of the longitudinal motion vectors in the local area is less than the average value of the sum of the absolute values of the lateral motion vectors in the previous encoded frame and the sum of the absolute values of the longitudinal motion vectors in the previous encoded frame, that the local area in the second reference image is suitable for updating the corresponding area or the related area in the first reference image; otherwise, determine that the local area in the second reference image is not suitable for updating the corresponding area or the related area in the first reference image.

With reference to the sixth aspect, in a tenth possible implementation of the sixth aspect, the reference image update information comprises a flag for determining whether the local area in the second reference image is used to update the corresponding area or the related area in the first reference image; and correspondingly, the fourth encoding module is specifically configured to: compile a value of the flag into the bitstream, where when the local area in the second reference image is used to update the corresponding area or the related area in the first reference image, the flag is a first value; or when the local area in the second reference image is not used to update the corresponding area or the related area in the first reference image, the flag is a second value; and the first value is different from the second value.

With reference to the sixth aspect, in an eleventh possible implementation of the sixth aspect, the reference image update information includes:
  a quantization parameter offset value of the local area in the second reference image; and
  correspondingly, the fourth encoding module is specifically configured to: compile the quantization parameter offset value into the bitstream, where when the local area in the second reference image is used to update the corresponding area or the related area in the first reference image, an absolute value of the quantization parameter offset value falls within a third value range;

or when the local area in the second reference image is not used to update the corresponding area or the related area in the first reference image, an absolute value of the quantization parameter offset value falls outside a third value range.

With reference to the eleventh possible implementation of the sixth aspect, in a twelfth possible implementation of the sixth aspect, wherein: the third value range is greater than or equal to 10, and is less than 20.

With reference to the sixth aspect, in a thirteenth possible implementation of the sixth aspect, the reference image update information includes:
a scale factor of a quantization step of the local area in the second reference image; and
correspondingly, the fourth encoding module is specifically configured to: compile the scale factor of the quantization step into the bitstream, where when the local area in the second reference image is used to update the corresponding area or the related area in the first reference image, the scale factor of the quantization step falls within a fourth value range; or when the local area in the second reference image is not used to update the corresponding area or the related area in the first reference image, the scale factor of the quantization step falls outside a fourth value range.

With reference to the thirteenth possible implementations of the sixth aspect, in a fourteenth possible implementation of the sixth aspect, wherein when the local area in the second reference image is used to update the corresponding area or the related area in the first reference image, the scale factor of the quantization step is greater than or equal to 0.5, and is less than 1; or the scale factor is less than or equal to 1.5, and is greater than 1.

With reference to the sixth aspect, in a fifteenth possible implementation of the sixth aspect, the reference image update information includes:
transform coefficient information of the local area in the second reference image, where the transform coefficient information includes a sum of absolute values of transform coefficients within coverage of the local area; and
correspondingly, the fourth encoding module is specifically configured to: compile the transform coefficient information into the bitstream; and determine, when the sum of the absolute values of the transform coefficients within the coverage of the local area is greater than a ninth threshold, and the corresponding area or the related area in the first reference image is not updated, that the local area in the second reference image is used to update the corresponding area or the related area in the first reference image; otherwise, determine that the local area in the second reference image is not used to update the corresponding area or the related area in the first reference image.

With reference to the sixth aspect, in a sixteenth possible implementation of the sixth aspect, the reference image update information includes:
transform coefficient information of the local area in the second reference image, where the transform coefficient information includes an average value of absolute values of transform coefficients within coverage of the local area; and
correspondingly, the fourth encoding module is specifically configured to: compile the transform coefficient information into the bitstream; and determine, when the average value of the absolute values of the transform coefficients within the coverage of the local area is greater than a tenth threshold, and the corresponding area or the related area in the first reference image is not updated, that the local area in the second reference image is used to update the corresponding area or the related area in the first reference image; otherwise, determine that the local area in the second reference image is not used to update the corresponding area or the related area in the first reference image.

With reference to the sixth aspect, in a seventeenth possible implementation of the sixth aspect, the reference image update information includes:
motion vector information of the local area in the second reference image, where the motion vector information includes an average value of absolute values of lateral motion vectors in the local area and an average value of absolute values of longitudinal motion vectors in the local area; and
correspondingly, the fourth encoding module is specifically configured to: compile the motion vector information into the bitstream; and determine, when the average value of the absolute values of the lateral motion vectors in the local area and the average value of the absolute values of the longitudinal motion vectors in the local area are both less than an eleventh threshold, and the corresponding area or the related area in the first reference image is not updated, that the local area in the second reference image is used to update the corresponding area or the related area in the first reference image; otherwise, determine that the local area in the second reference image is not used to update the corresponding area or the related area in the first reference image.

With reference to the sixth aspect, in an eighteenth possible implementation of the sixth aspect, the reference image update information includes:
motion vector information of the local area in the second reference image, where the motion vector information includes an average value of a sum of absolute values of lateral motion vectors in the local area and absolute values of longitudinal motion vectors in the local area, and an average value of a sum of absolute values of lateral motion vectors in a previous encoded frame of the second reference image and absolute values of longitudinal motion vectors in the previous encoded frame of the second reference image; and
correspondingly, the fourth encoding module is specifically configured to: compile the motion vector information into the bitstream; and determine, when the average value of the sum of the absolute values of the lateral motion vectors in the local area and the sum of the absolute values of the longitudinal motion vectors in the local area is less than the average value of the sum of the absolute values of the lateral motion vectors in the previous encoded frame and the sum of the absolute values of the longitudinal motion vectors in the previous encoded frame, and the corresponding area or the related area in the first reference image is not updated, that the local area in the second reference image is used to update the corresponding area or the related area in the first reference image; otherwise, determine that the local area in the second reference image is not used to update the corresponding area or the related area in the first reference image.

With reference to the sixth aspect, in a nineteenth possible implementation of the sixth aspect, the first encoding module is specifically configured to:

encode a to-be-encoded image of the second reference image by using a fixed quantization parameter, where a first quantization parameter is used for the local area, and a second quantization parameter for an area that is not the local area.

With reference to the nineteenth possible implementation of the sixth aspect, in a twentieth possible implementation of the sixth aspect, the method further includes:

when the second quantization parameter is greater than or equal to 0, and is less than 10, the first quantization parameter is the second quantization parameter; when the second quantization parameter is greater than or equal to 10, and is less than 37, the first quantization parameter is the second quantization parameter minus 5; or when the second quantization parameter is greater than or equal to 37, and is less than or equal to 51, the first quantization parameter is the second quantization parameter minus 10.

With reference to the sixth aspect, in a twenty-first possible implementation of the sixth aspect, the first encoding module is specifically configured to:

encode a to-be-encoded image of the second reference image by using an adaptive quantization parameter, where a quantization parameter is determined for the local area according to at least one of texture information or motion information, and for an area that is not the local area, a frame-level quantization parameter is used or a quantization parameter is set and determined according to a bit rate allocation policy or a quality control policy specified by an encoder.

With reference to any one of the sixth aspect, or the first to the twenty-first possible implementations of the sixth aspect, in a twenty-second possible implementation of the sixth aspect, the encoding device further includes: the corresponding area in the first reference image is an area that is in the first reference image and that has same location coordinates as the local area in the second reference image.

With reference to any one of the sixth aspect, or the first to the twenty-first possible implementations of the sixth aspect, in a twenty-third possible implementation of the sixth aspect, the second encoding module is further specifically configured to: when an area that is in the first reference image and that has same location coordinates as the local area in the second reference image is updated, sequentially search areas in the first reference image in a preset order, where the corresponding area in the first reference image is a first area that is not updated in the order; otherwise, the corresponding area in the first reference image is an area that is in the first reference image and that has same location coordinates as the local area in the second reference image.

With reference to any one of the sixth aspect, or the first to the twenty-first possible implementations of the sixth aspect, in a twenty-fourth possible implementation of the sixth aspect, the encoding device further includes: the reference image update information further includes spatial offsets between the location coordinates of the local area and location coordinates of the related area in the first reference image, and the spatial offsets include a lateral offset and a longitudinal offset; and correspondingly, the second encoding module is further specifically configured to:

compile the spatial offsets into the bitstream.

With reference to any one of the sixth aspect, or the first to the twenty-fourth possible implementations of the sixth aspect, in a twenty-fifth possible implementation of the sixth aspect, the encoding device further includes: a fifth encoding module, where the fifth encoding module is further specifically configured to perform filtering at a boundary between the corresponding area or the related area in the first reference image after pixel value replacement and a neighboring area.

With reference to any one of the sixth aspect, or the first to the twenty-fifth possible implementations of the sixth aspect, in a twenty-sixth possible implementation of the sixth aspect, the encoding device further includes: the first reference image is a first frame of reconstructed image obtained by encoding the to-be-encoded sequence.

With reference to any one of the sixth aspect, or the first to the twenty-fifth possible implementations of the sixth aspect, in a twenty-seventh possible implementation of the sixth aspect, the encoding device further includes: the first reference image is a random access point image obtained by encoding the to-be-encoded sequence.

With reference to any one of the sixth aspect, or the first to the twenty-seventh possible implementations of the sixth aspect, in a twenty-eighth possible implementation of the sixth aspect, the encoding device includes: the local area in the second reference image is one of a largest coding unit, a coding unit, a coding unit group, or an image area of a preset size.

With reference to the sixth aspect, in a twenty-ninth possible implementation of the sixth aspect, the encoding device further includes: a sixth module, where the sixth module is further specifically configured to: detect the to-be-encoded sequence; determine whether the first reference image is a scene switchover image; determine a particular picture order count of the first reference image; and compile the particular picture order count into the bitstream before or after a to-be-encoded image of the first reference image is encoded.

With reference to the sixth aspect, in a thirtieth possible implementation of the sixth aspect, the first encoding module is further specifically configured to: determine a particular picture order count of the first reference image that is updated by using the second reference image; and compile the particular picture order count or a number associated with the particular picture order count into the bitstream before or after a to-be-encoded image of the second reference image is encoded.

Based on the foregoing technical solutions, according to the reference image encoding method, the reference image decoding method, the reference image encoding device, and the reference image decoding device in the embodiments of the present disclosure, a background reference image, that is, the first reference image is locally updated by using a subsequently encoded reference image. Therefore, in encoding and decoding processes, update information of a background reference image is distributed in a subsequent reference image for transmission, to avoid an increase in complexity that is brought about by analyzing a reconstructed image on a decoder side, and also avoid a transmission delay caused by a sharp increase in a bit rate of a bitstream that is brought about by transmission of the background reference image.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a schematic flowchart of a reference image decoding method according to an embodiment of the present disclosure;

FIG. 5 is a schematic diagram of a search order in a method for searching a corresponding area according to an embodiment of the present disclosure;

FIG. 6 is a schematic flowchart of a reference image encoding method according to an embodiment of the present disclosure;

DESCRIPTION OF EMBODIMENTS

Figure 2:
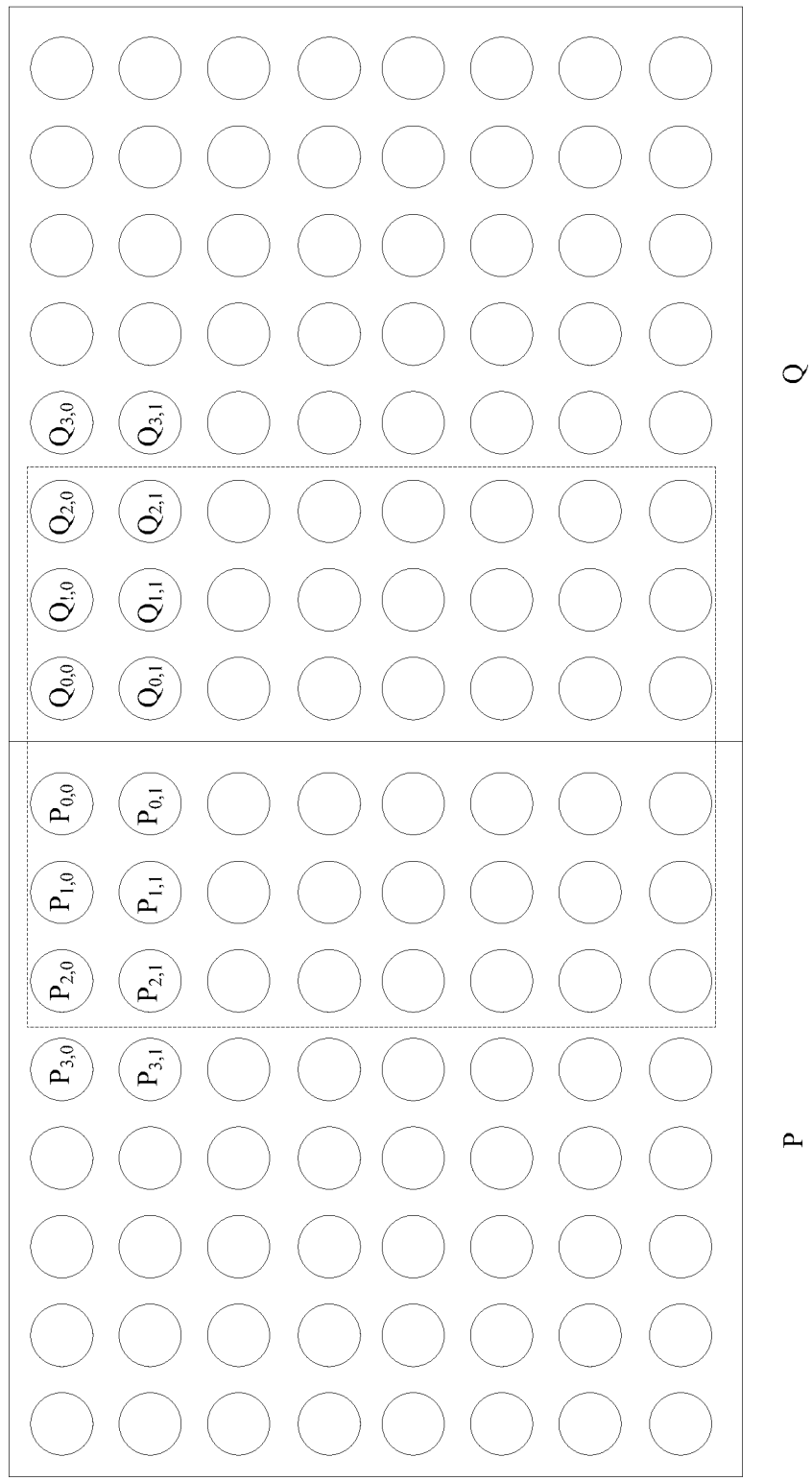
FIG. 2 is a schematic diagram of filtering at a vertical boundary in a filtering method according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

FIG. 1 is a schematic flowchart of a reference image decoding method 1000 according to an embodiment of the present disclosure. The method shown in FIG. 1 may be performed by a decoding device, for example, a decoder. Specifically, as shown in FIG. 1, the method 1000 includes the following steps.

S1100: Parse a bitstream, to obtain a reconstructed image of a first reference image and a reconstructed image of a second reference image, where the first reference image is decoded before the second reference image.

S1200: Before parsing the bitstream, to obtain the reconstructed image of the second reference image, or during parsing the bitstream, to obtain the reconstructed image of the second reference image, or after parsing the bitstream, to obtain the reconstructed image of the second reference image, parse the bitstream, to obtain reference image update information, and determine, according to the reference image update information, whether a local area in the second reference image is used to update a corresponding area or a related area in the first reference image, where a size of the local area is less than or equal to a size of the second reference image.

S1300: When it is determined, according to the reference image update information, that the local area in the second reference image is used to update the corresponding area or the related area in the first reference image, replace a pixel value of the corresponding area or the related area in the first reference image with a pixel value of the local area in the second reference image.

Specifically, the decoding device parses the bitstream, to obtain the first reference image and the second reference image, and corresponding to an encoder side, before, when, or after parsing the bitstream, to obtain the reconstructed image of the second reference image, parses the reference image update information, determines, according to the update information, whether the local area in the second reference image is used to update the corresponding area or the related area in the first reference image, and if it is determined that the local area in the second reference image is used to update the corresponding area or the related area in the first reference image, replaces the pixel value of the corresponding area or the related area in the first reference image with the pixel value of the local area in second reference image. The second reference image in the present disclosure is a collective name of reference images located after the first reference image in a time domain, and a quantity of second reference images varies with different requirements. This is not limited in the present disclosure herein.

Therefore, according to the reference image decoding method in this embodiment of the present disclosure, the decoding device locally updates the first reference image by using update information of a subsequent reference image in a pixel copy manner. Therefore, decoding complexity is reduced while compression efficiency is improved by using the first reference image, and a delay that is brought about by a sharp increase in a bit rate is also avoided.

It should be understood that, in this embodiment of the present disclosure, the local area in the second reference image may be one of a largest coding unit (LCU), a coding unit (CU), a coding unit group (CU group), or an image area of a preset size. This is not limited in the present disclosure.

It should be understood that, in this embodiment of the present disclosure, the first reference image is an image decoded before the second reference image, and is used as a reference image of a subsequent image in a video segment in which the first reference image is located. The first reference image may be a first frame of reconstructed image obtained by parsing the bitstream, or may be a random access point image obtained by parsing the bitstream. This is not limited in the present disclosure.

It should be understood that, in this embodiment of the present disclosure, that before the parsing a bitstream, to obtain a reconstructed image of a second reference image, or during the parsing a bitstream, to obtain a reconstructed image of a second reference image, or after the parsing a bitstream, to obtain a reconstructed image of a second reference image, the bitstream is parsed, to obtain the reference image update information means that, corresponding to a coding scheme of the encoder side, a location of the reference image update information in the bitstream may be before, between, or after coding information of the second reference image, and the reference image update information may exist in the bitstream as a part of the coding information of the second reference image. This is not limited in the present disclosure.

An implementation of the parsing the bitstream, to obtain reference image update information, and determining, according to the reference image update information, whether a local area in the second reference image is used to update a corresponding area or a related area in the first reference image in step S1200 includes:

In a first feasible implementation, the determining reference image update information, and determining, according to the reference image update information, whether a local area in the second reference image is used to update a corresponding area or a related area in the first reference image includes:

parsing the bitstream, to obtain a flag; and determining, if the flag is a first value, that the local area in the second reference image is used to update the corresponding area or the related area in the first reference image; or determining, if the flag is a second value, that the local area in the second reference image is not used to update the corresponding area or the related area in the first reference image, where the first value is different from the second value.

Preferably, a specific implementation is: reading a reference image update flag of each area in a current to-be-decoded frame from the bitstream, where 1 indicates that the area is used to update the first reference image, and 0 indicates that the area is not used to update the first reference image.

In a second feasible implementation, the determining reference image update information, and determining, according to the reference image update information, whether a local area in the second reference image is used to update a corresponding area or a related area in the first reference image includes:

parsing the bitstream, to obtain coding information, and determining, according to the coding information and a preset rule, whether the local area in the second reference image is used to update the corresponding area or the related area in the first reference image.

The coding information includes a quantization parameter offset value of the local area in the second reference image; and correspondingly, the determining, according to the coding information and a preset rule, whether the local area in the second reference image is used to update the corresponding area or the related area in the first reference image includes: determining, when an absolute value of the quantization parameter offset value falls within a first value range, that the local area in the second reference image is used to update the corresponding area or the related area in the first reference image; or determining, when an absolute value of the quantization parameter offset value falls outside a first value range, that the local area in the second reference image is not used to update the corresponding area or the related area in the first reference image.

Preferably, a specific implementation is: reading a quantization parameter offset value (ΔQP) of each area in a current to-be-decoded frame from the bitstream, and determining, according to a range of an absolute value of the quantization parameter offset value, whether the area is used to update the first reference image, where if 10≤|ΔQP|<20, the area is used to update the first reference image; or if 0≤|ΔQP|<10, the area is not used to update the first reference image.

It should be understood that, in this embodiment of the present disclosure, a preferred value is provided as the quantization parameter offset value, but the value of the quantization parameter offset value is not limited in the present disclosure.

In a third feasible implementation, the determining reference image update information, and determining, according to the reference image update information, whether a local area in the second reference image is used to update a corresponding area or a related area in the first reference image includes:

parsing the bitstream, to obtain coding information, and determining, according to the coding information and a preset rule, whether the local area in the second reference image is used to update the corresponding area or the related area in the first reference image.

The coding information includes a scale factor of a quantization step of the local area in the second reference image; and correspondingly, the determining, according to the coding information and a preset rule, whether the local area in the second reference image is used to update the corresponding area or the related area in the first reference image includes: determining, when the scale factor of the quantization step falls within a second value range, that the local area in the second reference image is used to update the corresponding area or the related area in the first reference image; or determining, when the scale factor of the quantization step falls outside a second value range, that the local area in the second reference image is not used to update the corresponding area or the related area in the first reference image.

Preferably, a specific implementation is: reading the scale factor from the bitstream to determine whether the local area in the second reference image is used to update the corresponding area or the related area in the first reference image.

A calculation formula of the scale factor F is shown in the following (1), and the scale factor F falls within a value range of 0.5 to 1.5:

$$F = \frac{3^{\frac{V_n}{\overline{V}}+1} - 1}{2 \times 3^{\frac{V_n}{\overline{V}}} + 2}, \quad (1)$$

$$\overline{V} = \frac{1}{N}\sum_{n=0}^{N} V_n, \quad V_n = \sum_{i=0}^{LCUSize} (x_{i,n} - \overline{x}_n)^2$$

A calculation formula of a quantization step of an area is shown in the following (2):

$$Qstep = 2^{\frac{QP-4}{6}} \times F \quad (2)$$

When the scale factor F is 1, the area is not used to update the first reference image; otherwise, the area is used to update the first reference image.

It should be understood that, in this embodiment of the present disclosure, a preferred value is provided for a value of the scale factor, but the value of the scale factor is not limited in the present disclosure.

In step S1200, it is determined, according to the reference image update information, whether the local area in the second reference image is used to update the corresponding area or the related area in the first reference image. An implementation of determining the corresponding area or the related area in the first reference image includes:

In a first feasible implementation, the corresponding area in the first reference image is an area that is in the first reference image and that has same location coordinates as the local area in the second reference image.

In a second feasible implementation, the parsing the bitstream, to obtain reference image update information, and determining, according to the reference image update information, whether a local area in the second reference image is used to update a corresponding area or a related area in the first reference image further includes: obtaining spatial offsets between location coordinates of the local area and location coordinates of the related area in the first reference image, where the spatial offsets include a lateral offset and a longitudinal offset; and before the replacing a pixel value of the corresponding area or the related area in the first reference image with a pixel value of the local area in the second reference image, determining a location of the related area in the first reference image according to the location coordinates of the local area in the second reference image and the spatial offsets.

Preferably, a specific implementation is: for an area used to update the corresponding area or the related area in the first reference image, reading ($cMV_x$, $cMV_y$) from the bitstream, and obtaining, according to ($cMV_x$, $cMV_y$) and a location ($Cur_x$, $Cur_y$) of the area and according to a formula (3), an update location that is of the area and that is in the first reference image:

$$Des_x = Cur_x + cMV_x, Des_y = Cur_y + cMV_y \quad (3)$$

Optionally, after step S1300, that is, when it is determined, according to the reference image update information, that the local area in the second reference image is used to update the corresponding area or the related area in the first reference image, replace a pixel value of the corresponding area or the related area in the first reference image with a pixel value of the local area in the second reference image, the method further includes:

S1400: Perform filtering at a boundary between the corresponding area or the related area in the first reference image after pixel value replacement and a neighboring area.

Preferably, a specific implementation is as follows:

First step: Perform filtering processing on a pixel near a vertical boundary between an update area and a neighboring area at the right of the update area. As shown in FIG. 2, P indicates the update area, Q indicates the neighboring area at the right of the update area, and there are pixels $p_{i,row}$ and $q_{i,row}$ in a red box, where i=0, 1, and 2, respectively indicating three pixels, that is, to-be-filtered pixels that are closest to the vertical boundary and that are in each row of P and Q, a value of a to-be-filtered pixel is obtained through calculation by using a formula (4), and a row coordinate row in a subscript of a pixel is omitted in the formula:

$$p_0' = (p_2 + 2p_1 + 2p_0 + 2q_0 + q_1 + 4)/8$$

$$p_1' = (p_2 + p_1 + p_0 + q_0 + 2)/4$$

$$p_2' = (2p_3 + 3p_2 + p_1 + p_0 + q_0 + 4)/8,$$

$$q_0' = (q_2 + 2q_1 + 2q_0 + 2p_0 + p_1 + 4)/8$$

$$q_1' = (q_2 + q_1 + q_0 + p_0 + 2)/4$$

$$q_2' = (2q_2 + 3q_2 + q_1 + q_0 + p_0 + 4)/8 \quad (4)$$

Second step: Perform filtering processing on a pixel near a vertical boundary between the update area and a neighboring area at the left of the update area. A processing method is the same as that in the first step.

Figure 3:
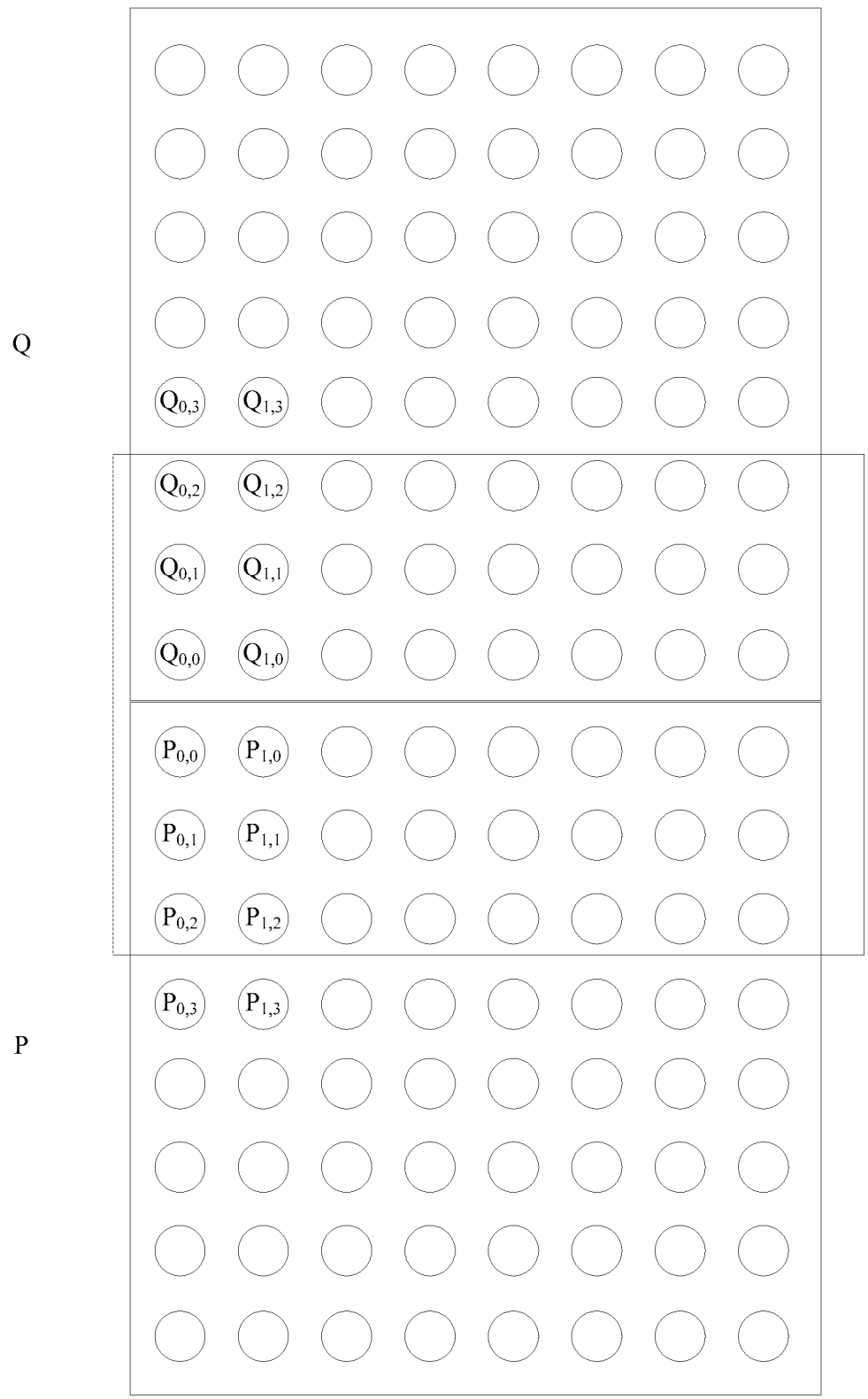
FIG. 3 is a schematic diagram of filtering at a horizontal boundary in a filtering method according to an embodiment of the present disclosure.

Third step: Perform filtering processing on a pixel near a horizontal boundary between the update area and a neighboring area above the update area. As shown in FIG. 3, P indicates the update area, Q indicates the neighboring area above the update area, and there are pixels $p_{col,j}$ and $q_{col,j}$ in a red box, where j=0, 1, and 2, respectively indicating three pixels, that is, to-be-filtered pixels that are closest to the horizontal boundary and that are in each column of P and Q, a value of a to-be-filtered pixel is obtained through calculation by using the formula (4), and a column coordinate col in a subscript of a pixel is omitted in the formula.

Fourth step: Perform filtering processing on a pixel near a horizontal boundary between the update area and a neighboring area below the update area. A processing method is the same as that in the first step.

Figure 4:
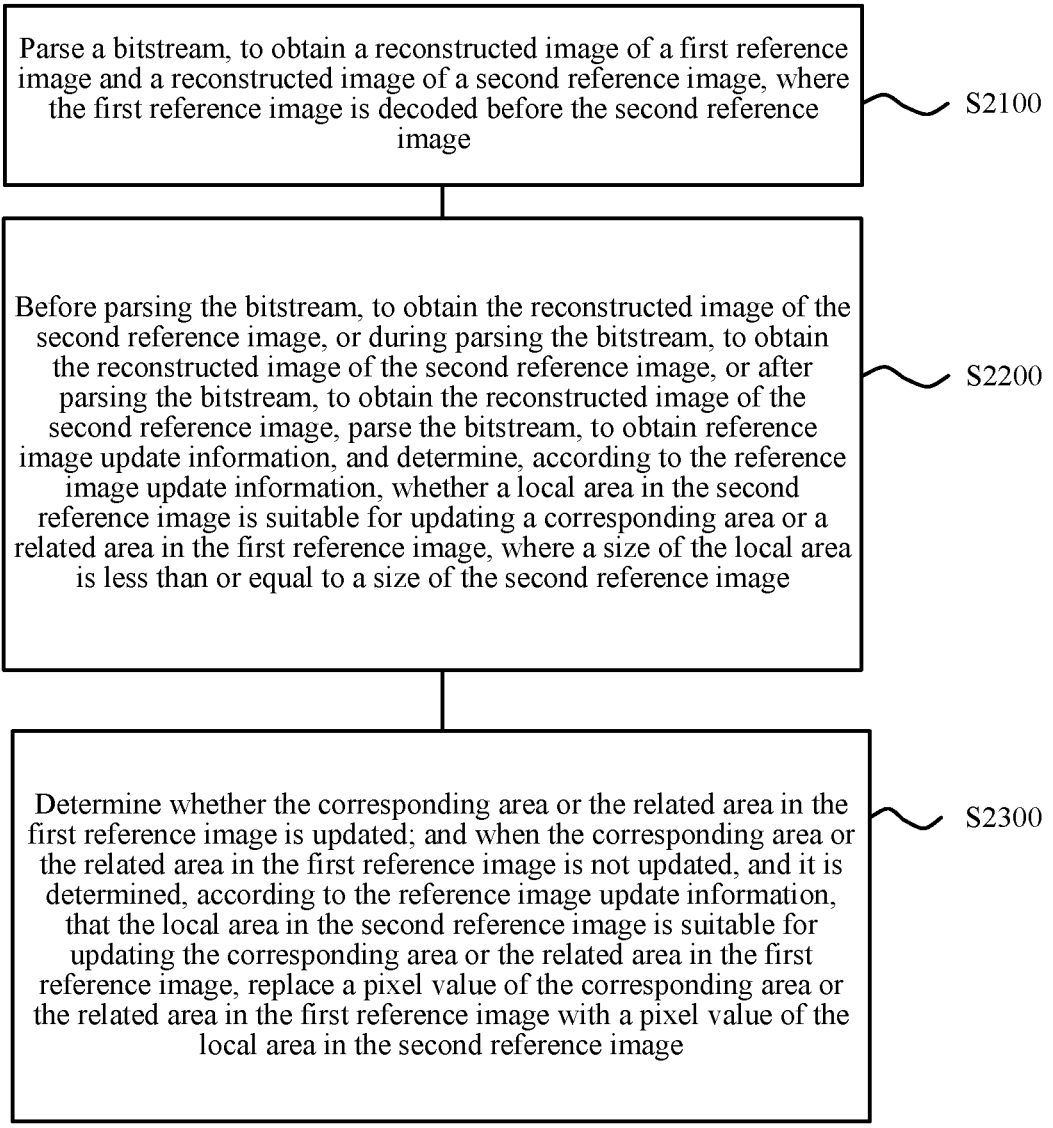
FIG. 4 is another schematic flowchart of a reference image decoding method according to an embodiment of the present disclosure.

FIG. 4 is a schematic flowchart of a reference image decoding method according to an embodiment of the present disclosure. The method shown in FIG. 4 may be performed by a decoding device, for example, a decoder. Specifically, as shown in FIG. 4, the method 2000 includes the following steps.

S2100: Parse a bitstream, to obtain a reconstructed image of a first reference image and a reconstructed image of a second reference image, where the first reference image is decoded before the second reference image.

S2200: Before parsing the bitstream, to obtain the reconstructed image of the second reference image, or during parsing the bitstream, to obtain the reconstructed image of the second reference image, or after parsing the bitstream, to obtain the reconstructed image of the second reference image, parse the bitstream, to obtain reference image update information, and determine, according to the reference image update information, whether a local area in the second reference image is suitable for updating a corresponding area or a related area in the first reference image, where a size of the local area is less than or equal to a size of the second reference image.

S2300: Determine whether the corresponding area or the related area in the first reference image is updated; and when the corresponding area or the related area in the first reference image is not updated, and it is determined, according to the reference image update information, that the local area in the second reference image is suitable for updating the corresponding area or the related area in the first reference image, replace a pixel value of the corresponding area or the related area in the first reference image with a pixel value of the local area in the second reference image.

Specifically, the decoding device parses the bitstream, to obtain the first reference image and the second reference image, and corresponding to an encoder side, before, when, or after parsing the bitstream, to obtain the reconstructed image of the second reference image, parses the reference image update information, determines, according to the update information, whether the local area in the second reference image is used to update the corresponding area or the related area in the first reference image, and if it is determined that the local area in the second reference image is used to update the corresponding area or the related area in the first reference image, replaces the pixel value of the corresponding area or the related area in the first reference image with the pixel value of the local area in second reference image.

Therefore, according to the reference image decoding method in this embodiment of the present disclosure, the decoding device locally updates the first reference image by using update information of a subsequent reference image in a pixel copy manner. Therefore, decoding complexity is reduced while compression efficiency is improved by using the first reference image, and a delay that is brought about by a sharp increase in a bit rate is also avoided.

It should be understood that, in this embodiment of the present disclosure, the local area in the second reference image may be one of a largest coding unit (LCU), a coding unit (CU), a coding unit group (CU group), or an image area of a preset size. This is not limited in the present disclosure.

It should be understood that, in this embodiment of the present disclosure, the first reference image is an image decoded before the second reference image, and is used as a reference image of a subsequent image in a video segment in which the first reference image is located. The first reference image may be a first frame of reconstructed image obtained by parsing the bitstream, or may be a random access point image obtained by parsing the bitstream. This is not limited in the present disclosure.

It should be understood that, in this embodiment of the present disclosure, that before the parsing a bitstream, to obtain a reconstructed image of a second reference image, or during the parsing a bitstream, to obtain a reconstructed image of a second reference image, or after the parsing a bitstream, to obtain a reconstructed image of a second reference image, the bitstream is parsed, to obtain the reference image update information means that, corresponding to a coding scheme of the encoder side, a location of the reference image update information in the bitstream may be before, between, or after coding information of the second reference image, and the reference image update information may exist in the bitstream as a part of the coding information of the second reference image. This is not limited in the present disclosure.

An implementation of the parsing the bitstream, to obtain reference image update information, and determining, according to the reference image update information, whether a local area in the second reference image is suitable for updating a corresponding area or a related area in the first reference image in step S2200 includes:

In a first feasible implementation, the determining reference image update information, and determining, according to the reference image update information, whether a local area in the second reference image is suitable for updating a corresponding area or a related area in the first reference image includes:
    parsing the bitstream, to obtain a flag; and determining, if the flag is a first value, that the local area in the second reference image is suitable for updating the corresponding area or the related area in the first reference image; or determining, if the flag is a second value, that the local area in the second reference image is not suitable for updating the corresponding area or the related area in the first reference image, where the first value is different from the second value.

Preferably, a specific implementation is: reading a reference image update flag of each area in a current to-be-decoded frame from the bitstream, where 1 indicates that the area is suitable for updating the first reference image, and 0 indicates that the area is not suitable for updating the first reference image.

In a second feasible implementation, the determining reference image update information, and determining, according to the reference image update information, whether a local area in the second reference image is suitable for updating a corresponding area or a related area in the first reference image includes:
    parsing the bitstream, to obtain coding information, and determining, according to the coding information and a preset rule, whether the local area in the second reference image is suitable for updating the corresponding area or the related area in the first reference image.

The coding information includes transform coefficient information of the local area in the second reference image, and the transform coefficient information includes a sum of absolute values of transform coefficients within coverage of the local area; and correspondingly, the determining, according to the coding information and a preset rule, whether the local area in the second reference image is suitable for updating the corresponding area or the related area in the first reference image includes:
    determining, when the sum of the absolute values of the transform coefficients within the coverage of the local area is greater than a first threshold, that the local area in the second reference image is suitable for updating the corresponding area or the related area in the first reference image; otherwise, determining that the local area in the second reference image is not suitable for updating the corresponding area or the related area in the first reference image.

Preferably, a specific implementation is: reading a transform coefficient of each area in a current frame after quantization from the bitstream, to obtain an area satisfying the following condition (5):

$$\Sigma|Coef_i|>Threshold_1 \qquad (5)$$

If the condition (5) is satisfied, it is determined that the area is suitable for updating the first reference image; otherwise, it is determined that the area is not suitable for updating the first reference image.

In a third feasible implementation, the determining reference image update information, and determining, according to the reference image update information, whether a local area in the second reference image is suitable for updating a corresponding area or a related area in the first reference image includes:
    parsing the bitstream, to obtain coding information, and determining, according to the coding information and a preset rule, whether the local area in the second reference image is suitable for updating the corresponding area or the related area in the first reference image.

The coding information includes transform coefficient information of the local area in the second reference image, and the transform coefficient information includes an average value of absolute values of transform coefficients within coverage of the local area; and correspondingly, the determining, according to the coding information and a preset rule, whether the local area in the second reference image is used to update the first reference image includes:
    determining, when the average value of the absolute values of the transform coefficients within a range of the local area is greater than a second threshold, that the local area in the second reference image is suitable for updating the corresponding area or the related area in the first reference image; otherwise, determining that the local area in the second reference image is not suitable for updating the corresponding area or the related area in the first reference image.

Preferably, a specific implementation is: reading a transform coefficient of each area in a current frame after quantization from the bitstream, to obtain an area satisfying the following condition (6), where numBlock indicates a quantity of areas included in the current frame:

$$\frac{1}{numBlock}\sum|Coef_i| > \text{Threshold}_2 \qquad (6)$$

If the condition (6) is satisfied, it is determined that the area is suitable for updating the first reference image; otherwise, it is determined that the area is not suitable for updating the first reference image.

In a fourth feasible implementation, the determining reference image update information, and determining, according to the reference image update information, whether a local area in the second reference image is suitable for updating a corresponding area or a related area in the first reference image includes:

parsing the bitstream, to obtain coding information, and determining, according to the coding information and a preset rule, whether the local area in the second reference image is suitable for updating the corresponding area or the related area in the first reference image.

The coding information includes a quantization parameter offset value of the local area in the second reference image; and correspondingly, the determining, according to the coding information and a preset rule, whether the local area in the second reference image is suitable for updating the corresponding area or the related area in the first reference image includes: determining, when an absolute value of the quantization parameter offset value falls within a first value range, that the local area in the second reference image is suitable for updating the corresponding area or the related area in the first reference image; or determining, when an absolute value of the quantization parameter offset value falls outside a first value range, that the local area in the second reference image is not suitable for updating the corresponding area or the related area in the first reference image.

Preferably, a specific implementation is: reading a quantization parameter offset value ($\Delta QP$) of each area in a current to-be-decoded frame from the bitstream, and determining, according to a range of an absolute value of the quantization parameter offset value, whether the area is suitable for updating the first reference image, where if $10 \leq |\Delta QP| < 20$, the area is suitable for updating the first reference image; or if $0 \leq |\Delta QP| < 10$, the area is not suitable for updating the first reference image.

It should be understood that, in this embodiment of the present disclosure, a preferred value is provided as the quantization parameter offset value, but the value of the quantization parameter offset value is not limited in the present disclosure.

In a fifth feasible implementation, the determining reference image update information, and determining, according to the reference image update information, whether a local area in the second reference image is suitable for updating a corresponding area or a related area in the first reference image includes:

parsing the bitstream, to obtain coding information, and determining, according to the coding information and a preset rule, whether the local area in the second reference image is suitable for updating the corresponding area or the related area in the first reference image.

The coding information includes a scale factor of a quantization step of the local area in the second reference image; and correspondingly, the determining, according to the coding information and a preset rule, whether the local area in the second reference image is suitable for updating the corresponding area or the related area in the first reference image includes: determining, when the scale factor of the quantization step falls within a second value range, that the local area in the second reference image is suitable for updating the corresponding area or the related area in the first reference image; or determining, when the scale factor of the quantization step falls outside a second value range, that the local area in the second reference image is not suitable for updating the corresponding area or the related area in the first reference image.

Preferably, a specific implementation is: reading the scale factor from the bitstream to determine whether the local area in the second reference image is suitable for updating the corresponding area or the related area in the first reference image.

A calculation formula of the scale factor F is shown in the following (7), and the scale factor F falls within a value range of 0.5 to 1.5:

$$F = \frac{3^{\frac{V_n}{V}+1} - 1}{2 \times 3^{\frac{V_n}{V}} + 2}, \qquad (7)$$

$$\bar{V} = \frac{1}{N}\sum_{n=0}^{N} V_n, \quad V_n = \sum_{i=0}^{AreaSize}(x_{i,n} - \bar{x}_n)^2$$

A calculation formula of a quantization step of an area is shown in the following (8):

$$Qstep = 2^{\frac{QP-4}{6}} \times F \qquad (8)$$

When the scale factor F is 1, the area is not suitable for updating the first reference image; otherwise, the area is suitable for updating the first reference image.

It should be understood that, in this embodiment of the present disclosure, a preferred value is provided for a value of the scale factor, but the value of the scale factor is not limited in the present disclosure.

In a sixth feasible implementation, the determining reference image update information, and determining, according to the reference image update information, whether a local area in the second reference image is suitable for updating a corresponding area or a related area in the first reference image includes:

parsing the bitstream, to obtain coding information, and determining, according to the coding information and a preset rule, whether the local area in the second reference image is suitable for updating the corresponding area or the related area in the first reference image.

The coding information includes motion vector information of the local area in the second reference image, and the motion vector information includes an average value of absolute values of lateral motion vectors in the local area and an average value of absolute values of longitudinal motion vectors in the local area; and correspondingly, the determining, according to the coding information and a preset rule, whether the local area in the second reference image is used to update the first reference image includes:

determining, when the average value of the absolute values of the lateral motion vectors in the local area and the average value of the absolute values of the longitudinal motion vectors in the local area are both less than a third threshold, that the local area in the second reference image is suitable for updating the corresponding area or the related area in the first reference image; otherwise, determining that the local area in the second reference image is not suitable for updating the corresponding area or the related area in the first reference image.

Preferably, a specific implementation is: obtaining an area satisfying the following condition (9):

$$\begin{cases} \dfrac{1}{M}\sum_{i=0}^{M}|MVx_i| < \text{Threshold}_3 \\ \dfrac{1}{M}\sum_{i=0}^{M}|MVy_i| < \text{Threshold}_3 \end{cases} \quad (9)$$

In the formula (9), M indicates a quantity of code blocks included in a current area, and $MV_x$ and $MV_y$ respectively indicate a lateral motion vector and a longitudinal motion vector of each code block. An average value of absolute values of the lateral motion vectors of all the code blocks in the current area and an average value of absolute values of the longitudinal motion vectors of all the code blocks in the current area are calculated. The two average values are separately compared with a threshold Threshold$_3$. If the condition (9) is satisfied, it is determined that the area is suitable for updating the first reference image; otherwise, it is determined that the area is not suitable for updating the first reference image.

In a seventh feasible implementation, the determining reference image update information, and determining, according to the reference image update information, whether a local area in the second reference image is suitable for updating a corresponding area or a related area in the first reference image includes:

parsing the bitstream, to obtain coding information, and determining, according to the coding information and a preset rule, whether the local area in the second reference image is suitable for updating the corresponding area or the related area in the first reference image.

The motion vector information includes an average value of a sum of absolute values of lateral motion vectors in the local area and absolute values of longitudinal motion vectors in the local area, and an average value of a sum of absolute values of lateral motion vectors in a previous decoded frame of the second reference image and absolute values of longitudinal motion vectors in the previous decoded frame of the second reference image; and correspondingly, the determining, according to the coding information and a preset rule, whether the local area in the second reference image is used to update the first reference image includes:

determining, when the average value of the sum of the absolute values of the lateral motion vectors in the local area and the sum of the absolute values of the longitudinal motion vectors in the local area is less than the average value of the sum of the absolute values of the lateral motion vectors in the previous decoded frame and the sum of the absolute values of the longitudinal motion vectors in the previous decoded frame, that the local area in the second reference image is suitable for updating the corresponding area or the related area in the first reference image; otherwise, determining that the local area in the second reference image is not suitable for updating the corresponding area or the related area in the first reference image.

Preferably, a specific implementation is: obtaining an area satisfying the following condition (10):

$$\frac{1}{M}\sum_{i=0}^{M}(|MVx_i|+|MVy_i|) < \frac{1}{N}\sum_{j=0}^{N}(|MVx_j|+|MVy_j|) \quad (10)$$

In the formula (10), M indicates a quantity of code blocks included in a current area; N indicates a quantity of code blocks included in a previous encoded frame/a previous decoded frame; and $MV_x$ and $MV_y$ respectively indicate a lateral motion vector and a longitudinal motion vector of each code block. If the condition (10) is satisfied, it is determined that the area is suitable for updating the first reference image; otherwise, it is determined that the area is not suitable for updating the first reference image. It should be noted that, the previous decoded frame is a neighboring decoded frame that is located before the second reference image in the time domain or is multiple consecutive decoded frames including the neighboring decoded frame.

In step S2200, it is determined, according to the reference image update information, whether the local area in the second reference image is suitable for updating the corresponding area or the related area in the first reference image. An implementation of determining the corresponding area or the related area in the first reference image includes:

In a first feasible implementation, the corresponding area in the first reference image is an area that is in the first reference image and that has same location coordinates as the local area in the second reference image.

In a second feasible implementation, when an area that is in the first reference image and that has same location coordinates as the local area in the second reference image is updated, areas in the first reference image are sequentially searched in a preset order, where the corresponding area in the first reference image is a first area that is not updated in the order; otherwise, the corresponding area in the first reference image is an area that is in the first reference image and that has same location coordinates as the local area in the second reference image.

Preferably, a specific implementation is: determining whether an area that is in the first reference image and that has same location coordinates as the local area in the second reference image is updated. If the area is not updated, the corresponding area in the first reference image is an area that is in the first reference image and that has the same location coordinates as the local area in the second reference image; otherwise, area locations that are not updated are searched in an area neighboring to the location according to a preset search step, and the corresponding area in the first reference image is an area location that is not updated.

Preferably, a specific implementation of the preset search step is shown in FIG. 5. A central area 0 indicates a current location area. A circle of areas closest to the current location area is first searched in an order of 1 to 8, then, a circle of areas the second closest to the current location area are searched in an order of 1 to 16, and outward extension is performed on this basis, until an area that is not updated is found.

In a third feasible implementation, the parsing the bitstream, to obtain reference image update information, and determining, according to the reference image update information, whether a local area in the second reference image is used to update a corresponding area or a related area in the first reference image further includes: obtaining spatial offsets between location coordinates of the local area and location coordinates of the related area in the first reference image, where the spatial offsets include a lateral offset and a longitudinal offset; and before the replacing a pixel value of the corresponding area or the related area in the first reference image with a pixel value of the local area in the second reference image, determining a location of the related area in the first reference image according to the location coordinates of the local area in the second reference image and the spatial offsets.

Preferably, a specific implementation is: for an area used to update the corresponding area or the related area in the first reference image, reading (cMV$_x$, cMV$_y$) from the bitstream, and obtaining, according to (cMV$_x$, cMV$_y$) and a location (Cur$_x$, Cur$_y$) of the area and according to a formula (11), an update location that is of the area and that is in the first reference image:

$$Des_x = Cur_x + cMV_x, Des_y = Cur_y + cMV_y \quad (11)$$

Optionally, after step S2300, that is, when it is determined, according to the reference image update information, that the local area in the second reference image is used to update the corresponding area or the related area in the first reference image, replace a pixel value of the corresponding area or the related area in the first reference image with a pixel value of the local area in the second reference image, the method further includes:

S2400: Perform filtering at a boundary between the corresponding area or the related area in the first reference image after pixel value replacement and a neighboring area.

Preferably, a specific implementation is the same as that of S1400.

To better prove beneficial effects of this embodiment of the present disclosure when compared with those of the prior art, encoding performance when the method in this embodiment of the present disclosure is used for encoding and encoding performance when a method in the prior art is used for encoding are tested and compared, and a result is shown in Table 1:

TABLE 1

| | | Simulation results | | | | | |
|---|---|---|---|---|---|---|---|
| Test | | Low delay B Main | | | Low delay P Main | | |
| sequence set | Sequence name | Y | U | V | Y | U | V |
| HEVC Scene | BasketballDrill | −25.7% | −27.0% | −21.3% | −24.0% | −26.1% | −21.4% |
| | Traffic | −9.5% | −11.8% | −13.5% | −8.5% | −11.6% | −13.5% |
| | PeopleOnStreet | −3.1% | −2.8% | −3.3% | −2.8% | −3.1% | −4.0% |
| | FourPeople | −10.5% | −19.3% | −17.8% | −10.1% | −18.9% | −17.0% |
| | Johnny | −7.0% | −19.2% | −20.0% | −6.7% | −20.1% | −20.0% |
| | KristenAndSara | −8.2% | −18.5% | −15.9% | −8.5% | −18.2% | −15.5% |
| | Vidyo1 | −14.6% | −26.3% | −29.2% | −13.6% | −25.7% | −29.4% |
| | Vidyo3 | −14.0% | −30.8% | −43.9% | −11.8% | −32.5% | −45.7% |
| | Vidyo4 | −16.5% | −26.4% | −30.1% | −15.8% | −27.3% | −31.9% |
| VC266 | Fountains | −2.2% | −16.9% | −9.4% | −2.1% | −16.5% | −8.7% |
| SJTU | Runners | −2.0% | −3.0% | −3.9% | −2.0% | −3.5% | −4.6% |
| | RushHour | −3.3% | −6.0% | −4.9% | −2.6% | −4.9% | −4.1% |
| | TrafficFlow | −1.9% | −3.1% | −3.1% | −0.3% | −3.2% | −4.4% |
| | CampfireParty | 0.4% | 0.4% | 0.4% | 0.1% | 0.0% | −0.4% |
| Average | | −8.4% | −15.1% | −15.4% | −7.8% | −15.1% | −15.8% |

It can be learned from Table 1 that, by means of the reference image decoding method in this embodiment of the present disclosure, compared with the prior art, 8% of a bit rate can still be reduced while complexity of a decoder side is not increased and an entire frame of reference image is not transmitted.

Therefore, according to the reference image decoding method in this embodiment of the present disclosure, the decoding device locally updates the first reference image by using update information of a subsequent reference image in a pixel copy manner. Therefore, decoding complexity is reduced while compression efficiency is improved by using the first reference image, and a delay that is brought about by a sharp increase in a bit rate is also avoided.

FIG. 6 is a schematic flowchart of a reference image encoding method according to an embodiment of the present disclosure. It should be noted that, related operations of an encoder side are essentially the same as those of a decoder side. To avoid repetition, details are not described herein again. The method shown in FIG. 6 may be performed by an encoding device, for example, an encoder. Specifically, as shown in FIG. 6, the method 3000 includes the following steps.

S3100: Encode a to-be-encoded sequence, to obtain a reconstructed image of a first reference image, and encode a second reference image, to obtain a reconstructed image of the second reference image, where the first reference image is encoded before the second reference image.

S3200: Determine whether a local area in the second reference image is suitable for updating a corresponding area or a related area in the first reference image, where a size of the local area is less than or equal to a size of the second reference image.

S3300: Determine whether the corresponding area or the related area in the first reference image is updated; and when the corresponding area or the related area in the first reference image is not updated, and it is determined that the local area in the second reference image is suitable for updating the corresponding area or the related area in the first reference image, replace a pixel value of the corresponding area or the related area in the first reference image with a pixel value of the local area in the second reference image.

S3400: Compile, into the bitstream, reference image update information used to determine whether the local area in the second reference image is used to update the corresponding area or the related area in the first reference image.

Specifically, the encoding device encodes the to-be-encoded sequence, to obtain the reconstructed image of the first reference image, and encodes the second reference image, to obtain the reconstructed image of the second reference image; determines whether the local area in the second reference image is suitable for updating the corresponding area or the related area in the first reference image; determines whether the corresponding area or the related area in the first reference image is updated; when the corresponding area or the related area in the first reference image is not updated, and it is determined that the local area in the second reference image is suitable for updating the corresponding area or the related area in the first reference image, replaces the pixel value of the corresponding area or the related area in the first reference image with the pixel value of the local area in the second reference image; and compiles, into the bitstream, the reference image update information that is used to determine whether the local area in the second reference image is used to update the corresponding area or the related area in the first reference image.

Therefore, according to the reference image encoding method in this embodiment of the present disclosure, the encoding device locally updates the first reference image by using update information of a subsequent reference image in a pixel copy manner. Therefore, decoding complexity is reduced while compression efficiency is improved by using the first reference image, and a delay that is brought about by a sharp increase in a bit rate is also avoided.

It should be understood that, in this embodiment of the present disclosure, the local area in the second reference image may be one of a largest coding unit (LCU), a coding unit (CU), a coding unit group (CU group), or an image area of a preset size. This is not limited in the present disclosure.

It should be understood that, in this embodiment of the present disclosure, the first reference image is an image encoded before the second reference image, and is used as a reference image of a subsequent image in a video segment in which the first reference image is located. The first reference image may be a first frame of reconstructed image obtained by encoding the to-be-encoded sequence, or may be a random access point image obtained by encoding the to-be-encoded sequence. This is not limited in the present disclosure.

It should be understood that, in this embodiment of the present disclosure, that the reference image update information used to determine whether the local area in the second reference image is used to update the corresponding area or the related area in the first reference image is compiled into the bitstream means that, a location at which the reference image update information is compiled into the bitstream may be before, between, or after coding information of the second reference image, and the reference image update information may exist in the bitstream as a part of the coding information of the second reference image. This is not limited in the present disclosure.

An implementation of the determining whether a local area in the second reference image is suitable for updating a corresponding area or a related area in the first reference image in step S3200 includes:

In a first feasible implementation, the method includes:
obtaining a first area that is in a to-be-encoded image of the second reference image and that has same location coordinates as the local area, and a second area that is in an to-be-encoded image of a previous frame of the second reference image and that has the same location coordinates as the local area;
calculating a mean square error of all pixels in the first area and the second area; and
determining, when the mean square error is less than a fourth threshold, that the local area in the second reference image is suitable for updating the corresponding area or the related area in the first reference image; otherwise, determining that the local area in the second reference image is not suitable for updating the corresponding area or the related area in the first reference image.

Preferably, a specific implementation is as follows:
First step: Obtain a current to-be-encoded frame $F_i$, that is, the second reference image, and an original image of a previous frame $F_{i-1}$.

Second step: For each area in the current to-be-encoded frame, calculate mean square errors (Mean Square Error, MSE) of original pixel values of all pixels in the area and an area that is in a previous frame and that has a same location.

Third step: Obtain an area satisfying the following condition (12), where $Threshold_1$ is a preset threshold, $Flag_{updated}$ is a flag indicating whether each area in a reference frame $cRef_{i-1}$, that is, the first reference image, is updated, 1 indicates that the area is updated, 0 indicates that the area is not updated, and $cRef_{i-1}$ is a reference frame that is locally updated by using a reconstructed pixel value of an encoded frame before the current to-be-encoded frame $F_i$:

$$\begin{cases} MSE < Threshold_4 \\ Flag_{updated} = 0 \end{cases} \quad (12)$$

If satisfying the condition (12), an area is suitable for updating the corresponding area or the related area in the first reference image; otherwise, the area is not suitable for updating the corresponding area or the related area in the first reference image.

In a second feasible implementation, the method includes:
obtaining a to-be-encoded image of the local area to perform inter-frame prediction, to obtain a prediction image of the local area;
calculating an average value of absolute values of lateral axis prediction differences and absolute values of longitudinal axis prediction differences of all pixels in the to-be-encoded image of the local area and the prediction image of the local area; and
determining, when the average value is less than a fifth threshold, that the local area in the second reference image is suitable for updating the corresponding area or the related area in the first reference image; otherwise, determining that the local area in the second reference image is not suitable for updating the corresponding area or the related area in the first reference image.

Preferably, a specific implementation is as follows:
First step: Predicate a current to-be-encoded frame $F_i$, that is, the second reference image, where $F_i$ may use $cRef_{i-1}$, that is, the first reference image, as a reference frame of $F_i$ to perform inter-frame prediction, or may use another short-term reference frame to perform inter-frame prediction, and $cRef_{i-1}$ is a reference frame that is locally updated by using a reconstructed pixel value of an encoded frame before $F_i$, that is, the first reference image; and obtain a difference between a prediction value ($P_x$, $P_y$) and an original pixel value ($O_x$, $O_y$) of each pixel in $F_i$, that is, a prediction error.

Second step: Obtain an area satisfying the following condition (13):

$$\frac{1}{N}\sum_{i}^{N}(|Px_i - Ox_i| + |Py_i - Oy_i|) > \text{Threshold}_5 \quad (13)$$

In the formula (13), N is a quantity of pixels in an area. An average value of prediction errors of all pixels in the area is calculated and is compared with a threshold Threshold5. If satisfying the condition (13), an area is suitable for updating the corresponding area or the related area in the first reference image; otherwise, the area is not suitable for updating the corresponding area or the related area in the first reference image.

In a third feasible implementation, the method includes:
obtaining transform coefficient information of the local area in the second reference image, where the transform coefficient information includes a sum of absolute values of transform coefficients within coverage of the local area; and
determining, when the sum of the absolute values of the transform coefficients within the coverage of the local area is greater than a sixth threshold, that the local area in the second reference image is suitable for updating the corresponding area or the related area in the first reference image; otherwise, determining that the local area in the second reference image is not suitable for updating the corresponding area or the related area in the first reference image.

Preferably, a specific implementation is as follows:

First step: Perform predictive coding on a current to-be-encoded frame $F_i$, that is, the second reference image, where $F_i$ may use $cRef_{i-1}$, that is, the first reference image, as a reference frame of $F_i$ to perform inter-frame prediction, or may use another short-term reference frame to perform inter-frame prediction, and $cRef_{i-1}$ is a reference frame that is locally updated by using a reconstructed pixel value of an encoded frame before F.

Second step: Obtain coding information and a transform coefficient after quantization of each area in the current frame, and perform entropy coding on the coding information and the transform coefficient and write the coding information and the transform coefficient into the bitstream, where the coding information includes a coding mode and the like of each code block in the area.

Third step: Obtain an area satisfying the following condition (14):

$$\Sigma|Coef_i| > \text{Threshold}_6 \quad (14)$$

If satisfying the condition (14), an area is suitable for updating the corresponding area or the related area in the first reference image; otherwise, the area is not suitable for updating the corresponding area or the related area in the first reference image.

In a fourth feasible implementation, the method includes:
obtaining transform coefficient information of the local area in the second reference image, where the transform coefficient information includes an average value of absolute values of transform coefficients within coverage of the local area; and
determining, when the average value of the absolute values of the transform coefficients within the coverage of the local area is greater than a seventh threshold, that the local area in the second reference image is suitable for updating the corresponding area or the related area in the first reference image; otherwise, determining that the local area in the second reference image is not suitable for updating the corresponding area or the related area in the first reference image.

Preferably, a specific implementation is as follows:

First step: Perform predictive coding on a current to-be-encoded frame $F_i$, that is, the second reference image, where $F_i$ may use $cRef_{i-1}$, that is, the first reference image, as a reference frame of $F_i$ to perform inter-frame prediction, or may use another short-term reference frame to perform inter-frame prediction, and $cRef_{i-1}$ is a reference frame that is locally updated by using a reconstructed pixel value of an encoded frame before F.

Second step: Obtain coding information and a transform coefficient after quantization of each area in the current frame, and perform entropy coding on the coding information and the transform coefficient and write the coding information and the transform coefficient into the bitstream, where the coding information includes a coding mode and the like of each code block in the area.

Third step: Obtain an area satisfying the following condition (15), where numBlock indicates a quantity of areas included in the current frame:

$$\frac{1}{numBlock}\sum|Coef_i| > \text{Threshold}_7 \quad (15)$$

If satisfying the condition (15), an area is suitable for updating the corresponding area or the related area in the first reference image; otherwise, the area is not suitable for updating the corresponding area or the related area in the first reference image.

In a fifth feasible implementation, the method includes:
counting a quantity of bits for encoding the local area in the second reference image and a quantity of bits for encoding a previous encoded area of the corresponding area or the related area in the first reference image; and
determining, when the quantity of bits for encoding the local area in the second reference image is greater than the quantity of bits for encoding the previous encoded area of the corresponding area or the related area in the first reference image, that the local area in the second reference image is suitable for updating the corresponding area or the related area in the first reference image; otherwise, determining that the local area in the second reference image is not suitable for updating the corresponding area or the related area in the first reference image.

In a sixth feasible implementation, the method includes:
counting a quantity of bits for encoding the local area in the second reference image and an average quantity of bits for encoding an area in a previous encoded frame of the corresponding area or the related area in the first reference image; and determining, when the quantity of bits for encoding the local area in the second reference image is greater than the average quantity of bits for encoding the area in the previous encoded frame of the corresponding area or the related area in the first reference image, that the local area in the second reference image is suitable for updating the corresponding area or the related area in the first reference image; otherwise, determining that the local area in the second reference image is not suitable for updating the corresponding area or the related area in the first reference image.

In a seventh feasible implementation, the method includes:

obtaining motion vector information of the local area in the second reference image, where the motion vector information includes an average value of absolute values of lateral motion vectors in the local area and an average value of absolute values of longitudinal motion vectors in the local area; and determining, when the average value of the absolute values of the lateral motion vectors in the local area and the average value of the absolute values of the longitudinal motion vectors in the local area are both less than an eighth threshold, that the local area in the second reference image is suitable for updating the corresponding area or the related area in the first reference image; otherwise, determining that the local area in the second reference image is not suitable for updating the corresponding area or the related area in the first reference image.

Preferably, a specific implementation is as follows:

First step: Perform predictive coding on a current to-be-encoded frame $F_i$, that is, the second reference image, where $F_i$ may use $cRef_{i-1}$, that is, the first reference image, as a reference frame of $F_i$ to perform inter-frame prediction, or may use another short-term reference frame to perform inter-frame prediction, and $cRef_{i-1}$ is a reference frame that is locally updated by using a reconstructed pixel value of an encoded frame before $F_i$.

Second step: Obtain coding information and a transform coefficient after quantization of each area in the current frame, and perform entropy coding on the coding information and the transform coefficient and write the coding information and the transform coefficient into the bitstream, where the coding information includes a coding mode and the like of each code block in the area.

Third step: Obtain an area satisfying the following condition (16):

$$\begin{cases} \frac{1}{M}\sum_{i=0}^{M}|MVx_i| < \text{Threshold}_8 \\ \frac{1}{M}\sum_{i=0}^{M}|MVy_i| < \text{Threshold}_8 \end{cases} \quad (16)$$

In the formula (16), M indicates a quantity of code blocks included in a current area, and $MV_x$ and $MV_y$ respectively indicate a lateral motion vector and a longitudinal motion vector of each code block. An average value of absolute values of the lateral motion vectors of all the code blocks in the current area and an average value of absolute values of the longitudinal motion vectors of all the code blocks in the current area are calculated; and the two average values are separately compared with a threshold Thresholds. If satisfying the condition (16), an area is suitable for updating the corresponding area or the related area in the first reference image; otherwise, the area is not suitable for updating the corresponding area or the related area in the first reference image.

In an eighth feasible implementation, the method includes:

obtaining motion vector information of the local area in the second reference image, where the motion vector information includes an average value of a sum of absolute values of lateral motion vectors in the local area and absolute values of longitudinal motion vectors in the local area, and an average value of a sum of absolute values of lateral motion vectors in a previous encoded frame of the second reference image and absolute values of longitudinal motion vectors in the previous encoded frame of the second reference image; and determining, when the average value of the sum of the absolute values of the lateral motion vectors in the local area and the sum of the absolute values of the longitudinal motion vectors in the local area is less than the average value of the sum of the absolute values of the lateral motion vectors in the previous encoded frame and the sum of the absolute values of the longitudinal motion vectors in the previous encoded frame, that the local area in the second reference image is suitable for updating the corresponding area or the related area in the first reference image; otherwise, determining that the local area in the second reference image is not suitable for updating the corresponding area or the related area in the first reference image.

Preferably, a specific implementation is as follows:

First step: Perform predictive coding on a current to-be-encoded frame $F_i$, that is, the second reference image, where $F_i$ may use $cRef_{i-1}$, that is, the first reference image, as a reference frame of $F_i$ to perform inter-frame prediction, or may use another short-term reference frame to perform inter-frame prediction, and $cRef_{i-1}$ is a reference frame that is locally updated by using a reconstructed pixel value of an encoded frame before F.

Second step: Obtain coding information and a transform coefficient after quantization of each area in the current frame, and perform entropy coding on the coding information and the transform coefficient and write the coding information and the transform coefficient into the bitstream, where the coding information includes a coding mode and the like of each code block in the area.

Third step: Obtain an area satisfying the following condition (17):

$$\frac{1}{M}\sum_{i=0}^{M}(|MVx_i|+|MVy_i|) < \frac{1}{N}\sum_{j=0}^{N}(|MVx_j|+|MVy_j|) \quad (17)$$

In the formula (17), M indicates a quantity of code blocks included in a current area; N indicates a quantity of code blocks included in a previous encoded frame/a previous decoded frame; and $MV_x$ and $MV_y$ respectively indicate a lateral motion vector and a longitudinal motion vector of each code block. If satisfying the condition (17), an area is suitable for updating the corresponding area or the related area in the first reference image; otherwise, the area is not suitable for updating the corresponding area or the related area in the first reference image.

In step S3400, the reference image update information used to determine whether the local area in the second reference image is used to update the corresponding area or the related area in the first reference image is compiled into the bitstream. An implementation of compiling the reference image update information into the bitstream includes:

In a first feasible implementation, the method includes:

when the local area in the second reference image is used to update the corresponding area or the related area in the first reference image, the flag is a first value; or when the local area in the second reference image is not used to update the corresponding area or the related area in the first reference image, the flag is a second value; and the first value is different from the second value; and compiling a value of the flag into the bitstream.

Preferably, a specific implementation is as follows:

When the local area in the second reference image is used to update the corresponding area or the related area in the first reference image, the flag is set to 1 and is compiled into the bitstream; otherwise, the flag is set to 0 and is compiled into the bitstream.

In a second feasible implementation, the method includes:
when the local area in the second reference image is used to update the corresponding area or the related area in the first reference image, the quantization parameter offset value falls within a third value range; or when the local area in the second reference image is not used to update the corresponding area or the related area in the first reference image, the quantization parameter offset value falls outside a third value range; and
compiling the quantization parameter offset value into the bitstream.

Preferably, a specific implementation is as follows:

If a current area is the local area used to update the corresponding area or the related area in the first reference image, a difference $\Delta QP$ between a QP ($QP_{area}$) and a frame-level QP ($QP_{Slice}$) of the area is set according to a textural characteristic of the area. In this embodiment, a method of using a variance of a luminance value of a pixel in the area to measure a textural characteristic of the area is used. For example, in a formula (18), $\Delta QP$ is obtained through calculation by using a ratio of a variance of a luminance value of a pixel in an update area to an average value of variances of luminance values of pixels in all areas in the current to-be-encoded frame, where $10 \leq |\Delta QP| < 20$. In the formula, $x_{i,n}$ indicates a luminance value of a pixel i in an area numbered n, $\bar{x}_n$ indicates an average value of luminance values of all pixels in the area numbered n, and N indicates a quantity of areas in the current frame:

$$\Delta QP = -10 \times \left(1 + \frac{1}{1 + \frac{V_n}{\bar{V}}}\right), \quad (18)$$

$$\bar{V} = \frac{1}{N}\sum_{n=0}^{N} V_n, \quad V_n = \sum_{i=0}^{AreaSize} (x_{i,n} - \bar{x}_n)^2$$

It may be understood that, in this embodiment, a method of using a variance to measure a textural characteristic is used, or another method may be used for measurement. In addition, $\Delta QP$ may be set according to other characteristics, such as a motion characteristic than the textural characteristic.

The quantization parameter offset value $\Delta QP$ is compiled into the bitstream as coding information.

It should be understood that, in this embodiment of the present disclosure, a preferred value is provided as the quantization parameter offset, but the value of the quantization parameter or the quantization parameter offset is not limited in the present disclosure.

In a third feasible implementation, the method includes:
when the local area in the second reference image is used to update the corresponding area or the related area in the first reference image, the scale factor of the quantization step falls within a fourth value range; or when the local area in the second reference image is not used to update the corresponding area or the related area in the first reference image, the scale factor of the quantization step falls outside a fourth value range; and
compiling the scale factor of the quantization step into the bitstream.

Preferably, a specific implementation is as follows:

When the local area in the second reference image is used to update the corresponding area or the related area in the first reference image, the encoder side adaptively adjusts the quantization step (Quantization Step, Qstep), encodes the scale factor of the quantization step, and transmits the scale factor of the quantization step to the decoder side. The scale factor F of the quantization step of the area is not equal to 1.

A calculation formula of the scale factor F is shown in the following (19), and the scale factor F falls within a value range of 0.5 to 1.5.

$$F = \frac{3^{\frac{V_n}{\bar{V}}+1} - 1}{2 \times 3^{\frac{V_n}{\bar{V}}} + 2}, \quad (19)$$

$$\bar{V} = \frac{1}{N}\sum_{n=0}^{N} V_n V_n = \sum_{i=0}^{AreaSize} (x_{i,n} - \bar{x}_n)^2$$

A calculation formula of a quantization step of an area is shown in the following (20):

$$Qstep = 2^{\frac{QP-4}{6}} \times F \quad (20)$$

The scale factor F of the quantization step is compiled into the bitstream as coding information.

It should be understood that, in this embodiment of the present disclosure, a preferred value is provided for a value of the scale factor, but the value of the scale factor is not limited in the present disclosure.

In a fourth feasible implementation, the method includes:
determining, when the sum of the absolute values of the transform coefficients within the coverage of the local area is greater than a ninth threshold, and the corresponding area or the related area in the first reference image is not updated, that the local area in the second reference image is used to update the corresponding area or the related area in the first reference image; otherwise, determining that the local area in the second reference image is not used to update the corresponding area or the related area in the first reference image; and
compiling the transform coefficient information into the bitstream.

Preferably, a specific implementation corresponds to the decoder side and is not repeated again, and the transform coefficient information is compiled into the bitstream as coding information.

In a fifth feasible implementation, the method includes:
determining, when the average value of the absolute values of the transform coefficients within the coverage of the local area is greater than a tenth threshold, and the corresponding area or the related area in the first reference image is not updated, that the local area in the second reference image is used to update the corresponding area or the related area in the first reference image; otherwise, determining that the local area in the second reference image is not used to update the corresponding area or the related area in the first reference image; and compiling the transform coefficient information into the bitstream.

Preferably, a specific implementation corresponds to the decoder side and is not repeated again, and the transform coefficient information is compiled into the bitstream as coding information.

In a sixth feasible implementation, the method includes:
determining, when the average value of the absolute values of the lateral motion vectors in the local area and the average value of the absolute values of the longitudinal motion vectors in the local area are both less than an eleventh threshold, and the corresponding area or the related area in the first reference image is not updated, that the local area in the second reference image is used to update the corresponding area or the related area in the first reference image; otherwise, determining that the local area in the second reference image is not used to update the corresponding area or the related area in the first reference image; and compiling the motion vector information into the bitstream.

Preferably, a specific implementation corresponds to the decoder side and is not repeated again, and the motion vector information is compiled into the bitstream as coding information.

In a seventh feasible implementation, the method includes:
determining, when the average value of the sum of the absolute values of the lateral motion vectors in the local area and the sum of the absolute values of the longitudinal motion vectors in the local area is less than the average value of the sum of the absolute values of the lateral motion vectors in the previous encoded frame and the sum of the absolute values of the longitudinal motion vectors in the previous encoded frame, and the corresponding area or the related area in the first reference image is not updated, that the local area in the second reference image is used to update the corresponding area or the related area in the first reference image; otherwise, determining that the local area in the second reference image is not used to update the corresponding area or the related area in the first reference image; and compiling the motion vector information into the bitstream.

Preferably, a specific implementation corresponds to the decoder side and is not repeated again, and the motion vector information is compiled into the bitstream as coding information.

An implementation of the encoding a to-be-encoded sequence, to obtain a reconstructed image of a second reference image in step S3100 includes:

In a first feasible implementation, the method includes: encoding a to-be-encoded image of the second reference image by using a fixed quantization parameter, where a first quantization parameter is used for the local area, and a second quantization parameter for an area that is not the local area.

Preferably, a specific implementation is as follows:
Quantization is performed on a transform coefficient after transformation by using a quantization parameter (Quantization Parameter, QP) obtained through calculation by using the following formula (21), where $QP_{Slice}$ is a frame-level QP, an update area is the local area, and a non-update area is another area. Table 2 shows correspondences between $QP_{Slice}$ and $\Delta QP$.

$$QP' = \begin{cases} QP_{Slice} - \Delta QP, \text{ Update area} \\ QP_{Slice}, \text{ Non-update area} \end{cases} \quad (21)$$

$$QP = \begin{cases} 0, QP' < 0 \\ 51, QP' > 51 \end{cases}$$

TABLE 2

| Value table of $\Delta QP$ | | | |
|---|---|---|---|
| | Value range of $QP_{Slice}$ | | |
| | 0-10 | 10-37 | 37-51 |
| $\Delta QP$ | 0 | 5 | 10 |

The frame-level QP minus $\Delta QP$ is used as a quantization parameter of the local area, and the frame-level QP is used as a quantization parameter of another area.

It should be understood that, in this embodiment of the present disclosure, a preferred value is provided as the quantization parameter, but the value of the quantization parameter is not limited in the present disclosure.

In a second feasible implementation, the method includes: encoding a to-be-encoded image of the second reference image by using an adaptive quantization parameter, where a quantization parameter is determined for the local area according to at least one of texture information or motion information, and for an area that is not the local area, a frame-level quantization parameter is used or a quantization parameter is set and determined according to a bit rate allocation policy or a quality control policy specified by an encoder.

Preferably, a specific implementation is as follows:
If a current area is not the local area, a QP ($QP_{area}$) of the current area is set to be a frame-level QP, or $\Delta QP$ of the current area may be set according to a bit rate allocation policy or a quality control policy specified by the encoder. A value range of an absolute value of $\Delta QP$ is shown in a formula (22), an update area is the local area, and a non-update area is another area:

$$\begin{cases} 10 \le |\Delta QP| < 20, \text{ Update area} \\ 0 \le |\Delta QP| < 10, \text{ Non-update area} \end{cases}, QP'_{area} = QP_{Slice} + \Delta QP \quad (22)$$

$$QP_{area} = \begin{cases} 0, QP'_{area} < 0 \\ 51, QP'_{area} > 51 \end{cases}$$

A quantization parameter in the formula (22) is used as a quantization parameter of each area in the second reference image.

It should be understood that, in this embodiment of the present disclosure, a preferred value is provided as the quantization parameter, but the value of the quantization parameter is not limited in the present disclosure.

In step S3200, it is determined whether the local area in the second reference image is suitable for updating the corresponding area or the related area in the first reference image. An implementation of determining the corresponding area or the related area in the first reference image includes:

In a first feasible implementation, the corresponding area in the first reference image is an area that is in the first reference image and that has same location coordinates as the local area in the second reference image.

In a second feasible implementation, when an area that is in the first reference image and that has same location coordinates as the local area in the second reference image is updated, areas in the first reference image are sequentially searched in a preset order, where the corresponding area in the first reference image is a first area that is not updated in the order; otherwise, the corresponding area in the first reference image is an area that is in the first reference image and that has same location coordinates as the local area in the second reference image.

Preferably, a specific implementation corresponds to the decoder side and is not repeated again.

In a third feasible implementation, the reference image update information further includes spatial offsets between the location coordinates of the local area and location coordinates of the related area in the first reference image, and the spatial offsets include a lateral offset and a longitudinal offset. A location of the related area in the first reference image is determined according to the location coordinates of the local area in the second reference image and the spatial offsets. The implementation may also be expressed as: the parsing the bitstream, to obtain reference image update information, and determining, according to the reference image update information, whether a local area in the second reference image is used to update a corresponding area or a related area in the first reference image further includes: obtaining spatial offsets between location coordinates of the local area and location coordinates of the related area in the first reference image, where the spatial offsets include a lateral offset and a longitudinal offset; and before the replacing a pixel value of the corresponding area or the related area in the first reference image with a pixel value of the local area in the second reference image, determining a location of the related area in the first reference image according to the location coordinates of the local area in the second reference image and the spatial offsets.

Preferably, a specific implementation corresponds to the decoder side and is not repeated again.

Optionally, after S3400, that is, compile, into the bitstream, reference image update information used to determine whether the local area in the second reference image is used to update the corresponding area or the related area in the first reference image, the method further includes:

S3500: Perform filtering at a boundary between the corresponding area or the related area in the first reference image after pixel value replacement and a neighboring area.

Preferably, a specific implementation is the same as that of S1400.

Therefore, according to the reference image encoding method in this embodiment of the present disclosure, the encoding device locally updates the first reference image by using update information of a subsequent reference image in a pixel copy manner. Therefore, decoding complexity is reduced while compression efficiency is improved by using the first reference image, and a delay that is brought about by a sharp increase in a bit rate is also avoided.

Figure 7:
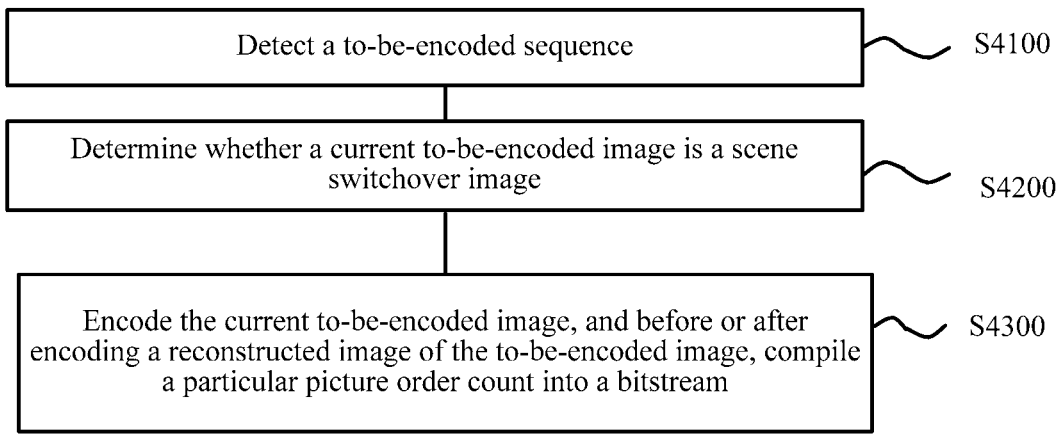
FIG. 7 is a schematic flowchart of a reference image encoding method according to another embodiment of the present disclosure.

FIG. 7 is a schematic flowchart of a reference image encoding method according to an embodiment of the present disclosure. The method shown in FIG. 7 may be performed by an encoding device, for example, an encoder. Specifically, as shown in FIG. 7, the method 4000 includes the following steps.

S4100: Detect a to-be-encoded sequence.

S4200: Determine whether a current to-be-encoded image is a scene switchover image.

S4300: Encode the current to-be-encoded image, and before or after a reconstructed image of the to-be-encoded image is encoded, compile a particular picture order count into a bitstream.

Figure 8:
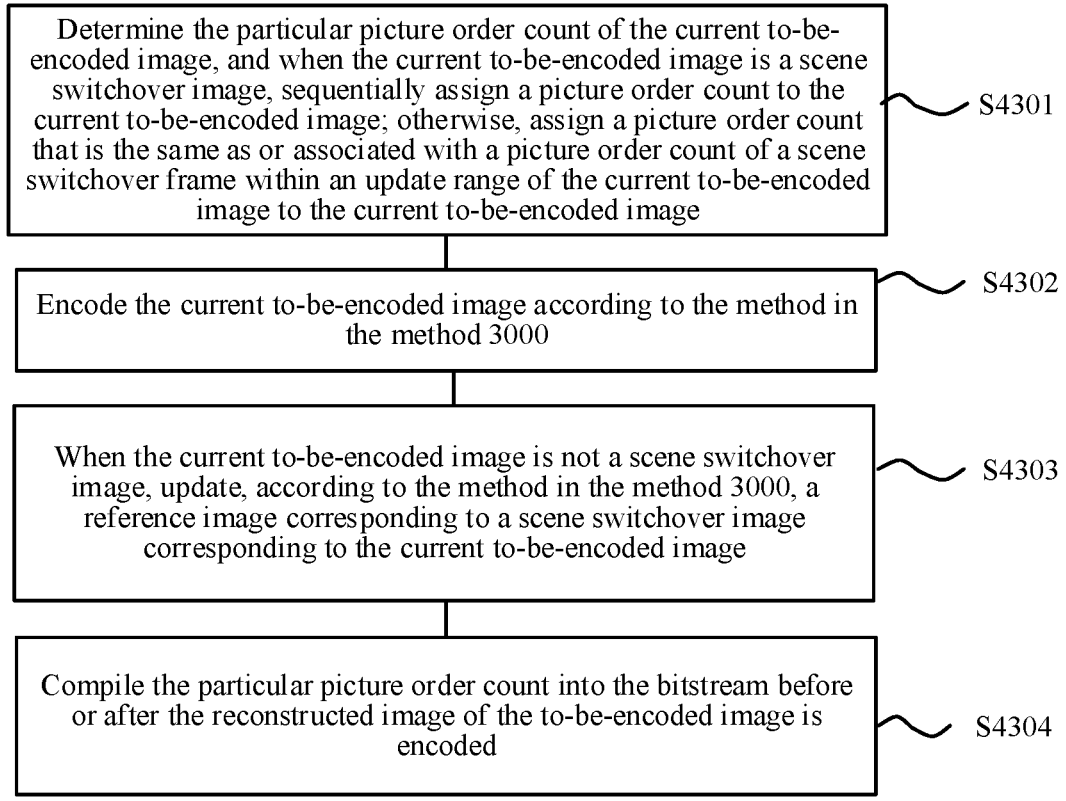
FIG. 8 is another schematic flowchart of a reference image encoding method according to another embodiment of the present disclosure.

Preferably, as shown in FIG. 8, S4300 includes:

S4301: Determine the particular picture order count of the current to-be-encoded image, and when the current to-be-encoded image is a scene switchover image, sequentially assign a picture order count to the current to-be-encoded image; otherwise, assign a picture order count that is the same as or associated with a picture order count of a scene switchover image within an update range of the current to-be-encoded image to the current to-be-encoded image.

S4302: Encode the current to-be-encoded image according to the method in the method 3000.

S4303: When the current to-be-encoded image is not a scene switchover image, update, according to the method in the method 3000, a reference image corresponding to a scene switchover image corresponding to the current to-be-encoded image.

S4304: Compile the particular picture order count into the bitstream before or after the reconstructed image of the to-be-encoded image is encoded.

It may be understood that, a scene switchover image is a to-be-encoded image corresponding to the first reference image in the method 3000, or may be a first frame, a random access image, or the like that has a reference relationship with another video frame in a same video segment. This is not limited in the present disclosure.

It may be understood that, in the to-be-encoded sequence, there may be one or more scene switchover images or random access images. This is not limited in the present disclosure.

Figure 9:
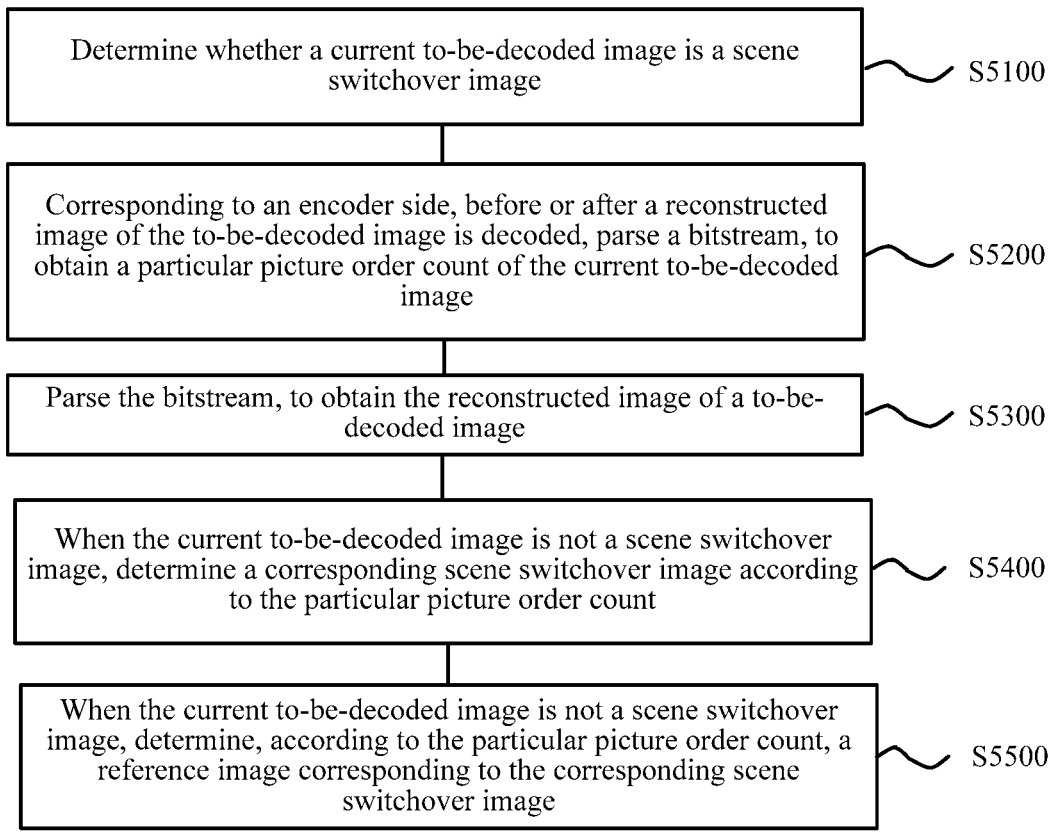
FIG. 9 is a schematic flowchart of a reference image decoding method according to another embodiment of the present disclosure.

FIG. 9 is a schematic flowchart of a reference image decoding method according to an embodiment of the present disclosure. The method shown in FIG. 9 may be performed by a decoding device, for example, a decoder. Specifically, as shown in FIG. 9, the method 5000 includes the following steps.

S5100: Determine whether a current to-be-decoded image is a scene switchover image.

S5200: Corresponding to an encoder side, before or after a reconstructed image of the to-be-decoded image is decoded, parse a bitstream, to obtain a particular picture order count of the current to-be-decoded frame/image.

S5300: Parse the bitstream, to obtain the reconstructed image of the to-be-decoded image.

S5400: When the current to-be-decoded image is not a scene switchover image, determine a corresponding scene switchover image according to the particular picture order count.

S5500: When the current to-be-decoded image is not a scene switchover image, update, according to the method 1000 or 2000, a reference image corresponding to the corresponding scene switchover image that is determined according to the particular picture order count.

It may be understood that, a scene switchover image is a to-be-decoded image corresponding to the first reference image in the method 1000 or a to-be-decoded image corresponding to the first reference image in the method 2000, or may be a first frame, a random access image, or the like that has a reference relationship with another video frame in a same video segment. This is not limited in the present disclosure.

It may be understood that, in a to-be-decoded sequence, there may be one or more scene switchover images or random access images. This is not limited in the present disclosure.

Figure 10:
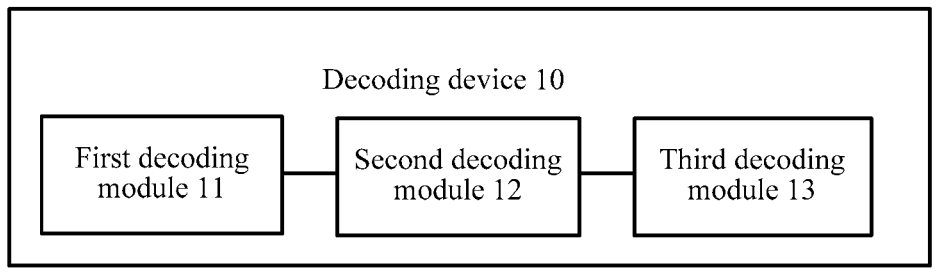
FIG. 10 is a schematic block diagram of a reference image decoding apparatus according to an embodiment of the present disclosure.

FIG. 10 is a schematic block diagram of a reference image decoding apparatus according to an embodiment of the present disclosure. As shown in FIG. 10, the decoding device 10 includes:

a first decoding module 11, configured to parse a bitstream, to obtain a reconstructed image of a first reference image and a reconstructed image of a second reference image, where the first reference image is decoded before the second reference image;

a second decoding module 12, configured to: before the bitstream is parsed, to obtain the reconstructed image of the second reference image, or when the bitstream is parsed, to obtain the reconstructed image of the second reference image, or after the bitstream is parsed, to obtain the reconstructed image of the second reference image, parse the bitstream, to obtain reference image update information, and determine, according to the reference image update information, whether a local area in the second reference image is used to update a corresponding area or a related area in the first reference image, where a size of the local area is less than or equal to a size of the second reference image; and a third decoding module 13, configured to: when it is determined, according to the reference image update information, that the local area in the second reference image is used to update the corresponding area or the related area in the first reference image, replace a pixel value of the corresponding area or the related area in the first reference image with a pixel value of the local area in the second reference image.

Specifically, the decoding device parses the bitstream, to obtain the first reference image and the second reference image, and corresponding to an encoder side, before, when, or after parsing the bitstream, to obtain the reconstructed image of the second reference image, parses the reference image update information, determines, according to the update information, whether the local area in the second reference image is used to update the corresponding area or the related area in the first reference image, and if it is determined that the local area in the second reference image is used to update the corresponding area or the related area in the first reference image, replaces the pixel value of the corresponding area or the related area in the first reference image with the pixel value of the local area in second reference image.

Therefore, according to the reference image decoding apparatus in this embodiment of the present disclosure, the decoding device locally updates the first reference image by using update information of a subsequent reference image in a pixel copy manner. Therefore, decoding complexity is reduced while compression efficiency is improved by using the first reference image, and a delay that is brought about by a sharp increase in a bit rate is also avoided.

It should be understood that, in this embodiment of the present disclosure, the local area in the second reference image may be one of a largest coding unit (LCU), a coding unit (CU), a coding unit group (CU group), or an image area of a preset size. This is not limited in the present disclosure.

It should be understood that, in this embodiment of the present disclosure, the first reference image is an image decoded before the second reference image, and is used as a reference image of a subsequent image in a video segment in which the first reference image is located. The first reference image may be a first frame of reconstructed image obtained by parsing the bitstream, or may be a random access point image obtained by parsing the bitstream. This is not limited in the present disclosure.

It should be understood that, in this embodiment of the present disclosure, that before the parsing a bitstream, to obtain a reconstructed image of a second reference image, or during the parsing a bitstream, to obtain a reconstructed image of a second reference image, or after the parsing a bitstream, to obtain a reconstructed image of a second reference image, the bitstream is parsed, to obtain the reference image update information means that, corresponding to a coding scheme of the encoder side, a location of the reference image update information in the bitstream may be before, between, or after coding information of the second reference image, and the reference image update information may exist in the bitstream as a part of the coding information of the second reference image. This is not limited in the present disclosure.

An implementation in which the second decoding module 12 is configured to: parse the bitstream, to obtain the reference image update information, and determine, according to the reference image update information, whether the local area in the second reference image is used to update the corresponding area or the related area in the first reference image includes:

In a first feasible implementation, the second decoding module is specifically configured to:

parse the bitstream, to obtain a flag; and determine, if the flag is a first value, that the local area in the second reference image is used to update the corresponding area or the related area in the first reference image; or determine, if the flag is a second value, that the local area in the second reference image is not used to update the corresponding area or the related area in the first reference image, where the first value is different from the second value.

Preferably, a specific implementation is: reading a reference image update flag of each area in a current to-be-decoded frame from the bitstream, where 1 indicates that the area is used to update the first reference image, and 0 indicates that the area is not used to update the first reference image.

In a second feasible implementation, the second decoding module is specifically configured to:

parse the bitstream, to obtain coding information, and determine, according to the coding information and a preset rule, whether the local area in the second reference image is used to update the corresponding area or the related area in the first reference image.

The coding information includes a quantization parameter offset value of the local area in the second reference image; and correspondingly, the second decoding module is specifically configured to: determine, when an absolute value of the quantization parameter offset value falls within a first value range, that the local area in the second reference image is used to update the corresponding area or the related area in the first reference image; or determine, when an absolute value of the quantization parameter offset value falls outside a first value range, that the local area in the second reference image is not used to update the corresponding area or the related area in the first reference image.

Preferably, a specific implementation is: reading a quantization parameter offset value ($\Delta QP$) of each area in a current to-be-decoded frame from the bitstream, and determining, according to a range of an absolute value of the quantization parameter offset value, whether the area is used to update the first reference image, where if 10≤|ΔQP|<20, the area is used to update the first reference image; or if 0≤|ΔΔQP|<10, the area is not used to update the first reference image.

It should be understood that, in this embodiment of the present disclosure, a preferred value is provided as the quantization parameter offset value, but the value of the quantization parameter offset value is not limited in the present disclosure.

In a third feasible implementation, the second decoding module is specifically configured to:

parse the bitstream, to obtain coding information, and determine, according to the coding information and a preset rule, whether the local area in the second reference image is used to update the corresponding area or the related area in the first reference image.

The coding information includes a scale factor of a quantization step of the local area in the second reference image; and correspondingly, the second decoding module is specifically configured to: determine, when the scale factor of the quantization step falls within a second value range, that the local area in the second reference image is used to update the corresponding area or the related area in the first reference image; or determine, when the scale factor of the quantization step falls outside a second value range, that the local area in the second reference image is not used to update the corresponding area or the related area in the first reference image.

Preferably, a specific implementation is: reading the scale factor from the bitstream to determine whether the local area in the second reference image is used to update the corresponding area or the related area in the first reference image.

A calculation formula of the scale factor F is shown in the following (23), and the scale factor F falls within a value range of 0.5 to 1.5.

$$F = \frac{3^{\frac{\bar{V}_n}{\bar{V}}+1} - 1}{2 \times 3^{\frac{\bar{V}_n}{\bar{V}}} + 2}, \quad (23)$$

$$\bar{V} = \frac{1}{N}\sum_{n=0}^{N} V_n, \quad V_n = \sum_{i=0}^{AreaSize}(x_{i,n} - \bar{x}_n)^2$$

A calculation formula of a quantization step of an area is shown in the following (24):

$$Qstep = 2^{\frac{QP-4}{6}} \times F \quad (24)$$

When the scale factor F is 1, the area is not used to update the first reference image; otherwise, the area is used to update the first reference image.

It should be understood that, in this embodiment of the present disclosure, a preferred value is provided for a value of the scale factor, but the value of the scale factor is not limited in the present disclosure.

The second decoding module 12 is configured to determine, according to the reference image update information, whether the local area in the second reference image is used to update the corresponding area or the related area in the first reference image. An implementation of determining the corresponding area or the related area in the first reference image includes:

In a first feasible implementation, the corresponding area in the first reference image is an area that is in the first reference image and that has same location coordinates as the local area in the second reference image.

In a second feasible implementation, the second decoding module is further specifically configured to: obtain spatial offsets between location coordinates of the local area and location coordinates of the related area in the first reference image, where the spatial offsets include a lateral offset and a longitudinal offset; and before the third decoding module replaces the pixel value of the corresponding area or the related area in the first reference image with the pixel value of the local area in the second reference image, determine a location of the related area in the first reference image according to the location coordinates of the local area in the second reference image and the spatial offsets.

Preferably, a specific implementation is: for an area used to update the corresponding area or the related area in the first reference image, reading ($cMV_x$, $cMV_y$) from the bitstream, and obtaining, according to ($cMV_x$, $cMV_y$) and a location ($Cur_x$, $Cur_y$) of the area and according to a formula (25), an update location that is of the area and that is in the first reference image:

$$Des_x = Cur_x + cMV_x, Des_y = Cur + cMV_y \quad (25)$$

Optionally, after the third decoding module 13 is configured to: when it is determined, according to the reference image update information, that the local area in the second reference image is used to update the corresponding area or the related area in the first reference image, replace the pixel value of the corresponding area or the related area in the first reference image with the pixel value of the local area in the second reference image, the decoding device further includes: a fourth decoding module 14, configured to perform filtering at a boundary between the corresponding area or the related area in the first reference image after pixel value replacement and a neighboring area.

Preferably, a specific implementation is as follows:

First step: Perform filtering processing on a pixel near a vertical boundary between an update area and a neighboring area at the right of the update area. As shown in FIG. 2, P indicates the update area, Q indicates the neighboring area at the right of the update area, and there are pixels $p_{i,row}$ and $q_{i,row}$ in a red box, where i=0, 1, and 2, respectively indicating three pixels, that is, to-be-filtered pixels that are closest to the vertical boundary and that are in each row of P and Q, a value of a to-be-filtered pixel is obtained through calculation by using a formula (26), and a row coordinate row in a subscript of a pixel is omitted in the formula:

$p_0'=(p_2+2p_1+2p_0+2q_0+q_1+4)/8$ $p_1'=(p_2+p_1+p_0+q_0+2)/4$ $p_2'=(2p_3+3p_2+p_1+p_0+q_0+4)/8$, $q_0'=(q_2+2q_1+2q_0+2p_0+p_1+4)/8$ $q_1'=(q_2+q_1+q_0+p_0+2)/4$ $q_2'=(2q_2+3q_2+q_1+q_0+p_0+4)/8 \quad (26)$ Second step: Perform filtering processing on a pixel near a vertical boundary between the update area and a neighboring area at the left of the update area. A processing method is the same as that in the first step.

Third step: Perform filtering processing on a pixel near a horizontal boundary between the update area and a neighboring area above the update area. As shown in FIG. 3, P indicates the update area, Q indicates the neighboring area above the update area, and there are pixels $p_{col,j}$ and $q_{col,j}$ in a red box, where j=0, 1, and 2, respectively indicating three pixels, that is, to-be-filtered pixels that are closest to the horizontal boundary and that are in each column of P and Q, a value of a to-be-filtered pixel is obtained through calculation by using the formula (26), and a column coordinate col in a subscript of a pixel is omitted in the formula.

Fourth step: Perform filtering processing on a pixel near a horizontal boundary between the update area and a neighboring area below the update area. A processing method is the same as that in the first step.

Figure 11:
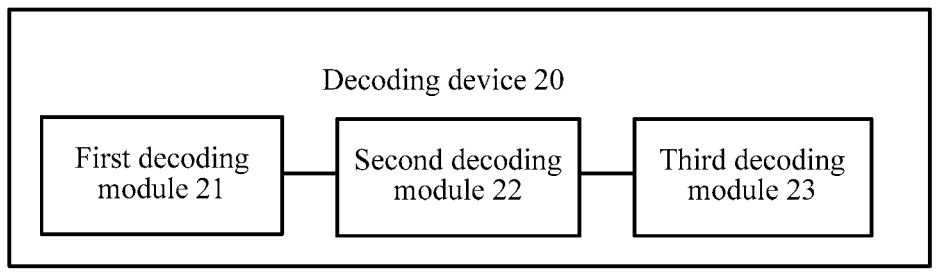
FIG. 11 is another schematic block diagram of a reference image decoding apparatus according to an embodiment of the present disclosure.

FIG. 11 is a schematic block diagram of a reference image decoding apparatus according to an embodiment of the present disclosure. As shown in FIG. 11, the decoding device 20 includes:

- a first decoding module 21, configured to parse a bitstream, to obtain a reconstructed image of a first reference image and a reconstructed image of a second reference image, where the first reference image is decoded before the second reference image;
- a second decoding module 22, configured to: before the bitstream is parsed, to obtain the reconstructed image of the second reference image, or when the bitstream is parsed, to obtain the reconstructed image of the second reference image, or after the bitstream is parsed, to obtain the reconstructed image of the second reference image, parse the bitstream, to obtain reference image update information, and determine, according to the reference image update information, whether a local area in the second reference image is suitable for updating a corresponding area or a related area in the first reference image, where a size of the local area is less than or equal to a size of the second reference image; and
- a third decoding module 23, configured to: determine whether the corresponding area or the related area in the first reference image is updated; and when the corresponding area or the related area in the first reference image is not updated, and it is determined, according to the reference image update information, that the local area in the second reference image is suitable for updating the corresponding area or the related area in the first reference image, replace a pixel value of the corresponding area or the related area in the first reference image with a pixel value of the local area in the second reference image.

Specifically, the decoding device parses the bitstream, to obtain the first reference image and the second reference image, and corresponding to an encoder side, before, when, or after parsing the bitstream, to obtain the reconstructed image of the second reference image, parses the reference image update information, determines, according to the update information, whether the local area in the second reference image is used to update the corresponding area or the related area in the first reference image, and if it is determined that the local area in the second reference image is used to update the corresponding area or the related area in the first reference image, replaces the pixel value of the corresponding area or the related area in the first reference image with the pixel value of the local area in second reference image.

Therefore, according to the reference image decoding method in this embodiment of the present disclosure, the decoding device locally updates the first reference image by using update information of a subsequent reference image in a pixel copy manner. Therefore, decoding complexity is reduced while compression efficiency is improved by using the first reference image, and a delay that is brought about by a sharp increase in a bit rate is also avoided.

It should be understood that, in this embodiment of the present disclosure, the local area in the second reference image may be one of a largest coding unit (LCU), a coding unit (CU), a coding unit group (CU group), or an image area of a preset size. This is not limited in the present disclosure.

It should be understood that, in this embodiment of the present disclosure, the first reference image is an image decoded before the second reference image, and is used as a reference image of a subsequent image in a video segment in which the first reference image is located. The first reference image may be a first frame of reconstructed image obtained by parsing the bitstream, or may be a random access point image obtained by parsing the bitstream. This is not limited in the present disclosure.

It should be understood that, in this embodiment of the present disclosure, that before the parsing a bitstream, to obtain a reconstructed image of a second reference image, or during the parsing a bitstream, to obtain a reconstructed image of a second reference image, or after the parsing a bitstream, to obtain a reconstructed image of a second reference image, the bitstream is parsed, to obtain the reference image update information means that, corresponding to a coding scheme of the encoder side, a location of the reference image update information in the bitstream may be before, between, or after coding information of the second reference image, and the reference image update information may exist in the bitstream as a part of the coding information of the second reference image. This is not limited in the present disclosure.

An implementation in which the second decoding module 22 is configured to: parse the bitstream, to obtain the reference image update information, and determine, according to the reference image update information, whether the local area in the second reference image is suitable for updating the corresponding area or the related area in the first reference image includes:

In a first feasible implementation, the second decoding module is specifically configured to:
  parse the bitstream, to obtain a flag; and determine, if the flag is a first value, that the local area in the second reference image is suitable for updating the corresponding area or the related area in the first reference image; or determine, if the flag is a second value, that the local area in the second reference image is not suitable for updating the corresponding area or the related area in the first reference image, where the first value is different from the second value.

Preferably, a specific implementation is: reading a reference image update flag of each area in a current to-be-decoded frame from the bitstream, where 1 indicates that the area is suitable for updating the first reference image, and 0 indicates that the area is not suitable for updating the first reference image.

In a second feasible implementation, the second decoding module is specifically configured to:
  parse the bitstream, to obtain coding information, and determine, according to the coding information and a preset rule, whether the local area in the second reference image is suitable for updating the corresponding area or the related area in the first reference image.

The coding information includes transform coefficient information of the local area in the second reference image, and the transform coefficient information includes a sum of absolute values of transform coefficients within coverage of the local area; and correspondingly, the second decoding module is specifically configured to:
- determine, when the sum of the absolute values of the transform coefficients within the coverage of the local area is greater than a first threshold, that the local area in the second reference image is suitable for updating the corresponding area or the related area in the first reference image; otherwise, determine that the local area in the second reference image is not suitable for updating the corresponding area or the related area in the first reference image.

Preferably, a specific implementation is: reading a transform coefficient of each area in a current frame after quantization from the bitstream, to obtain an area satisfying the following condition (27):

$$\Sigma|Coef_i| > Threshold_9 \qquad (27)$$

If the condition (27) is satisfied, it is determined that the area is suitable for updating the first reference image; otherwise, it is determined that the area is not suitable for updating the first reference image.

In a third feasible implementation, the second decoding module is specifically configured to:
- parse the bitstream, to obtain coding information, and determine, according to the coding information and a preset rule, whether the local area in the second reference image is suitable for updating the corresponding area or the related area in the first reference image.

The coding information includes transform coefficient information of the local area in the second reference image, and the transform coefficient information includes an average value of absolute values of transform coefficients within coverage of the local area; and correspondingly, the second decoding module is specifically configured to:
- determine, when the average value of the absolute values of the transform coefficients within a range of the local area is greater than a second threshold, that the local area in the second reference image is suitable for updating the corresponding area or the related area in the first reference image; otherwise, determine that the local area in the second reference image is not suitable for updating the corresponding area or the related area in the first reference image.

Preferably, a specific implementation is: reading a transform coefficient of each area in a current frame after quantization from the bitstream, to obtain an area satisfying the following condition (28), where numBlock indicates a quantity of areas included in the current frame:

$$\frac{1}{numBlock}\sum |Coef_i| > Threshold_{10} \qquad (28)$$

If the condition (28) is satisfied, it is determined that the area is suitable for updating the first reference image; otherwise, it is determined that the area is not suitable for updating the first reference image.

In a fourth feasible implementation, the second decoding module is specifically configured to:
- parse the bitstream, to obtain coding information, and determine, according to the coding information and a preset rule, whether the local area in the second reference image is suitable for updating the corresponding area or the related area in the first reference image.

The coding information includes a quantization parameter offset value of the local area in the second reference image; and correspondingly, the second decoding module is specifically configured to: determine, when an absolute value of the quantization parameter offset value falls within a first value range, that the local area in the second reference image is suitable for updating the corresponding area or the related area in the first reference image; or determine, when an absolute value of the quantization parameter offset value falls outside a first value range, that the local area in the second reference image is not suitable for updating the corresponding area or the related area in the first reference image.

Preferably, a specific implementation is: reading a quantization parameter offset value ($\Delta QP$) of each area in a current to-be-decoded frame from the bitstream, and determining, according to a range of an absolute value of the quantization parameter offset value, whether the area is suitable for updating the first reference image, where if $10 \le |\Delta QP| < 20$, the area is suitable for updating the first reference image; or if $0 \le |\Delta QP| < 10$, the area is not suitable for updating the first reference image.

It should be understood that, in this embodiment of the present disclosure, a preferred value is provided as the quantization parameter offset value, but the value of the quantization parameter offset value is not limited in the present disclosure.

In a fifth feasible implementation, the second decoding module is specifically configured to:
- parse the bitstream, to obtain coding information, and determine, according to the coding information and a preset rule, whether the local area in the second reference image is suitable for updating the corresponding area or the related area in the first reference image.

The coding information includes a scale factor of a quantization step of the local area in the second reference image; and correspondingly, the second decoding module is specifically configured to: determine, when the scale factor of the quantization step falls within a second value range, that the local area in the second reference image is suitable for updating the corresponding area or the related area in the first reference image; or determine, when the scale factor of the quantization step falls outside a second value range, that the local area in the second reference image is not suitable for updating the corresponding area or the related area in the first reference image.

Preferably, a specific implementation is: reading the scale factor from the bitstream to determine whether the local area in the second reference image is suitable for updating the corresponding area or the related area in the first reference image.

A calculation formula of the scale factor F is shown in the following (29), and the scale factor F falls within a value range of 0.5 to 1.5.

$$F = \frac{3^{\frac{V_n}{\bar{V}}+1} - 1}{2 \times 3^{\frac{V_n}{\bar{V}}} + 2}, \qquad (29)$$

$$\bar{V} = \frac{1}{N}\sum_{n=0}^{N} V_n, \quad V_n = \sum_{i=0}^{LCUSize} (x_{i,n} - \bar{x}_n)^2$$

A calculation formula of a quantization step of an area is shown in the following (30):

$$Qstep = 2^{\frac{QP-4}{6}} \times F \qquad (30)$$

When the scale factor F is 1, the area is not suitable for updating the first reference image; otherwise, the area is suitable for updating the first reference image.

It should be understood that, in this embodiment of the present disclosure, a preferred value is provided for a value of the scale factor, but the value of the scale factor is not limited in the present disclosure.

In a sixth feasible implementation, the second decoding module is specifically configured to:

parse the bitstream, to obtain coding information, and determine, according to the coding information and a preset rule, whether the local area in the second reference image is suitable for updating the corresponding area or the related area in the first reference image.

The coding information includes motion vector information of the local area in the second reference image, and the motion vector information includes an average value of absolute values of lateral motion vectors in the local area and an average value of absolute values of longitudinal motion vectors in the local area; and correspondingly, the second decoding module is specifically configured to:

determine, when the average value of the absolute values of the lateral motion vectors in the local area and the average value of the absolute values of the longitudinal motion vectors in the local area are both less than a third threshold, that the local area in the second reference image is suitable for updating the corresponding area or the related area in the first reference image; otherwise, determine that the local area in the second reference image is not suitable for updating the corresponding area or the related area in the first reference image.

Preferably, a specific implementation is: obtaining an area satisfying the following condition (31):

$$\begin{cases} \frac{1}{M}\sum_{i=0}^{M}|MVx_i| < \text{Threshold}_{11} \\ \frac{1}{M}\sum_{i=0}^{M}|MVy_i| < \text{Threshold}_{11} \end{cases} \quad (31)$$

In the formula (31), M indicates a quantity of code blocks included in a current area, and $MV_x$ and $MV_y$ respectively indicate a lateral motion vector and a longitudinal motion vector of each code block. An average value of absolute values of the lateral motion vectors of all the code blocks in the current area and an average value of absolute values of the longitudinal motion vectors of all the code blocks in the current area are calculated. The two average values are separately compared with a threshold $\text{Threshold}_{11}$. If the condition (31) is satisfied, it is determined that the area is suitable for updating the first reference image; otherwise, it is determined that the area is not suitable for updating the first reference image.

In a seventh feasible implementation, the second decoding module is specifically configured to:

parse the bitstream, to obtain coding information, and determine, according to the coding information and a preset rule, whether the local area in the second reference image is suitable for updating the corresponding area or the related area in the first reference image.

The motion vector information includes an average value of a sum of absolute values of lateral motion vectors in the local area and absolute values of longitudinal motion vectors in the local area, and an average value of a sum of absolute values of lateral motion vectors in a previous encoded frame of the second reference image and absolute values of longitudinal motion vectors in the previous encoded frame of the second reference image; and correspondingly, the second decoding module is specifically configured to:

determine, when the average value of the sum of the absolute values of the lateral motion vectors in the local area and the sum of the absolute values of the longitudinal motion vectors in the local area is less than the average value of the sum of the absolute values of the lateral motion vectors in the previous encoded frame and the sum of the absolute values of the longitudinal motion vectors in the previous encoded frame, that the local area in the second reference image is suitable for updating the corresponding area or the related area in the first reference image; otherwise, determine that the local area in the second reference image is not suitable for updating the corresponding area or the related area in the first reference image.

Preferably, a specific implementation is: obtaining an area satisfying the following condition (32):

$$\frac{1}{M}\sum_{i=0}^{M}(|MVx_i|+|MVy_i|) < \frac{1}{N}\sum_{j=0}^{N}(|MVx_j|+|MVy_j|) \quad (32)$$

In the formula (32), M indicates a quantity of code blocks included in a current area; N indicates a quantity of code blocks included in a previous encoded frame/a previous decoded frame; and $MV_x$ and $MV_y$ respectively indicate a lateral motion vector and a longitudinal motion vector of each code block. If the condition (32) is satisfied, it is determined that the area is suitable for updating the first reference image; otherwise, it is determined that the area is not suitable for updating the first reference image.

The second decoding module 22 is configured to determine, according to the reference image update information, whether the local area in the second reference image is suitable for updating the corresponding area or the related area in the first reference image. An implementation of determining the corresponding area or the related area in the first reference image includes:

In a first feasible implementation, the corresponding area in the first reference image is an area that is in the first reference image and that has same location coordinates as the local area in the second reference image.

In a second feasible implementation, the second decoding module is further specifically configured to: when an area that is in the first reference image and that has same location coordinates as the local area in the second reference image is updated, sequentially search areas in the first reference image in a preset order, where the corresponding area in the first reference image is a first area that is not updated in the order; otherwise, the corresponding area in the first reference image is an area that is in the first reference image and that has same location coordinates as the local area in the second reference image.

Preferably, a specific implementation is: determining whether an area that is in the first reference image and that has same location coordinates as the local area in the second reference image is updated. If the area is not updated, the corresponding area in the first reference image is an area that is in the first reference image and that has the same location coordinates as the local area in the second reference image; otherwise, area locations that are not updated are searched in an area neighboring to the location according to a preset search step, and the corresponding area in the first reference image is an area location that is not updated.

Preferably, a specific implementation of the preset search step is shown in FIG. 5. A central area 0 indicates a current location area. A circle of areas closest to the current location area is first searched in an order of 1 to 8, then, a circle of areas the second closest to the current location area are searched in an order of 1 to 16, and outward extension is performed on this basis, until an area that is not updated is found.

In a third feasible implementation, the second decoding module is further specifically configured to: obtain spatial offsets between location coordinates of the local area and location coordinates of the related area in the first reference image, where the spatial offsets include a lateral offset and a longitudinal offset; and before the third decoding module replaces the pixel value of the corresponding area or the related area in the first reference image with the pixel value of the local area in the second reference image, determine a location of the related area in the first reference image according to the location coordinates of the local area in the second reference image and the spatial offsets.

Preferably, a specific implementation is: for an area used to update the corresponding area or the related area in the first reference image, reading ($cMV_x$, $cMV_y$) from the bitstream, and obtaining, according to ($cMV_x$, $cMV_y$) and a location ($Cur_x$, $Cur_y$) of the area and according to a formula (33), an update location that is of the area and that is in the first reference image:

$$Des_x = Cur_x + cMV_x, Des_y = Cur_y + cMV_y \quad (33)$$

Optionally, after the third decoding module 23 is configured to: when it is determined, according to the reference image update information, that the local area in the second reference image is used to update the corresponding area or the related area in the first reference image, replace the pixel value of the corresponding area or the related area in the first reference image with the pixel value of the local area in the second reference image, the decoding device further includes: a fourth decoding module 24, configured to perform filtering at a boundary between the corresponding area or the related area in the first reference image after pixel value replacement and a neighboring area.

Preferably, a specific implementation is the same as that of the fourth decoding module 14.

Therefore, according to the reference image decoding apparatus in this embodiment of the present disclosure, the decoding device locally updates the first reference image by using update information of a subsequent reference image in a pixel copy manner. Therefore, decoding complexity is reduced while compression efficiency is improved by using the first reference image, and a delay that is brought about by a sharp increase in a bit rate is also avoided.

Figure 12:
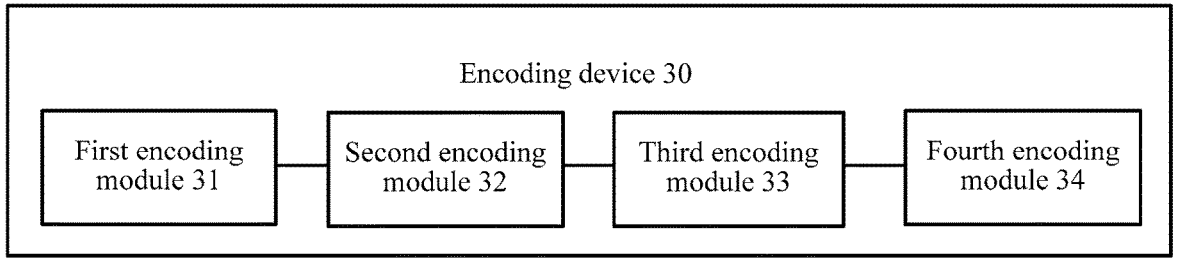
FIG. 12 is a schematic block diagram of a reference image encoding apparatus according to an embodiment of the present disclosure.

FIG. 12 is a schematic block diagram of a reference image encoding apparatus according to an embodiment of the present disclosure. It should be noted that, related operations of an encoder side are essentially the same as those of a decoder side. To avoid repetition, details are not described herein again. As shown in FIG. 12, the encoding device 30 includes:

a first encoding module 31, configured to: encode a to-be-encoded sequence, to obtain a reconstructed image of a first reference image, and encode a second reference image, to obtain a reconstructed image of the second reference image, where the first reference image is encoded before the second reference image;

a second encoding module 32, configured to determine whether a local area in the second reference image is suitable for updating a corresponding area or a related area in the first reference image, where a size of the local area is less than or equal to a size of the second reference image;

a third encoding module 33, configured to: determine whether the corresponding area or the related area in the first reference image is updated; and when the corresponding area or the related area in the first reference image is not updated, and it is determined that the local area in the second reference image is suitable for updating the corresponding area or the related area in the first reference image, replace a pixel value of the corresponding area or the related area in the first reference image with a pixel value of the local area in the second reference image; and a fourth encoding module 34, configured to compile, into the bitstream, reference image update information used to determine whether the local area in the second reference image is used to update the corresponding area or the related area in the first reference image.

Specifically, the encoding device encodes the to-be-encoded sequence, to obtain the reconstructed image of the first reference image, and encodes the second reference image, to obtain the reconstructed image of the second reference image; determines whether the local area in the second reference image is suitable for updating the corresponding area or the related area in the first reference image; determines whether the corresponding area or the related area in the first reference image is updated; when the corresponding area or the related area in the first reference image is not updated, and it is determined that the local area in the second reference image is suitable for updating the corresponding area or the related area in the first reference image, replaces the pixel value of the corresponding area or the related area in the first reference image with the pixel value of the local area in the second reference image; and compiles, into the bitstream, the reference image update information that is used to determine whether the local area in the second reference image is used to update the corresponding area or the related area in the first reference image.

Therefore, according to the reference image encoding apparatus in this embodiment of the present disclosure, the encoding device locally updates the first reference image by using update information of a subsequent reference image in a pixel copy manner. Therefore, decoding complexity is reduced while compression efficiency is improved by using the first reference image, and a delay that is brought about by a sharp increase in a bit rate is also avoided.

It should be understood that, in this embodiment of the present disclosure, the local area in the second reference image may be one of a largest coding unit (LCU), a coding unit (CU), a coding unit group (CU group), or an image area of a preset size. This is not limited in the present disclosure.

It should be understood that, in this embodiment of the present disclosure, the first reference image is an image encoded before the second reference image, and is used as a reference image of a subsequent image in a video segment in which the first reference image is located. The first reference image may be a first frame of reconstructed image obtained by encoding the to-be-encoded sequence, or may be a random access point image obtained by encoding the to-be-encoded sequence. This is not limited in the present disclosure.

It should be understood that, in this embodiment of the present disclosure, that the reference image update information used to determine whether the local area in the second reference image is used to update the corresponding area or the related area in the first reference image is compiled into the bitstream means that, a location at which the reference image update information is compiled into the bitstream may be before, between, or after coding information of the second reference image, and the reference image update information may exist in the bitstream as a part of the coding information of the second reference image. This is not limited in the present disclosure.

An implementation in which the second encoding module 32 is configured to determine whether the local area in the second reference image is suitable for updating the corresponding area or the related area in the first reference image includes:

In a first feasible implementation, the second encoding module is specifically configured to:
  obtain a first area that is in a to-be-encoded image of the second reference image and that has same location coordinates as the local area, and a second area that is in an to-be-encoded image of a previous frame of the second reference image and that has the same location coordinates as the local area;
  calculate a mean square error of all pixels in the first area and the second area; and
  determine, when the mean square error is less than a fourth threshold, that the local area in the second reference image is suitable for updating the corresponding area or the related area in the first reference image; otherwise, determine that the local area in the second reference image is not suitable for updating the corresponding area or the related area in the first reference image.

Preferably, a specific implementation is as follows:
First step: Obtain a current to-be-encoded frame $F_i$, that is, the second reference image, and an original image of a previous frame $F_{i-1}$.

Second step: For each area in the current to-be-encoded frame, calculate mean square errors (Mean Square Error, MSE) of original pixel values of all pixels in the area and an area that is in a previous frame and that has a same location.

Third step: Obtain an area satisfying the following condition (34), where $Threshold_1$ is a preset threshold, $Flag_{updated}$ is a flag indicating whether each area in a reference frame $cRef_{i-1}$, that is, the first reference image is updated, 1 indicates that the area is updated, 0 indicates that the area is not updated, and $cRef_{i-1}$ is a reference frame that is locally updated by using a reconstructed pixel value of an encoded frame before the current to-be-encoded frame $F_i$:

$$\begin{cases} MSE < Threshold_{12} \\ Flag_{updated} = 0 \end{cases} \quad (34)$$

If satisfying the condition (34), an area is suitable for updating the corresponding area or the related area in the first reference image; otherwise, the area is not suitable for updating the corresponding area or the related area in the first reference image.

In a second feasible implementation, the second encoding module is specifically configured to:
  obtain a to-be-encoded image of the local area to perform inter-frame prediction, to obtain a prediction image of the local area;
  calculate an average value of absolute values of lateral axis prediction differences and absolute values of longitudinal axis prediction differences of all pixels in the to-be-encoded image of the local area and the prediction image of the local area;
  determine, when the average value is less than a fifth threshold, that the local area in the second reference image is suitable for updating the corresponding area or the related area in the first reference image; otherwise, determine that the local area in the second reference image is not suitable for updating the corresponding area or the related area in the first reference image.

Preferably, a specific implementation is as follows:
First step: Predicate a current to-be-encoded frame $F_i$, that is, the second reference image, where $F_i$ may use $cRef_{i-1}$, that is, the first reference image, as a reference frame of $F_i$ to perform inter-frame prediction, or may use another short-term reference frame to perform inter-frame prediction, and $cRef_{i-1}$ is a reference frame that is locally updated by using a reconstructed pixel value of an encoded frame before $F_i$, that is, the first reference image; and obtain a difference between a prediction value $(P_x, P_y)$ and an original pixel value $(O_x, O_y)$ of each pixel in $F_i$, that is, a prediction error.

Second step: Obtain an area satisfying the following condition (35):

$$\frac{1}{N}\sum^{N}(|Px_i - Ox_i| + |Py_i - Oy_i|) > Threshold_{13} \quad (35)$$

In the formula (35), N is a quantity of pixels in an area. An average value of prediction errors of all pixels in the area is calculated and is compared with a threshold $Threshold_2$. If satisfying the condition (35), an area is suitable for updating the corresponding area or the related area in the first reference image; otherwise, the area is not suitable for updating the corresponding area or the related area in the first reference image.

In a third feasible implementation, the second encoding module is specifically configured to:
  obtain transform coefficient information of the local area in the second reference image, where the transform coefficient information includes a sum of absolute values of transform coefficients within coverage of the local area; and
  determine, when the sum of the absolute values of the transform coefficients within the coverage of the local area is greater than a sixth threshold, that the local area in the second reference image is suitable for updating the corresponding area or the related area in the first reference image; otherwise, determine that the local area in the second reference image is not suitable for updating the corresponding area or the related area in the first reference image.

Preferably, a specific implementation is as follows:
First step: Perform predictive coding on a current to-be-encoded frame $F_i$, that is, the second reference image, where $F_i$ may use $cRef_{i-1}$, that is, the first reference image, as a reference frame of $F_i$ to perform inter-frame prediction, or may use another short-term reference frame to perform inter-frame prediction, and $cRef_{i-1}$ is a reference frame that is locally updated by using a reconstructed pixel value of an encoded frame before $F_i$.

Second step: Obtain coding information and a transform coefficient after quantization of each area in the current frame, and perform entropy coding on the coding information and the transform coefficient and write the coding information and the transform coefficient into the bitstream, where the coding information includes a coding mode and the like of each code block in the area.

Third step: Obtain an area satisfying the following condition (36):

$$\Sigma|Coef_i| > Threshold_{14} \qquad (36)$$

If satisfying the condition (36), an area is suitable for updating the corresponding area or the related area in the first reference image; otherwise, the area is not suitable for updating the corresponding area or the related area in the first reference image.

In a fourth feasible implementation, the second encoding module is specifically configured to:

obtain transform coefficient information of the local area in the second reference image, where the transform coefficient information includes an average value of absolute values of transform coefficients within coverage of the local area; and determine, when the average value of the absolute values of the transform coefficients within the coverage of the local area is greater than a seventh threshold, that the local area in the second reference image is suitable for updating the corresponding area or the related area in the first reference image; otherwise, determine that the local area in the second reference image is not suitable for updating the corresponding area or the related area in the first reference image.

Preferably, a specific implementation is as follows:

First step: Perform predictive coding on a current to-be-encoded frame $F_i$, that is, the second reference image, where $F_i$ may use $cRef_{i-1}$, that is, the first reference image, as a reference frame of $F_i$ to perform inter-frame prediction, or may use another short-term reference frame to perform inter-frame prediction, and $cRef_{i-1}$ is a reference frame that is locally updated by using a reconstructed pixel value of an encoded frame before F.

Second step: Obtain coding information and a transform coefficient after quantization of each area in the current frame, and perform entropy coding on the coding information and the transform coefficient and write the coding information and the transform coefficient into the bitstream, where the coding information includes a coding mode and the like of each code block in the area.

Third step: Obtain an area satisfying the following condition (37):

$$\frac{1}{numBlock}\sum|Coef_i| > Threshold_{15} \qquad (37)$$

If satisfying the condition (37), an area is suitable for updating the corresponding area or the related area in the first reference image; otherwise, the area is not suitable for updating the corresponding area or the related area in the first reference image.

In a fifth feasible implementation, the second encoding module is specifically configured to:

count a quantity of bits for encoding the local area in the second reference image and a quantity of bits for encoding a previous encoded area of the corresponding area or the related area in the first reference image; and determine, when the quantity of bits for encoding the local area in the second reference image is greater than the quantity of bits for encoding the previous encoded area of the corresponding area or the related area in the first reference image, that the local area in the second reference image is suitable for updating the corresponding area or the related area in the first reference image; otherwise, determine that the local area in the second reference image is not suitable for updating the corresponding area or the related area in the first reference image.

In a sixth feasible implementation, the second encoding module is specifically configured to:

count a quantity of bits for encoding the local area in the second reference image and an average quantity of bits for encoding an area in a previous encoded frame of the corresponding area or the related area in the first reference image; and determine, when the quantity of bits for encoding the local area in the second reference image is greater than the average quantity of bits for encoding the area in the previous encoded frame of the corresponding area or the related area in the first reference image, that the local area in the second reference image is suitable for updating the corresponding area or the related area in the first reference image; otherwise, determine that the local area in the second reference image is not suitable for updating the corresponding area or the related area in the first reference image.

In a seventh feasible implementation, the second encoding module is specifically configured to:

obtain motion vector information of the local area in the second reference image, where the motion vector information includes an average value of absolute values of lateral motion vectors in the local area and an average value of absolute values of longitudinal motion vectors in the local area; and determine, when the average value of the absolute values of the lateral motion vectors in the local area and the average value of the absolute values of the longitudinal motion vectors in the local area are both less than an eighth threshold, that the local area in the second reference image is suitable for updating the corresponding area or the related area in the first reference image; otherwise, determine that the local area in the second reference image is not suitable for updating the corresponding area or the related area in the first reference image.

Preferably, a specific implementation is as follows:

First step: Perform predictive coding on a current to-be-encoded frame $F_i$, that is, the second reference image, where $F_i$ may use $cRef_{i-1}$, that is, the first reference image, as a reference frame of $F_i$ to perform inter-frame prediction, or may use another short-term reference frame to perform inter-frame prediction, and $cRef_{i-1}$ is a reference frame that is locally updated by using a reconstructed pixel value of an encoded frame before F.

Second step: Obtain coding information and a transform coefficient after quantization of each area in the current frame, and perform entropy coding on the coding information and the transform coefficient and write the coding information and the transform coefficient into the bitstream, where the coding information includes a coding mode and the like of each code block in the area.

Third step: Obtain an area satisfying the following condition (38):

$$\begin{cases} \frac{1}{M}\sum_{i=0}^{M}|MVx_i| < Threshold_{16} \\ \frac{1}{M}\sum_{i=0}^{M}|MVy_i| < Threshold_{16} \end{cases} \qquad (38)$$

In the formula (38), M indicates a quantity of code blocks included in a current area, and $MV_x$ and $MV_y$ respectively indicate a lateral motion vector and a longitudinal motion vector of each code block. An average value of absolute values of the lateral motion vectors of all the code blocks in the current area and an average value of absolute values of the longitudinal motion vectors of all the code blocks in the current area are calculated; and the two average values are separately compared with a threshold $Threshold_{16}$. If satisfying the condition (38), an area is suitable for updating the corresponding area or the related area in the first reference image; otherwise, the area is not suitable for updating the corresponding area or the related area in the first reference image.

In an eighth feasible implementation, the second encoding module is specifically configured to:
  obtain motion vector information of the local area in the second reference image, where the motion vector information includes an average value of a sum of absolute values of lateral motion vectors in the local area and absolute values of longitudinal motion vectors in the local area, and an average value of a sum of absolute values of lateral motion vectors in a previous encoded frame of the second reference image and absolute values of longitudinal motion vectors in the previous encoded frame of the second reference image; and
  determine, when the average value of the sum of the absolute values of the lateral motion vectors in the local area and the sum of the absolute values of the longitudinal motion vectors in the local area is less than the average value of the sum of the absolute values of the lateral motion vectors in the previous encoded frame and the sum of the absolute values of the longitudinal motion vectors in the previous encoded frame, that the local area in the second reference image is suitable for updating the corresponding area or the related area in the first reference image; otherwise, determine that the local area in the second reference image is not suitable for updating the corresponding area or the related area in the first reference image.

Preferably, a specific implementation is as follows:

First step: Perform predictive coding on a current to-be-encoded frame $F_i$, that is, the second reference image, where $F_i$ may use $cRef_{i-1}$, that is, the first reference image, as a reference frame of $F_i$ to perform inter-frame prediction, or may use another short-term reference frame to perform inter-frame prediction, and $cRef_{i-1}$ is a reference frame that is locally updated by using a reconstructed pixel value of an encoded frame before F.

Second step: Obtain coding information and a transform coefficient after quantization of each area in the current frame, and perform entropy coding on the coding information and the transform coefficient and write the coding information and the transform coefficient into the bitstream, where the coding information includes a coding mode and the like of each code block in the area.

Third step: Obtain an area satisfying the following condition (39):

$$\frac{1}{M}\sum_{i=0}^{M}(|MVx_i|+|MVy_i|) < \frac{1}{N}\sum_{j=0}^{N}(|MVx_j|+|MVy_j|) \quad (39)$$

In the formula (39), M indicates a quantity of code blocks included in a current area; N indicates a quantity of code blocks included in a previous encoded frame/a previous decoded frame; and $MV_x$ and $MV_y$ respectively indicate a lateral motion vector and a longitudinal motion vector of each code block. If satisfying the condition (39), an area is suitable for updating the corresponding area or the related area in the first reference image; otherwise, the area is not suitable for updating the corresponding area or the related area in the first reference image.

The fourth encoding module 34 is configured to compile, into the bitstream, the reference image update information used to determine whether the local area in the second reference image is used to update the corresponding area or the related area in the first reference image. An implementation of compiling the reference image update information into the bitstream includes:

In a first feasible implementation, the fourth encoding module is specifically configured to:
  when the local area in the second reference image is used to update the corresponding area or the related area in the first reference image, the flag is a first value; or when the local area in the second reference image is not used to update the corresponding area or the related area in the first reference image, the flag is a second value; and the first value is different from the second value; and
  compile a value of the flag into the bitstream.

Preferably, a specific implementation is as follows:

When the local area in the second reference image is used to update the corresponding area or the related area in the first reference image, the flag is set to 1 and is compiled into the bitstream; otherwise, the flag is set to 0 and is compiled into the bitstream.

In a second feasible implementation, the fourth encoding module is specifically configured to:
  when the local area in the second reference image is used to update the corresponding area or the related area in the first reference image, the quantization parameter offset value falls within a third value range; or when the local area in the second reference image is not used to update the corresponding area or the related area in the first reference image, the quantization parameter offset value falls outside a third value range; and
  compile the quantization parameter offset value into the bitstream.

Preferably, a specific implementation is as follows:

If a current area is the local area used to update the corresponding area or the related area in the first reference image, a difference $\Delta QP$ between a QP ($OP_{area}$) and a frame-level QP ($QP_{Slice}$) of the area is set according to a textural characteristic of the area. In this embodiment, a method of using a variance of a luminance value of a pixel in the area to measure a textural characteristic of the area is used. For example, in a formula (40), $\Delta QP$ is obtained through calculation by using a ratio of a variance of a luminance value of a pixel in an update area to an average value of variances of luminance values of pixels in all areas in the current to-be-encoded frame, where $10 \leq |\Delta QP| < 20$. In the formula, $x_{i,n}$ indicates a luminance value of a pixel i in an area numbered n, $\bar{x}_n$ indicates an average value of luminance values of all pixels in the area numbered n, and N indicates a quantity of areas in the current frame:

$$\Delta QP = -10 \times \left(1 + \frac{1}{1+\frac{V_n}{\bar{V}}}\right), \quad (40)$$

-continued $$\overline{V} = \frac{1}{N}\sum_{n=0}^{N}V_n, V_n = \sum_{i=0}^{AreaSize}(x_{i,n} - \overline{x}_n)^2$$

It may be understood that, in this embodiment, a method of using a variance to measure a textural characteristic is used, or another method may be used for measurement. In addition, ΔQP may be set according to other characteristics, such as a motion characteristic than the textural characteristic.

The quantization parameter offset value ΔQP is compiled into the bitstream as coding information.

It should be understood that, in this embodiment of the present disclosure, a preferred value is provided as the quantization parameter offset, but the value of the quantization parameter is not limited in the present disclosure.

In a third feasible implementation, the fourth encoding module is specifically configured to:
  when the local area in the second reference image is used to update the corresponding area or the related area in the first reference image, the scale factor of the quantization step falls within a fourth value range; or when the local area in the second reference image is not used to update the corresponding area or the related area in the first reference image, the scale factor of the quantization step falls outside a fourth value range; and
  compile the scale factor of the quantization step into the bitstream.

Preferably, a specific implementation is as follows:

When the local area in the second reference image is used to update the corresponding area or the related area in the first reference image, the encoder side adaptively adjusts the quantization step (Quantization Step, Qstep), encodes the scale factor of the quantization step, and transmits the scale factor of the quantization step to the decoder side. The scale factor F of the quantization step of the area is not equal to 1.

A calculation formula of the scale factor F is shown in the following (41), and the scale factor F falls within a value range of 0.5 to 1.5.

$$F = \frac{3^{\frac{V_n}{V}+1} - 1}{2 \times 3^{\frac{V_n}{V}} + 2}, \quad (41)$$

$$\overline{V} = \frac{1}{N}\sum_{n=0}^{N}V_n, V_n = \sum_{i=0}^{AreaSize}(x_{i,n} - \overline{x}_n)^2$$

A calculation formula of a quantization step of an area is shown in the following (42):

$$Qstep = 2^{\frac{QP-4}{6}} \times F \quad (42)$$

The scale factor F of the quantization step is compiled into the bitstream as coding information.

It should be understood that, in this embodiment of the present disclosure, a preferred value is provided for a value of the scale factor, but the value of the scale factor is not limited in the present disclosure.

In a fourth feasible implementation, the fourth encoding module is specifically configured to:
  determine, when the sum of the absolute values of the transform coefficients within the coverage of the local area is greater than a ninth threshold, and the corresponding area or the related area in the first reference image is not updated, that the local area in the second reference image is used to update the corresponding area or the related area in the first reference image; otherwise, determine that the local area in the second reference image is not used to update the corresponding area or the related area in the first reference image; and
  compile the transform coefficient information into the bitstream.

Preferably, a specific implementation corresponds to the decoder side and is not repeated again, and the transform coefficient information is compiled into the bitstream as coding information.

In a fifth feasible implementation, the fourth encoding module is specifically configured to:
  determine, when the average value of the absolute values of the transform coefficients within the coverage of the local area is greater than a tenth threshold, and the corresponding area or the related area in the first reference image is not updated, that the local area in the second reference image is used to update the corresponding area or the related area in the first reference image; otherwise, determine that the local area in the second reference image is not used to update the corresponding area or the related area in the first reference image; and
  compile the transform coefficient information into the bitstream.

Preferably, a specific implementation corresponds to the decoder side and is not repeated again, and the transform coefficient information is compiled into the bitstream as coding information.

In a sixth feasible implementation, the fourth encoding module is specifically configured to:
  determine, when the average value of the absolute values of the lateral motion vectors in the local area and the average value of the absolute values of the longitudinal motion vectors in the local area are both less than an eleventh threshold, and the corresponding area or the related area in the first reference image is not updated, that the local area in the second reference image is used to update the corresponding area or the related area in the first reference image; otherwise, determine that the local area in the second reference image is not used to update the corresponding area or the related area in the first reference image; and
  compile the motion vector information into the bitstream.

Preferably, a specific implementation corresponds to the decoder side and is not repeated again, and the motion vector information is compiled into the bitstream as coding information.

In a seventh feasible implementation, the fourth encoding module is specifically configured to:
  determine, when the average value of the sum of the absolute values of the lateral motion vectors in the local area and the sum of the absolute values of the longitudinal motion vectors in the local area is less than the average value of the sum of the absolute values of the lateral motion vectors in the previous encoded frame and the sum of the absolute values of the longitudinal motion vectors in the previous encoded frame, and the corresponding area or the related area in the first reference image is not updated, that the local area in the second reference image is used to update the corresponding area or the related area in the first reference image; otherwise, determine that the local area in the second reference image is not used to update the corresponding area or the related area in the first reference image; and compile the motion vector information into the bitstream.

Preferably, a specific implementation corresponds to the decoder side and is not repeated again, and the motion vector information is compiled into the bitstream as coding information.

An implementation in which the first encoding module 31 is configured to encode the to-be-encoded sequence, to obtain the reconstructed image of the second reference image includes:

In a first feasible implementation, the first encoding module is specifically configured to: encode a to-be-encoded image of the second reference image by using a fixed quantization parameter, where a first quantization parameter is used for the local area, and a second quantization parameter for an area that is not the local area.

Preferably, a specific implementation is as follows:

Quantization is performed on a transform coefficient after transformation by using a quantization parameter (Quantization Parameter, QP) obtained through calculation by using the following formula (43), where $QP_{Slice}$ is a frame-level QP, an update area is the local area, and a non-update area is another area. Table 3 shows correspondences between $QP_{Slice}$ and $\Delta QP$.

$$QP' = \begin{cases} QP_{Slice} - \Delta QP, & \text{Update area} \\ QP_{Slice}, & \text{Non-update area} \end{cases} \quad (43)$$

$$QP = \begin{cases} 0, & QP' < 0 \\ 51, & QP' > 51 \end{cases}$$

TABLE 3

Value table of $\Delta QP$

| | Value range of $QP_{Slice}$ | | |
|---|---|---|---|
| | 0-10 | 10-37 | 37-51 |
| $\Delta QP$ | 0 | 5 | 10 |

The frame-level QP minus $\Delta QP$ is used as a quantization parameter of the local area, and the frame-level QP is used as a quantization parameter of another area.

It should be understood that, in this embodiment of the present disclosure, a preferred value is provided as the quantization parameter, but the value of the quantization parameter is not limited in the present disclosure.

In a second feasible implementation, the first encoding module is specifically configured to: encode a to-be-encoded image of the second reference image by using an adaptive quantization parameter, where a quantization parameter is determined for the local area according to at least one of texture information or motion information, and for an area that is not the local area, a frame-level quantization parameter is used or a quantization parameter is set and determined according to a bit rate allocation policy or a quality control policy specified by an encoder.

Preferably, a specific implementation is as follows:

If a current area is not the local area, a QP ($QP_{area}$) of the current area is set to be a frame-level QP, or $\Delta QP$ of the current area may be set according to a bit rate allocation policy or a quality control policy specified by the encoder. A value range of an absolute value of $\Delta QP$ is shown in a formula (44), an update area is the local area, and a non-update area is another area:

$$\begin{cases} 10 \leq |\Delta QP| < 20, & \text{Update area} \\ 0 \leq |\Delta QP| < 10, & \text{Non-update area} \end{cases}, QP'_{area} = QP_{Slice} + \Delta QP \quad (44)$$

$$QP_{area} = \begin{cases} 0, & QP'_{area} < 0 \\ 51, & QP'_{area} > 51 \end{cases}$$

A quantization parameter in the formula (44) is used as a quantization parameter of each area in the second reference image.

It should be understood that, in this embodiment of the present disclosure, a preferred value is provided as the quantization parameter, but the value of the quantization parameter is not limited in the present disclosure.

The second encoding module 32 is configured to determine whether the local area in the second reference image is suitable for updating the corresponding area or the related area in the first reference image. An implementation of determining the corresponding area or the related area in the first reference image includes:

In a first feasible implementation, the corresponding area in the first reference image is an area that is in the first reference image and that has same location coordinates as the local area in the second reference image.

In a second feasible implementation, the second encoding module is specifically configured to: when an area that is in the first reference image and that has same location coordinates as the local area in the second reference image is updated, sequentially search areas in the first reference image in a preset order, where the corresponding area in the first reference image is a first area that is not updated in the order; otherwise, the corresponding area in the first reference image is an area that is in the first reference image and that has same location coordinates as the local area in the second reference image.

Preferably, a specific implementation corresponds to the decoder side and is not repeated again.

In a third feasible implementation, the second decoding module is further specifically configured to: obtain spatial offsets between location coordinates of the local area and location coordinates of the related area in the first reference image, where the spatial offsets include a lateral offset and a longitudinal offset; and before the third decoding module replaces the pixel value of the corresponding area or the related area in the first reference image with the pixel value of the local area in the second reference image, determine a location of the related area in the first reference image according to the location coordinates of the local area in the second reference image and the spatial offsets.

Preferably, a specific implementation corresponds to the decoder side and is not repeated again.

Optionally, after the fourth encoding module 34 is configured to compile, into the bitstream, the reference image update information used to determine whether the local area in the second reference image is used to update the corresponding area or the related area in the first reference image, the encoding device further includes a fifth encoding module 35, configured to perform filtering at a boundary between the corresponding area or the related area in the first reference image after pixel value replacement and a neighboring area.

Preferably, a specific implementation is the same as that of the fourth encoding module 14.

Therefore, according to the reference image encoding apparatus in this embodiment of the present disclosure, the encoding device locally updates the first reference image by using update information of a subsequent reference image in a pixel copy manner. Therefore, decoding complexity is reduced while compression efficiency is improved by using the first reference image, and a delay that is brought about by a sharp increase in a bit rate is also avoided.

Figure 13:
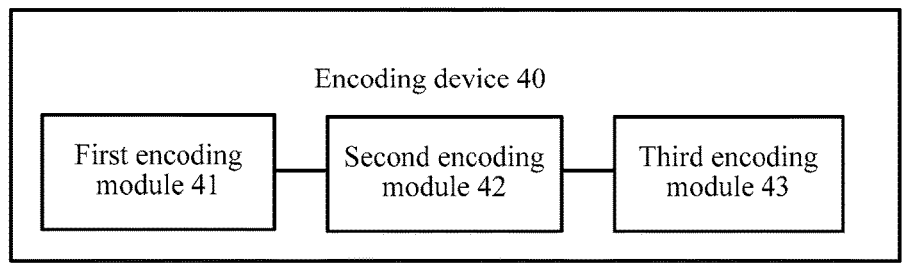
FIG. 13 is a schematic block diagram of a reference image encoding apparatus according to another embodiment of the present disclosure.

FIG. 13 is a schematic block diagram of a reference image encoding apparatus according to an embodiment of the present disclosure. As shown in FIG. 13, the encoding device 40 includes:

a first encoding module 41, configured to detect a to-be-encoded sequence;

a second encoding module 42, configured to determine whether a current to-be-encoded image is a scene switchover image; and a third encoding module 43, configured to encode the current to-be-encoded image, and before or after a reconstructed image of the to-be-encoded image is encoded, compile a particular picture order count into a bitstream.

Figure 14:
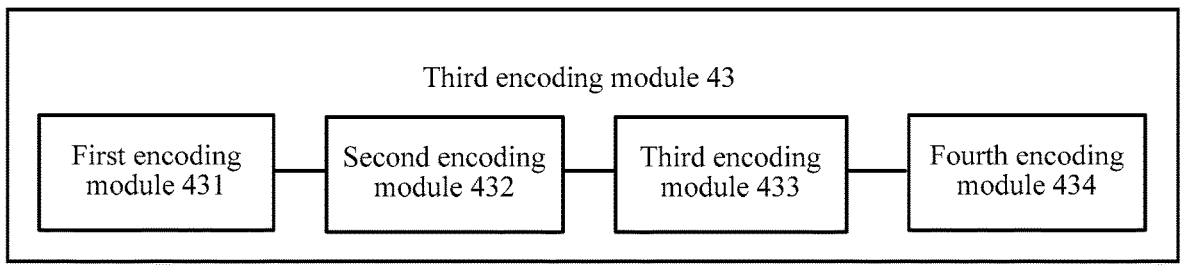
FIG. 14 is another schematic block diagram of a reference image encoding apparatus according to another embodiment of the present disclosure.

Preferably, as shown in FIG. 14, the third encoding module 43 includes:

a first encoding module 431, configured to: determine the particular picture order count of the current to-be-encoded image, and when the current to-be-encoded image is a scene switchover image, sequentially assign a picture order count to the current to-be-encoded image; otherwise, assign a picture order count that is the same as or associated with a picture order count of a scene switchover image within an update range of the current to-be-encoded image to the current to-be-encoded image;

a second encoding module 432, configured to encode the current to-be-encoded image by using the device 30;

a third encoding module 433, configured to: when the current to-be-encoded image is not a scene switchover image, update, by using the device 30, a reference image corresponding to a scene switchover image corresponding to the current to-be-encoded image; and a fourth encoding module 434, configured to compile the particular picture order count into the bitstream before or after the reconstructed image of the to-be-encoded image is encoded.

It may be understood that, a scene switchover image is a to-be-encoded image corresponding to the first reference image in the device 30, or may be a first frame, a random access image, or the like that has a reference relationship with another video frame in a same video segment. This is not limited in the present disclosure.

It may be understood that, in the to-be-encoded sequence, there may be one or more scene switchover images or random access images. This is not limited in the present disclosure.

Figure 15:
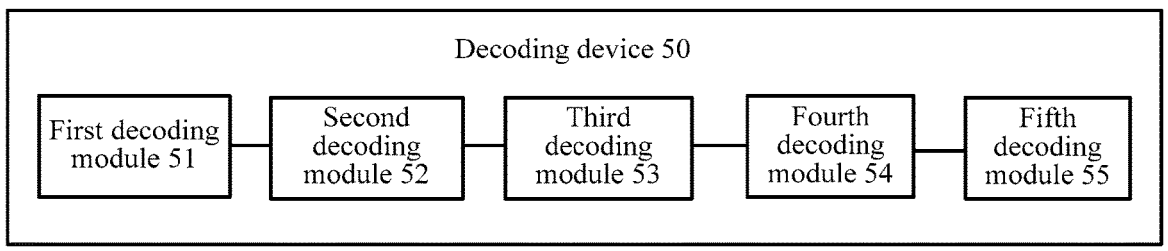
FIG. 15 is a schematic block diagram of a reference image decoding apparatus according to another embodiment of the present disclosure.

FIG. 15 is a schematic block diagram of a reference image decoding apparatus according to an embodiment of the present disclosure. As shown in FIG. 15, the decoding device 50 includes:

a first decoding module 51, configured to determine whether a current to-be-decoded image is a scene switchover image;

a second decoding module 52, configured to: corresponding to an encoder side, before or after a reconstructed image of the to-be-decoded image is decoded, parse a bitstream, to obtain a particular picture order count of the current to-be-decoded image;

a third decoding module 53, configured to parse the bitstream, to obtain the reconstructed image of the to-be-decoded image;

a fourth decoding module 54, configured to: when the current to-be-decoded image is not a scene switchover image, determine a corresponding scene switchover image according to the particular picture order count; and fifth decoding module 55, configured to: when the current to-be-decoded image is not a scene switchover image, update, by using the device 10 or 20, a reference image corresponding to a corresponding scene switchover image that is determined according to the particular picture order count.

It may be understood that, a scene switchover image is a to-be-decoded image corresponding to the first reference image in the device 10 or a to-be-decoded image corresponding to the first reference image in the device 20, or may be a first frame, a random access image, or the like that has a reference relationship with another video frame in a same video segment. This is not limited in the present disclosure.

It may be understood that, in a to-be-decoded sequence, there may be one or more scene switchover images or random access images. This is not limited in the present disclosure.

Figure 16:
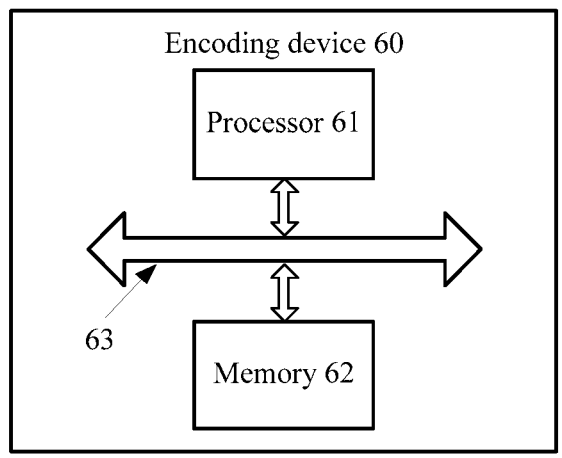
FIG. 16 is a schematic block diagram of a reference image encoding apparatus according to still another embodiment of the present disclosure.

As shown in FIG. 16, an embodiment of the present disclosure further provides an encoding device 60, including a processor 61, a memory 62, and a bus system 63. The processor 61 is connected to the memory 62 by using the bus system 63. The memory 62 is configured to store an instruction. The processor 61 is configured to execute the instruction stored in the memory 62. The memory 62 in the encoding device 60 stores program code. The processor 61 may invoke the program code stored in the memory 62 to perform the following operations: encoding a to-be-encoded sequence, to obtain a reconstructed image of a first reference image, and encoding a second reference image, to obtain a reconstructed image of the second reference image, where the first reference image is encoded before the second reference image; determining whether a local area in the second reference image is suitable for updating a corresponding area or a related area in the first reference image, where a size of the local area is less than or equal to a size of the second reference image; determining whether the corresponding area or the related area in the first reference image is updated; when the corresponding area or the related area in the first reference image is not updated, and it is determined that the local area in the second reference image is suitable for updating the corresponding area or the related area in the first reference image, replacing a pixel value of the corresponding area or the related area in the first reference image with a pixel value of the local area in the second reference image; and compiling, into the bitstream, reference image update information used to determine whether the local area in the second reference image is used to update the corresponding area or the related area in the first reference image.

Therefore, according to the reference image encoding device in this embodiment of the present disclosure, the encoding device locally updates the first reference image by using update information of a subsequent reference image in a pixel copy manner. Therefore, decoding complexity is reduced while compression efficiency is improved by using the first reference image, and a delay that is brought about by a sharp increase in a bit rate is also avoided.

It should be understood that in this embodiment of the present disclosure, the processor 61 may be a central processing unit (Central Processing Unit, "CPU" for short), or the processor 61 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any normal processor, or the like.

The memory 62 may include a read-only memory and a random access memory, and provide an instruction and data to the processor 61. A part of the memory 62 may further include a non-volatile random access memory. For example, the memory 62 may further store device type information.

The bus system 63 may further include a power bus, a control bus, a status signal bus, and the like, in addition to a data bus. However, for clear description, various types of buses in the figure are marked as the bus system 63.

In an implementation process, steps in the foregoing methods may be completed by using an integrated logical circuit of hardware in the processor 61 or instructions in a form of software in the processor 61. The steps in the methods disclosed with reference to the embodiments of the present disclosure may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 62, and the processor 61 reads information in the memory 62 and completes the steps in the foregoing methods in combination with hardware of the processor 61. To avoid repetition, details are not described herein again.

It should be understood that, the encoding device 60 according to this embodiment of the present disclosure may correspond to the encoding device 30 in the embodiments of the present disclosure, and may correspond to a corresponding entity that performs the method 3000 according to the embodiments of the present disclosure. For brevity, details are not described herein again.

Figure 17:
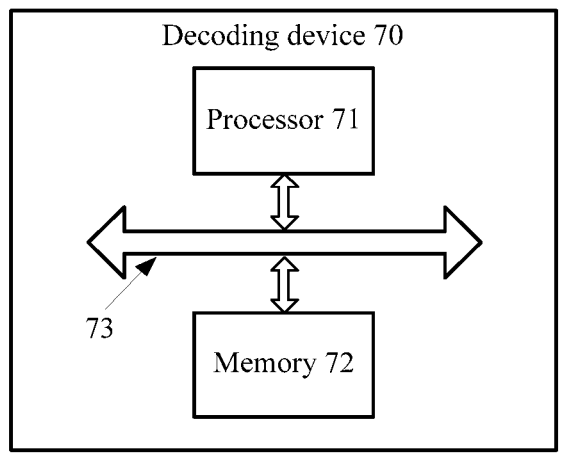
FIG. 17 is a schematic block diagram of a reference image decoding apparatus according to still another embodiment of the present disclosure.

As shown in FIG. 17, an embodiment of the present disclosure further provides a decoding device 70, including a processor 71, a memory 72, and a bus system 73. The processor 71 is connected to the memory 72 by using the bus system 73. The memory 72 is configured to store an instruction. The processor 71 is configured to execute the instruction stored in the memory 72. The memory 72 in the decoding device 70 stores program code, and the processor 71 may invoke the program code stored in the memory 72 to perform the following operations: parsing a bitstream, to obtain a reconstructed image of a first reference image and a reconstructed image of a second reference image, where the first reference image is decoded before the second reference image; before the parsing a bitstream, to obtain a reconstructed image of a second reference image, or during the parsing a bitstream, to obtain a reconstructed image of a second reference image, or after the parsing a bitstream, to obtain a reconstructed image of a second reference image, parsing the bitstream, to obtain reference image update information, and determining, according to the reference image update information, whether a local area in the second reference image is used to update a corresponding area or a related area in the first reference image, where a size of the local area is less than or equal to a size of the second reference image; and when it is determined, according to the reference image update information, that the local area in the second reference image is used to update the corresponding area or the related area in the first reference image, replacing a pixel value of the corresponding area or the related area in the first reference image with a pixel value of the local area in the second reference image.

Therefore, according to the reference image decoding device in this embodiment of the present disclosure, the decoding device locally updates the first reference image by using update information of a subsequent reference image in a pixel copy manner. Therefore, decoding complexity is reduced while compression efficiency is improved by using the first reference image, and a delay that is brought about by a sharp increase in a bit rate is also avoided.

It should be understood that in this embodiment of the present disclosure, the processor 71 may be a central processing unit (Central Processing Unit, "CPU" for short), or the processor 71 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any normal processor, or the like.

The memory 72 may include a read-only memory and a random access memory, and provide an instruction and data to the processor 71. A part of the memory 72 may further include a non-volatile random access memory. For example, the memory 72 may further store device type information.

The bus system 73 may further include a power bus, a control bus, a status signal bus, and the like, in addition to a data bus. However, for clear description, various types of buses in the figure are marked as the bus system 73.

In an implementation process, steps in the foregoing methods may be completed by using an integrated logical circuit of hardware in the processor 71 or instructions in a form of software in the processor 71. The steps in the methods disclosed with reference to the embodiments of the present disclosure may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 72, and the processor 71 reads information in the memory 72 and completes the steps in the foregoing methods in combination with hardware of the processor 61. To avoid repetition, details are not described herein again.

It should be understood that, the encoding device 70 according to this embodiment of the present disclosure may correspond to the encoding device 10 in the embodiments of the present disclosure, and may correspond to a corresponding entity that performs the method 1000 according to the embodiments of the present disclosure. For brevity, details are not described herein again.

Figure 18:
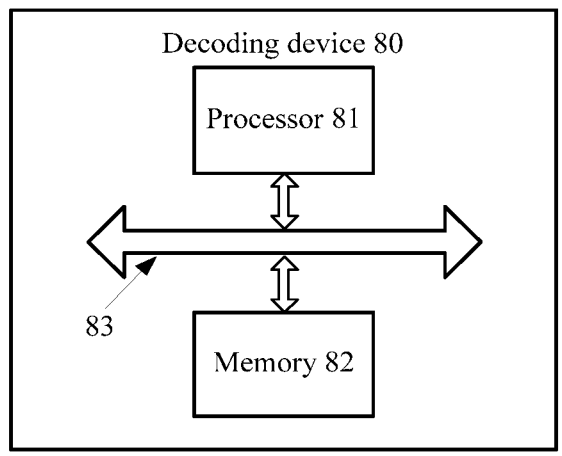
FIG. 18 is another schematic block diagram of a reference image decoding apparatus according to still another embodiment of the present disclosure.

As shown in FIG. 18, an embodiment of the present disclosure further provides a decoding device 80, including a processor 81, a memory 82, and a bus system 83. The processor 81 is connected to the memory 82 by using the bus system 83. The memory 82 is configured to store an instruction. The processor 81 is configured to execute the instruction stored in the memory 82. The memory 82 in the decoding device 80 stores program code, and the processor 81 may invoke the program code stored in the memory 82 to perform the following operations: parsing a bitstream, to obtain a reconstructed image of a first reference image and a reconstructed image of a second reference image, where the first reference image is decoded before the second reference image; before the parsing a bitstream, to obtain a reconstructed image of a second reference image, or during the parsing a bitstream, to obtain a reconstructed image of a second reference image, or after the parsing a bitstream, to obtain a reconstructed image of a second reference image, parsing the bitstream, to obtain reference image update information, and determining, according to the reference image update information, whether a local area in the second reference image is suitable for updating a corresponding area or a related area in the first reference image, where a size of the local area is less than or equal to a size of the second reference image; determining whether the corresponding area or the related area in the first reference image is updated; and when the corresponding area or the related area in the first reference image is not updated, and it is determined, according to the reference image update information, that the local area in the second reference image is suitable for updating the corresponding area or the related area in the first reference image, replacing a pixel value of the corresponding area or the related area in the first reference image with a pixel value of the local area in the second reference image.

Therefore, according to the reference image decoding device in this embodiment of the present disclosure, the decoding device locally updates the first reference image by using update information of a subsequent reference image in a pixel copy manner. Therefore, decoding complexity is reduced while compression efficiency is improved by using the first reference image, and a delay that is brought about by a sharp increase in a bit rate is also avoided.

It should be understood that in this embodiment of the present disclosure, the processor 81 may be a central processing unit (Central Processing Unit, "CPU" for short), or the processor 81 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any normal processor, or the like.

The memory 82 may include a read-only memory and a random access memory, and provide an instruction and data to the processor 81. A part of the memory 82 may further include a non-volatile random access memory. For example, the memory 82 may further store device type information.

The bus system 83 may further include a power bus, a control bus, a status signal bus, and the like, in addition to a data bus. However, for clear description, various types of buses in the figure are marked as the bus system 83.

In an implementation process, steps in the foregoing methods may be completed by using an integrated logical circuit of hardware in the processor 81 or instructions in a form of software in the processor 81. The steps in the methods disclosed with reference to the embodiments of the present disclosure may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 82, and the processor 81 reads information in the memory 82 and completes the steps in the foregoing methods in combination with hardware of the processor 81. To avoid repetition, details are not described herein again.

It should be understood that, the encoding device 80 according to this embodiment of the present disclosure may correspond to the encoding device 20 in the embodiments of the present disclosure, and may correspond to a corresponding entity that performs the method 2000 according to the embodiments of the present disclosure. For brevity, details are not described herein again.

It should be understood that "an embodiment" or "an embodiment" mentioned in the whole specification does not mean that particular features, structures, or characteristics related to the embodiment are included in at least one embodiment of the present disclosure. Therefore, "in an embodiment" or "in an embodiment" appearing throughout the specification does not refer to a same embodiment. In addition, these particular features, structures, or characteristics may be combined in one or more embodiments by using any appropriate manner.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In addition, the terms "system" and "network" may be used interchangeably in this specification. It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described combinations and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (Read-Only Memory, "ROM" for short), a random access memory (Random Access Memory, "RAM" for short), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A reference image decoding method comprising:
parsing a bitstream, to obtain: coding information, a reconstructed image of a first reference image, and a reconstructed image of a second reference image, wherein the first reference image is decoded before the second reference image;
determining, after parsing the bitstream to obtain the reconstructed image of the second reference image, according to the coding information and a preset rule, whether a local area in the second reference image is used to update a corresponding area or a related area in the first reference image, wherein a size of the local area is less than or equal to a size of the second reference image; and
responsive to determining that the local area in the second reference image is used to update the corresponding area or the related area in the first reference image, replacing a pixel value of the corresponding area or the related area in the first reference image with a pixel value of the local area in the second reference image,
wherein the coding information comprises a quantization parameter offset value of the local area in the second reference image, and
wherein determining whether the local area in the second reference image is used to update the corresponding area or the related area in the first reference image comprises:
responsive to determining that an absolute value of the quantization parameter offset value falls within a first value range, determining, that the local area in the second reference image is used to update the corresponding area or the related area in the first reference image.

2. The decoding method according to claim 1, wherein the corresponding area in the first reference image is an area that is in the first reference image and that has location coordinates that match location coordinates of the local area in the second reference image.

3. The decoding method according to claim 1, wherein the method further comprises:
obtaining spatial offsets between location coordinates of the local area and location coordinates of the related area in the first reference image, wherein the spatial offsets comprise a lateral offset and a longitudinal offset; and
before replacing the pixel value of the corresponding area or the related area in the first reference image with the pixel value of the local area in the second reference image, determining a location of the related area in the first reference image according to the location coordinates of the local area in the second reference image and the spatial offsets.

4. The decoding method according to claim 1, wherein parsing the bitstream, to obtain the reconstructed image of the first reference image comprises:
parsing the bitstream, to obtain a particular picture order count (POC) of the first reference image, and obtain the reconstructed image of the first reference image having the particular picture order count.

5. The decoding method according to claim 4, wherein parsing the bitstream, to obtain the reconstructed image of the second reference image comprises:
parsing the bitstream, to obtain a particular picture order count (POC) of the second reference image, and obtaining the reconstructed image of the second reference image having the particular picture order count of the second reference image, wherein the particular picture order count of the second reference image is associated with the particular picture order count of the first reference image that is updated by using the second reference image.

6. The decoding method according to claim 1, wherein: the first value range is greater than or equal to 10, and is less than 20.

7. A reference image decoding method comprising:
parsing a bitstream, to obtain: coding information, a reconstructed image of a first reference image, and a reconstructed image of a second reference image, wherein the first reference image is decoded before the second reference image;

determining, after parsing the bitstream to obtain the reconstructed image of the second reference image, according to the coding information and a preset rule, whether a local area in the second reference image is used to update a corresponding area or a related area in the first reference image, wherein a size of the local area is less than or equal to a size of the second reference image; and responsive to determining that the local area in the second reference image is used to update the corresponding area or the related area in the first reference image, replacing a pixel value of the corresponding area or the related area in the first reference image with a pixel value of the local area in the second reference image, wherein the coding information comprises: a scale factor of a quantization process of the local area in the second reference image, and wherein determining whether the local area in the second reference image is used to update the corresponding area or the related area in the first reference image comprises:

responsive to determining that the scale factor of the quantization process falls within a second value range, determining, that the local area in the second reference image is used to update the corresponding area or the related area in the first reference image.

8. The decoding method according to claim 7, wherein determining, that the local area in the second reference image is used to update the corresponding area or the related area in the first reference image comprises:

responsive to determining that the scale factor of the quantization process is greater than or equal to 0.5 and is less than 1, or responsive to determining that the scale factor is less than or equal to 1.5 and is greater than 1, determining, that the local area in the second reference image is used to update the corresponding area or the related area in the first reference image.

9. A reference image decoding device, comprising:

a processor; and a memory coupled to the processor, having processor-readable instructions stored thereon, wherein the processor-readable instructions when executed by the processor cause the processor to implement operations including:

parsing a bitstream, to obtain: coding information, a reconstructed image of a first reference image, and a reconstructed image of a second reference image, wherein the first reference image is decoded before the second reference image;

determining, after the bitstream is parsed to obtain the reconstructed image of the second reference image, according to the coding information and a preset rule, whether a local area in the second reference image is used to update a corresponding area or a related area in the first reference image, wherein a size of the local area is less than or equal to a size of the second reference image; and responsive to determining that the local area in the second reference image is used to update the corresponding area or the related area in the first reference image, replacing a pixel value of the corresponding area or the related area in the first reference image with a pixel value of the local area in the second reference image, wherein the coding information comprises a quantization parameter offset value of the local area in the second reference image; and wherein determining whether the local area in the second reference image is used to update the corresponding area or the related area in the first reference image comprises:

responsive to determining that an absolute value of the quantization parameter offset value falls within a first value range, determining, that the local area in the second reference image is used to update the corresponding area or the related area in the first reference image.

10. The decoding device according to claim 9, wherein the corresponding area in the first reference image is an area that is in the first reference image and that has location coordinates that match location coordinates of the local area in the second reference image.

11. The decoding device according to claim 9, wherein the operations further include:

obtaining spatial offsets between location coordinates of the local area and location coordinates of the related area in the first reference image, wherein the spatial offsets comprise a lateral offset and a longitudinal offset; and before replacing the pixel value of the corresponding area or the related area in the first reference image with the pixel value of the local area in the second reference image, determining a location of the related area in the first reference image according to the location coordinates of the local area in the second reference image and the spatial offsets.

12. The decoding device according to claim 9, wherein the operations further include:

parsing the bitstream, to obtain a particular picture order count (POC) of the first reference image.

13. The decoding device according to claim 12, wherein the operations further include:

parsing the bitstream, to obtain a particular picture order count (POC) of the second reference image, wherein the particular picture order count of the second reference image is associated with the particular picture order count of the first reference image.

14. The decoding device according to claim 9, wherein:

the first value range is greater than or equal to 10, and is less than 20.

* * * * *